United States Patent [19]
Vidal

[11] Patent Number: 4,779,573
[45] Date of Patent: Oct. 25, 1988

[54] DEVICE WITH POUCHES FOR RECEIVING ANIMAL WASTE

[76] Inventor: Stella M. Vidal, 21 East 22nd St., #6H, New York, N.Y. 10010

[21] Appl. No.: 944,344

[22] Filed: Dec. 18, 1986

Related U.S. Application Data

[63] Continuation-in-part of Ser. No. 755,263, Jul. 15, 1985, abandoned, which is a continuation-in-part of Ser. No. 623,222, Jun. 21, 1984, Pat. No. 4,537,153, which is a continuation of Ser. No. 337,712, Jan. 7, 1982, abandoned.

[51] Int. Cl.⁴ .............................................. A01K 23/00
[52] U.S. Cl. ........................................................ 119/95
[58] Field of Search ............................................ 119/95

[56] References Cited

U.S. PATENT DOCUMENTS

| | | | |
|---|---|---|---|
| 3,211,132 | 10/1965 | Hersh | 119/143 |
| 3,786,787 | 1/1974 | Weinberger | 119/95 |
| 3,792,687 | 2/1974 | Ehrman | 119/95 |
| 4,095,562 | 6/1978 | Graham | 119/95 |
| 4,103,645 | 8/1978 | Tyler | 119/95 |
| 4,353,330 | 10/1982 | Baumgartner | 119/95 |
| 4,444,152 | 4/1984 | Berardo | 119/95 |

FOREIGN PATENT DOCUMENTS 7411737  3/1976  Netherlands ............ 119/95

*Primary Examiner*—Gene Mancene
*Assistant Examiner*—Cary E. Stone
*Attorney, Agent, or Firm*—Cooper & Dunham

[57] ABSTRACT

A new garment of flexible, light weight, soft and strong material, to be worn on the body by dogs, cats, mammals or the like, provided with pouches for receiving and retaining the discharge of their solid and fluid wastes. The garment is primarily directed to be worn by male and female dogs, and in one aspect of the invention, to be worn by male or female dogs alike, comprises a wearer-contacting garment constituted by distinctive portions which are placed over selected anatomical regions of the wearer provided with one pouch located around the root of the tail and the anal region of the wearer, the pouch having a closed bottom and an entrance opening to receive and retain solid body wastes, and the garment in another aspect of the invention, to be worn in some embodiments by male dogs, and in other embodiments by female dogs, comprises a wearer-contacting garment constituted by distinctive portions which are placed over selected anatomical regions of the wearer provided with two pouches, one pouch to receive and retain solid body wastes as mentioned above, and one pouch located over and around the genitalia of the wearer, having an absorbent pad positioned therein to receive and retain fluid body wastes. While the garment of the present invention, in the embodiments to be worn by male and female cats alike, comprises a wearer-contacting garment constituted by distinctive portions which are placed over selected anatomical regions of the wearer provided with one pouch having an absorbent pad positioned therein, to receive and retain solid and fluid body wastes. The garment in all its embodiments is provided with adjustable straps which might be plain, elasticized or of an elastic fabric to fasten the garment tightly, yet comfortably and securely around the groins, the abdomen and the upper arms of the wearer with several fastening means. The garment of the present invention has several uses, i.e. (1) as an integral disposable garment, (2) as an integral reusable-washable garment, both uses (1) and (2) having pouches permanently affixed to the wearer-contacting garment (3) as an attachable reusable-disposable garment, and (4) as an attachable reusable-washable garment, both uses (3) and (4) having attachable disposable or attachable reusable-washable pouches respectively, attached with fasteners to the reusable wearer-contacting garment when in use, and detached after use to be disposed of, or to be washed and reused respectively.

50 Claims, 29 Drawing Sheets

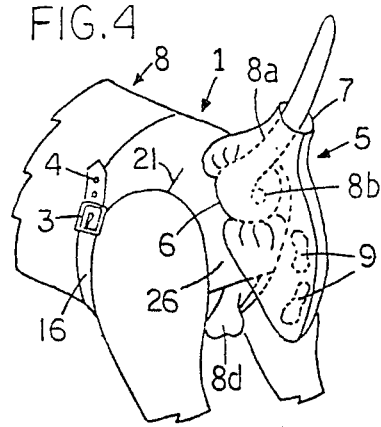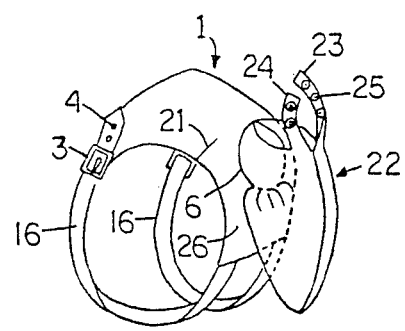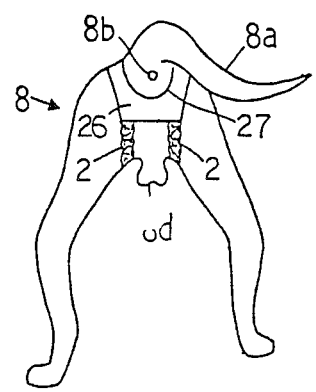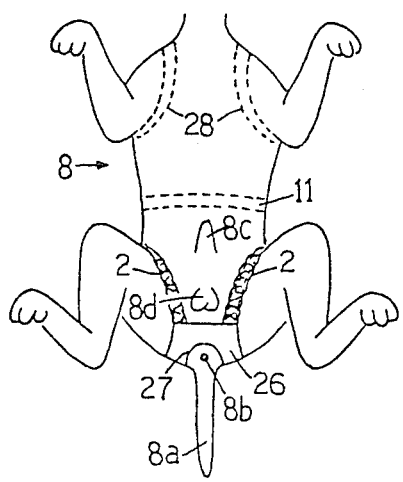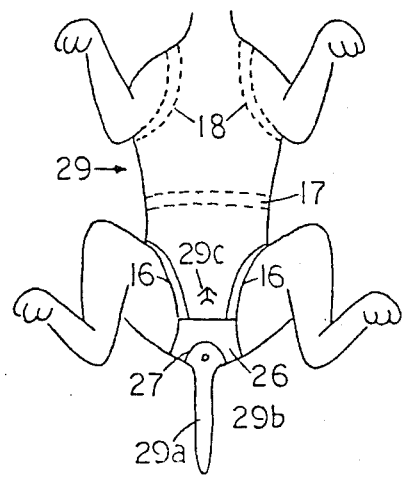

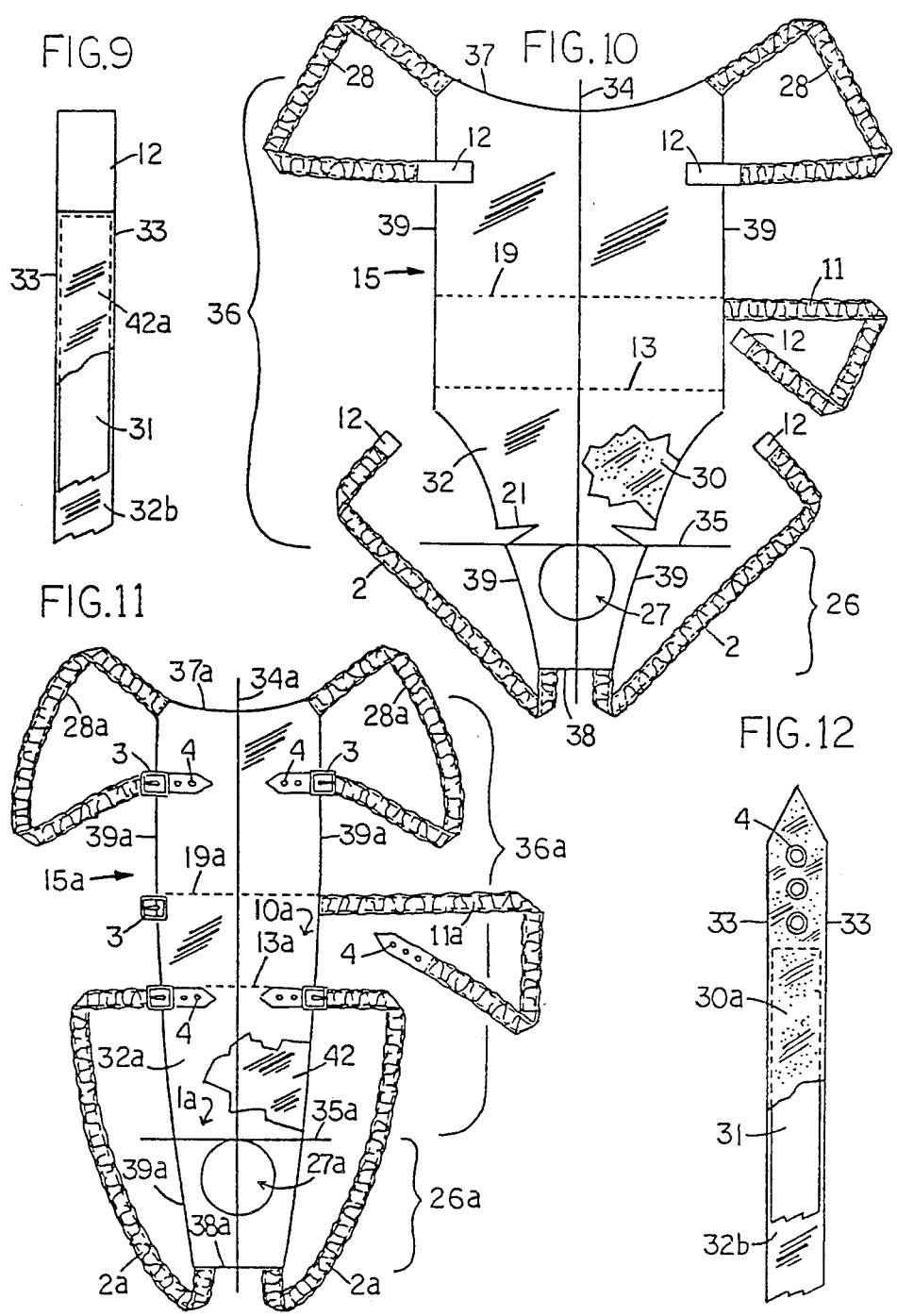

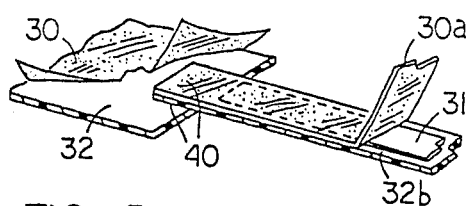
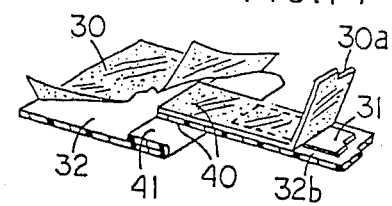
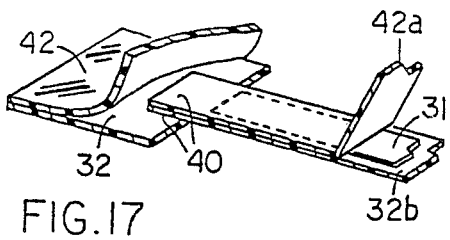
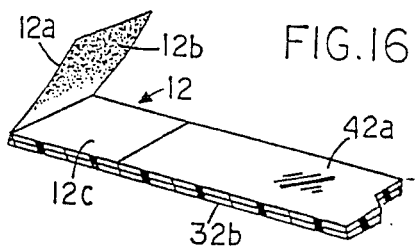
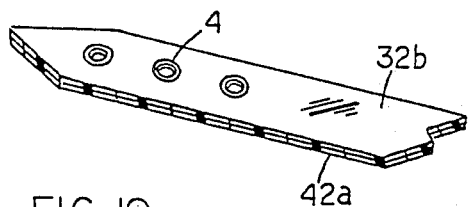
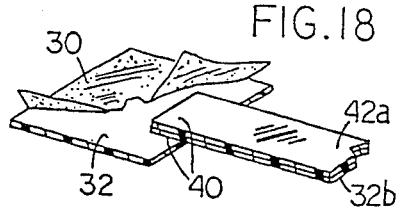
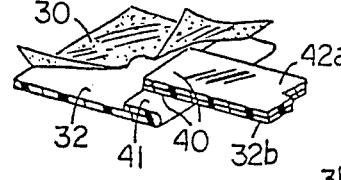
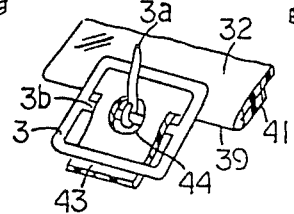
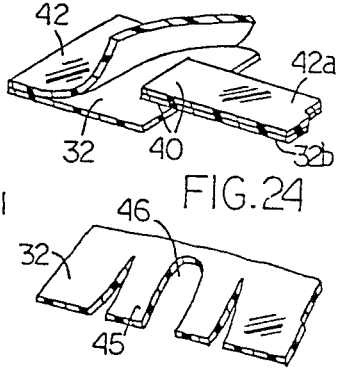
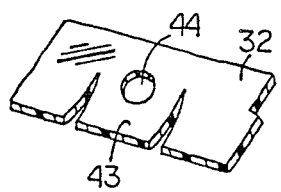
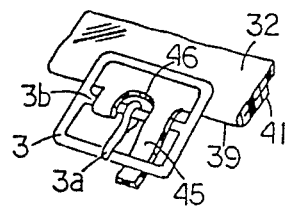
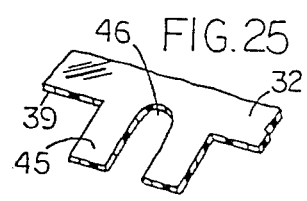

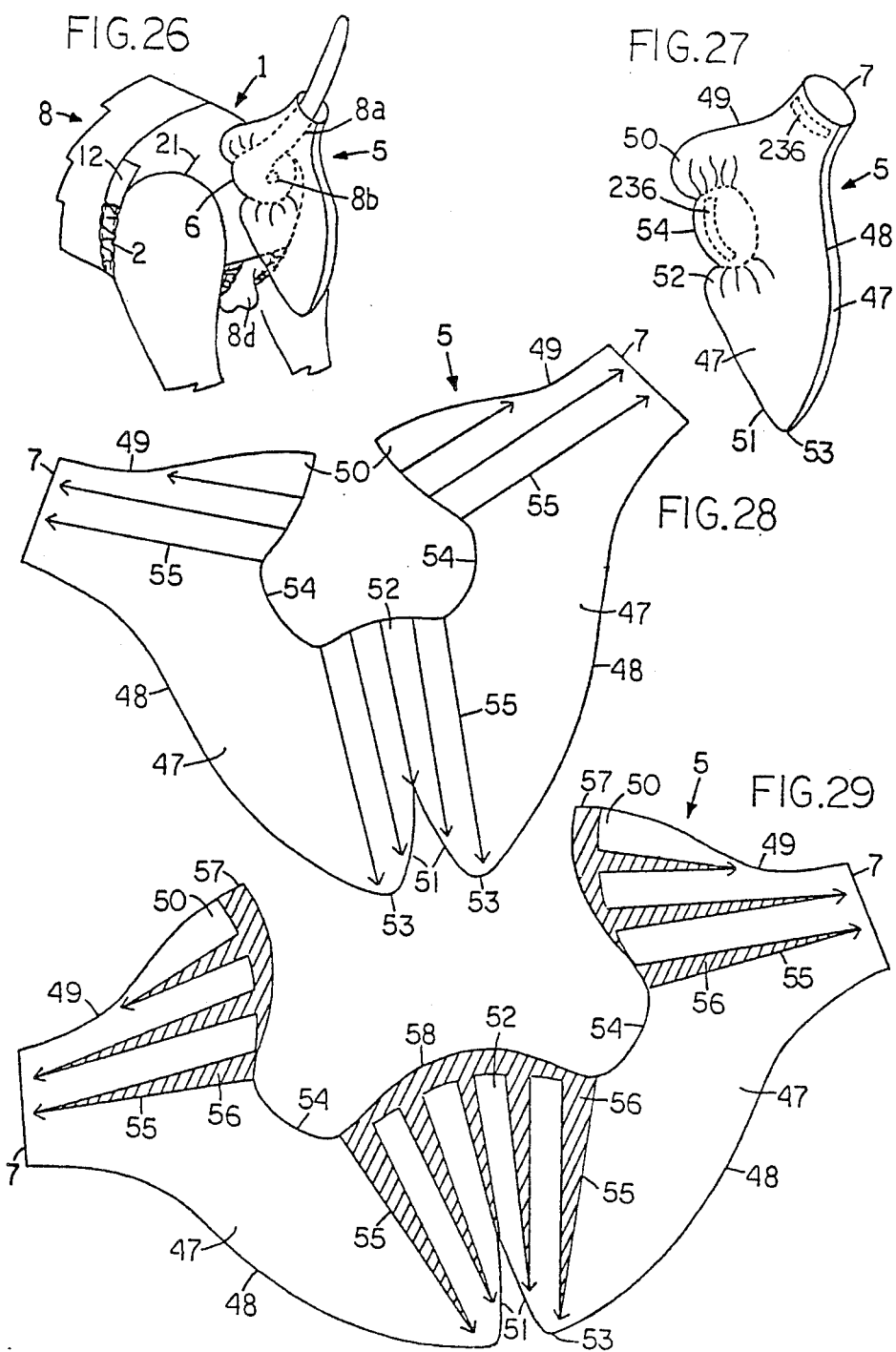

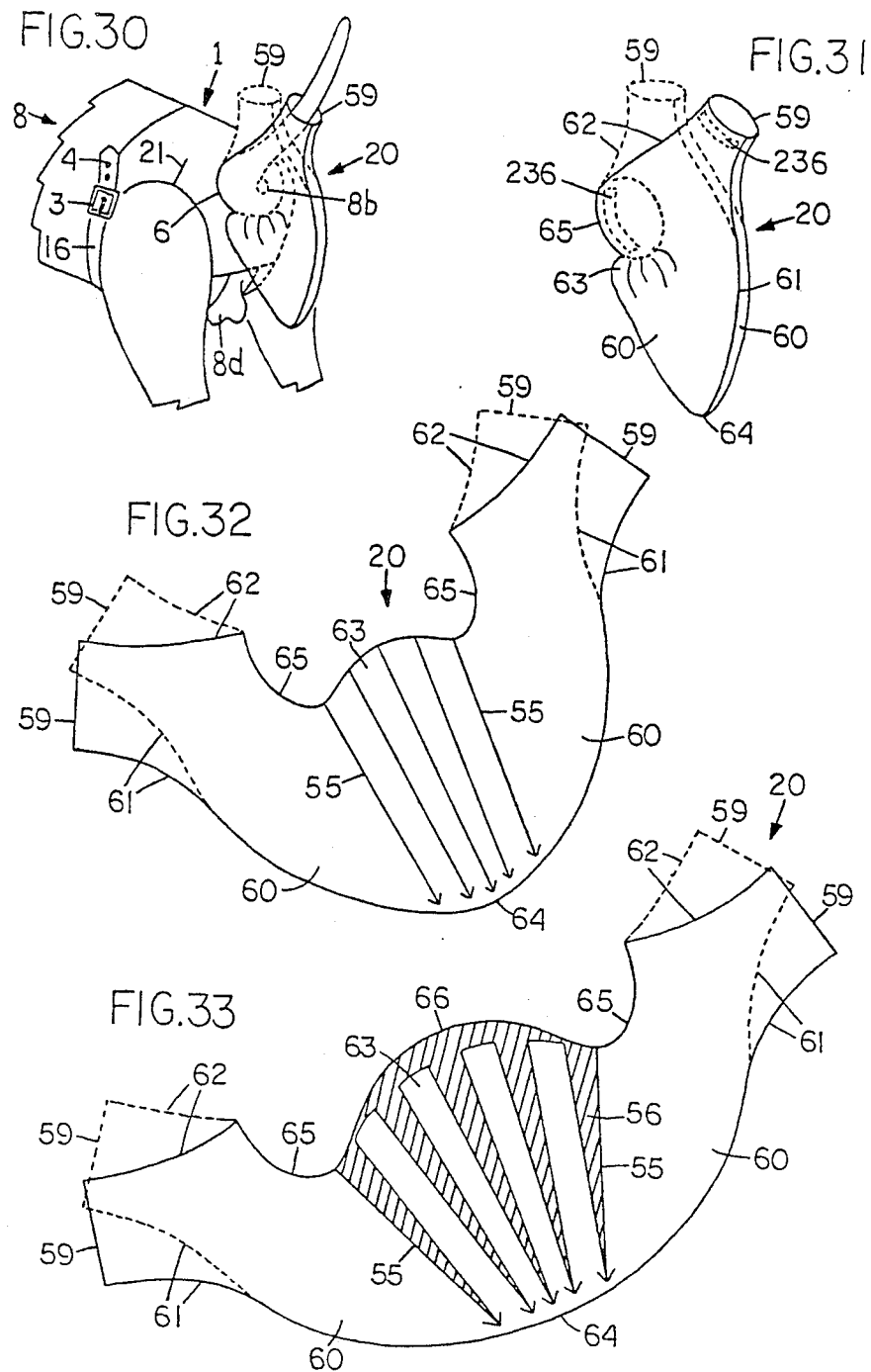

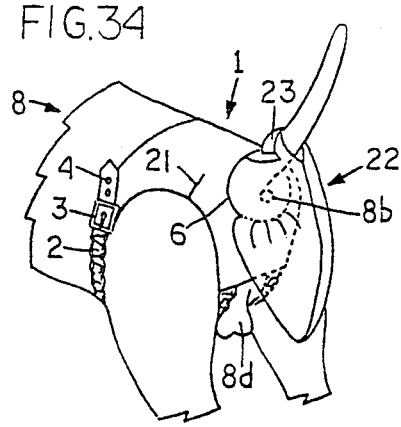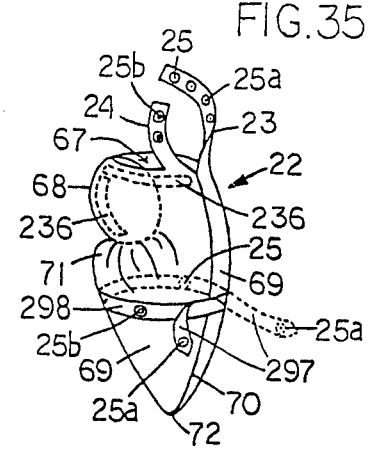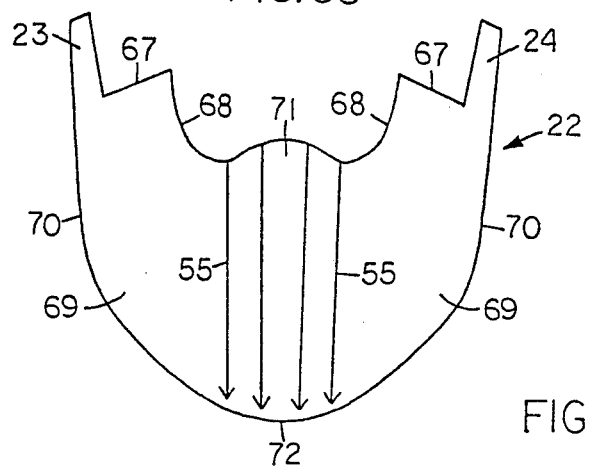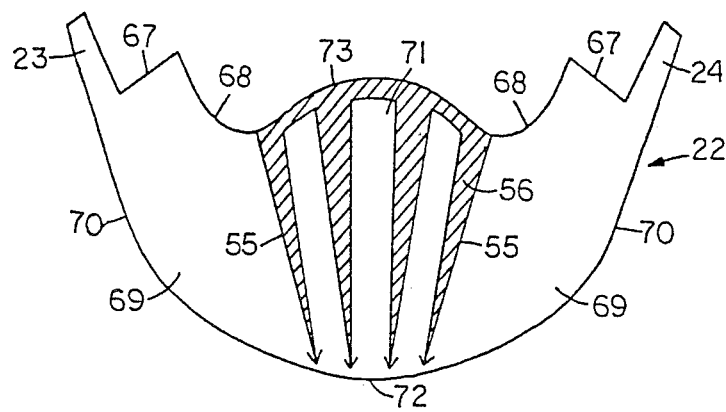

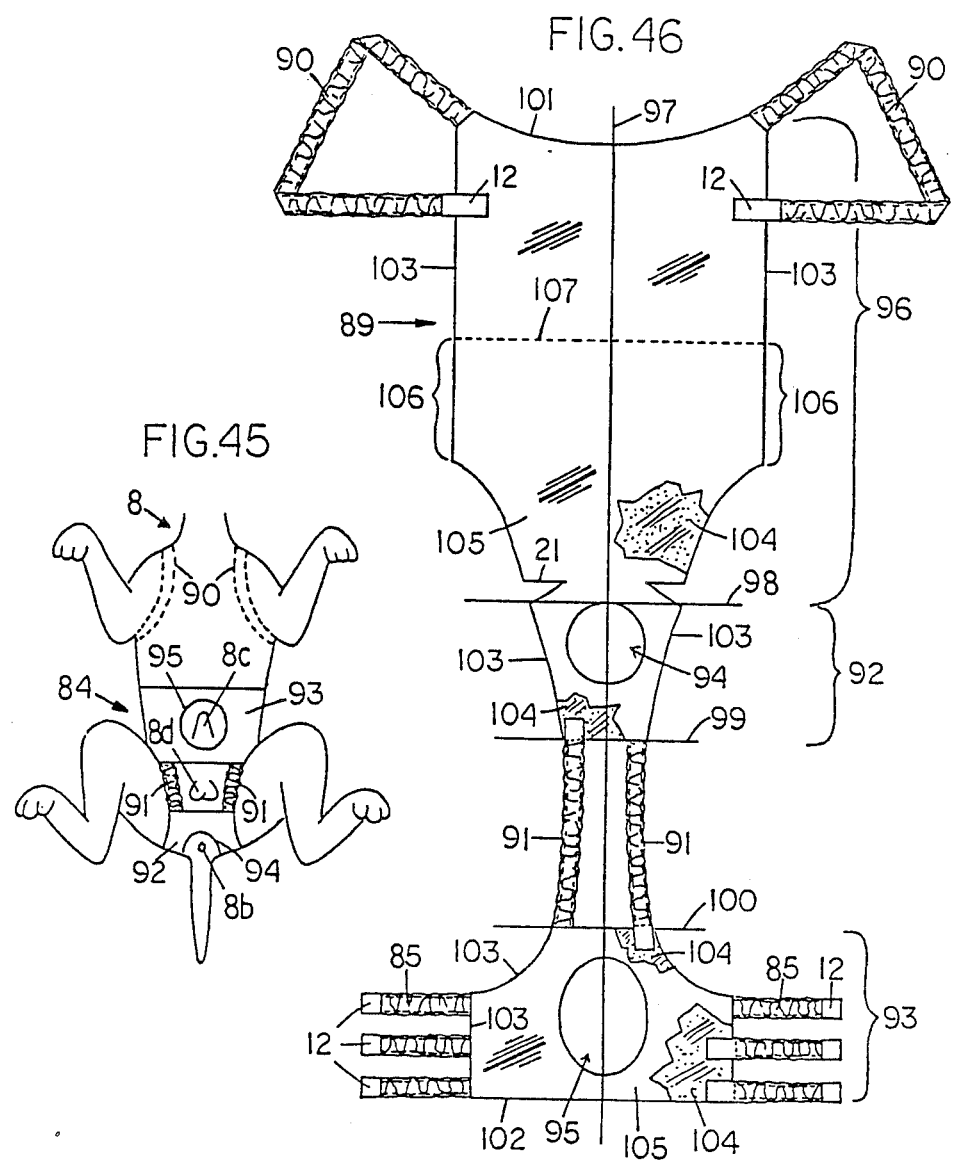

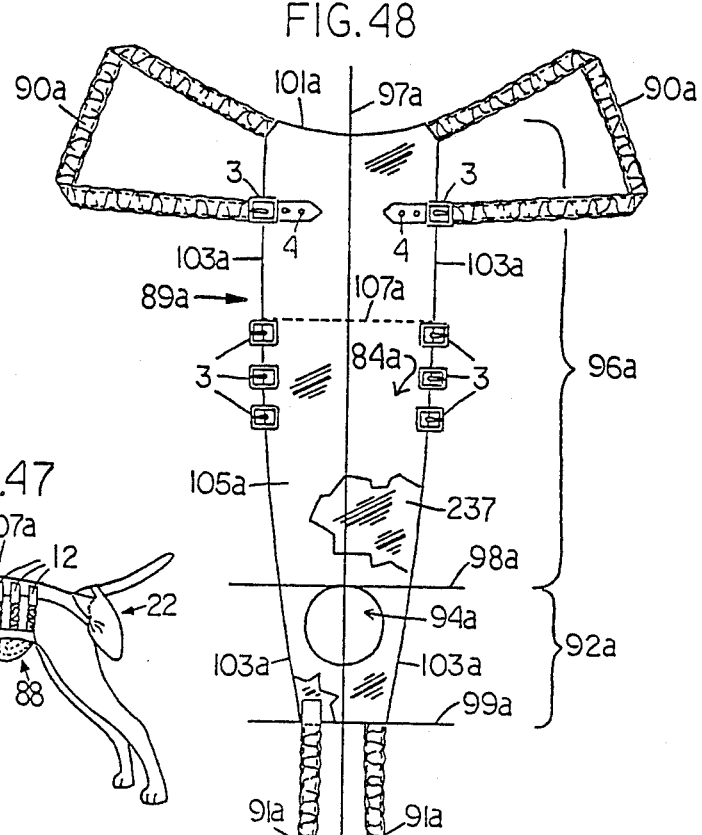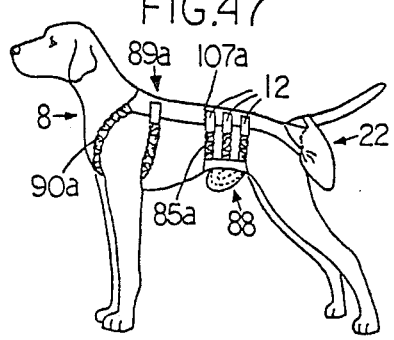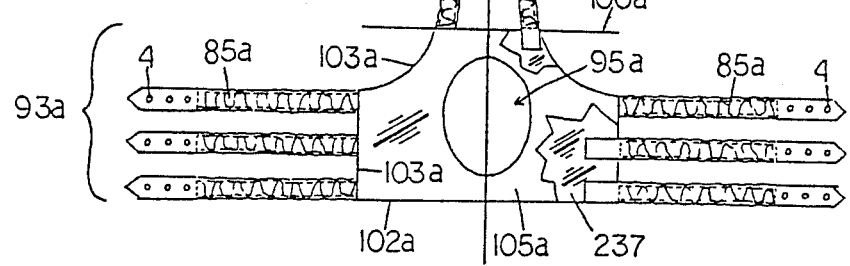

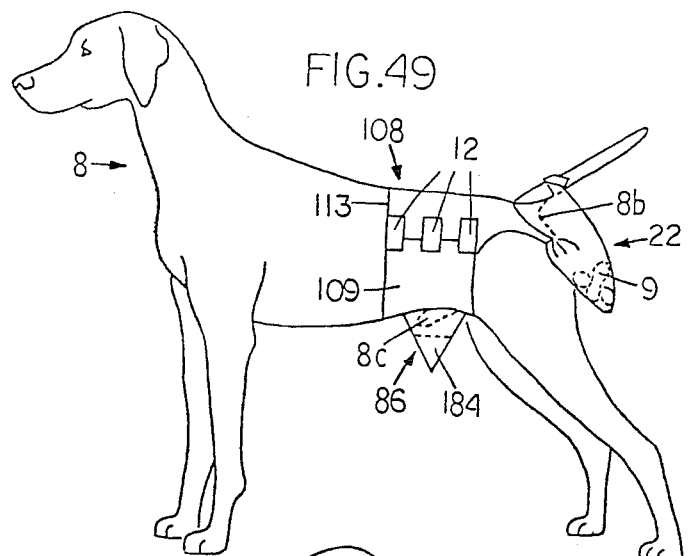
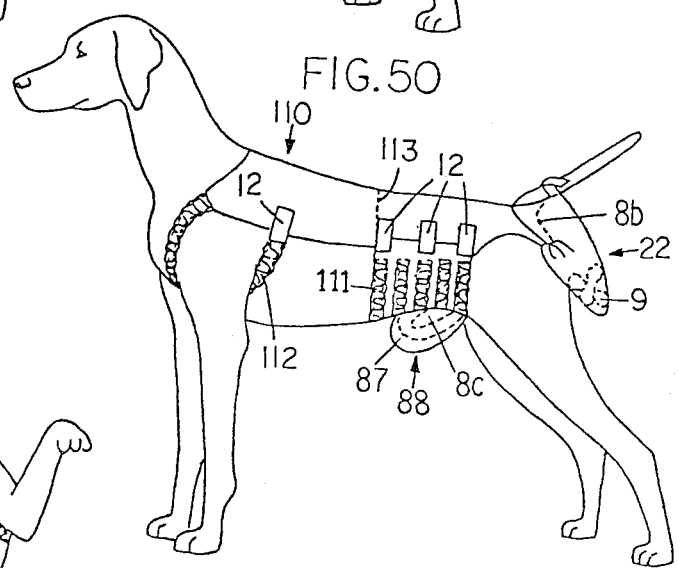
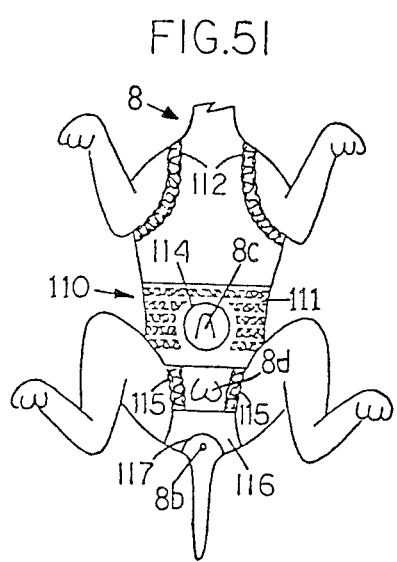

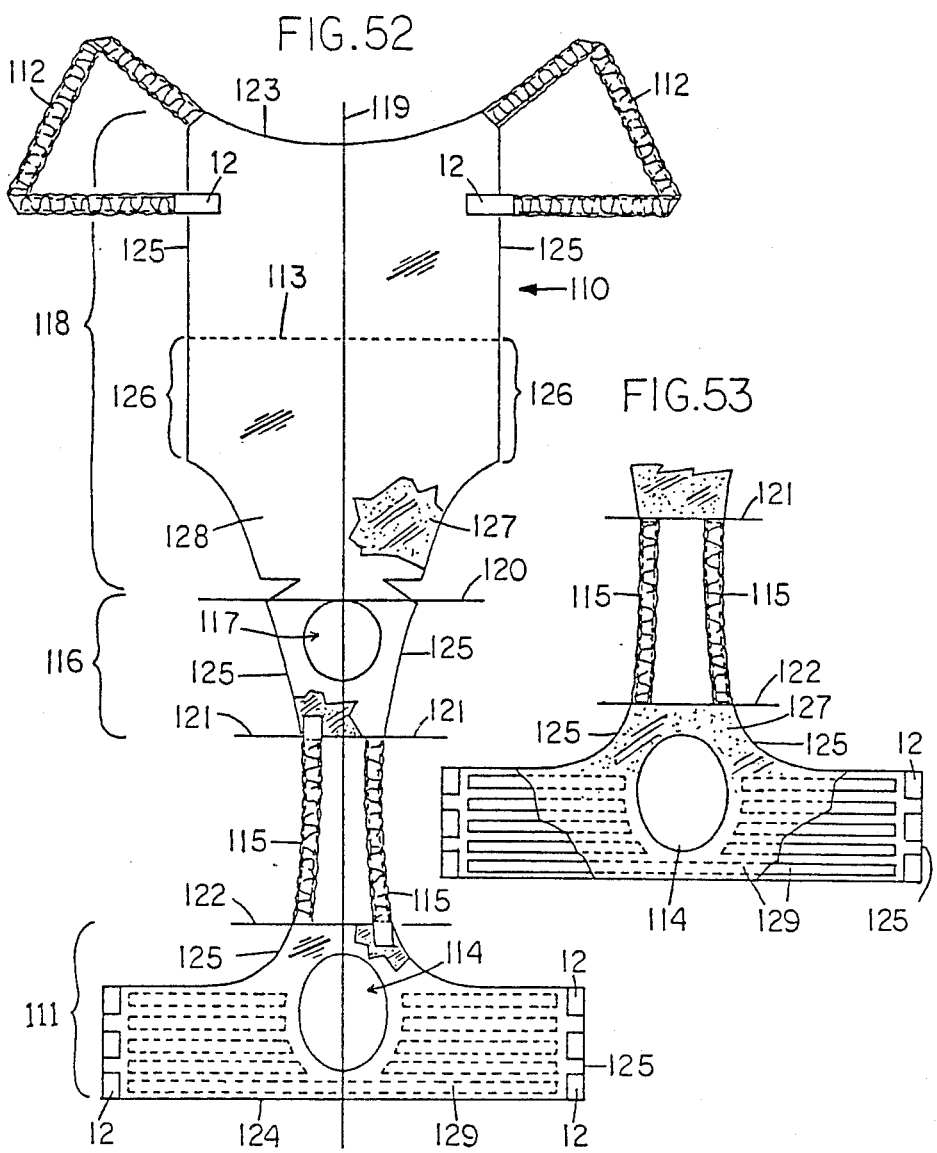

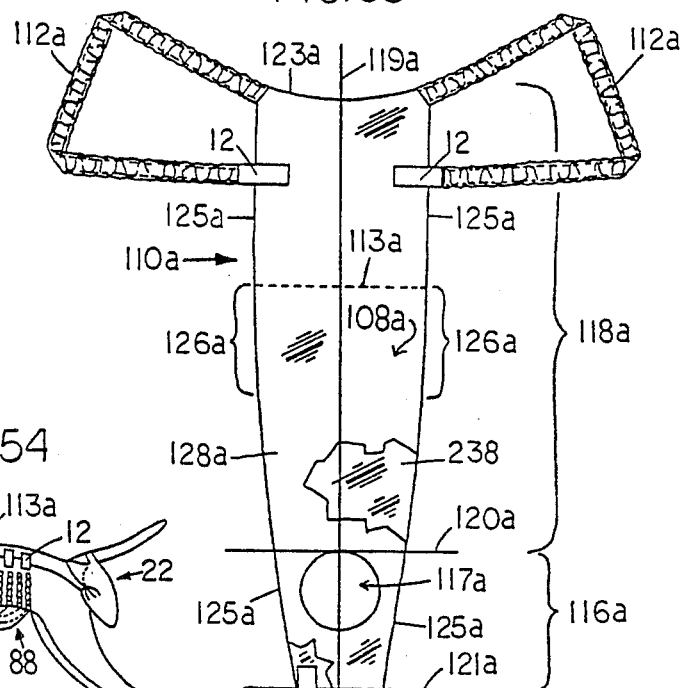
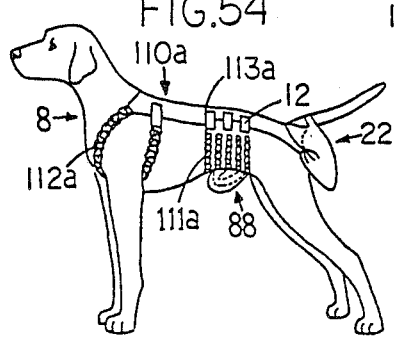
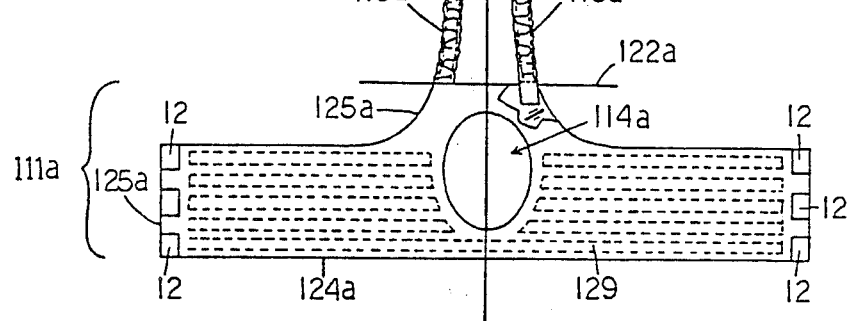
FIG. 55
FIG. 54

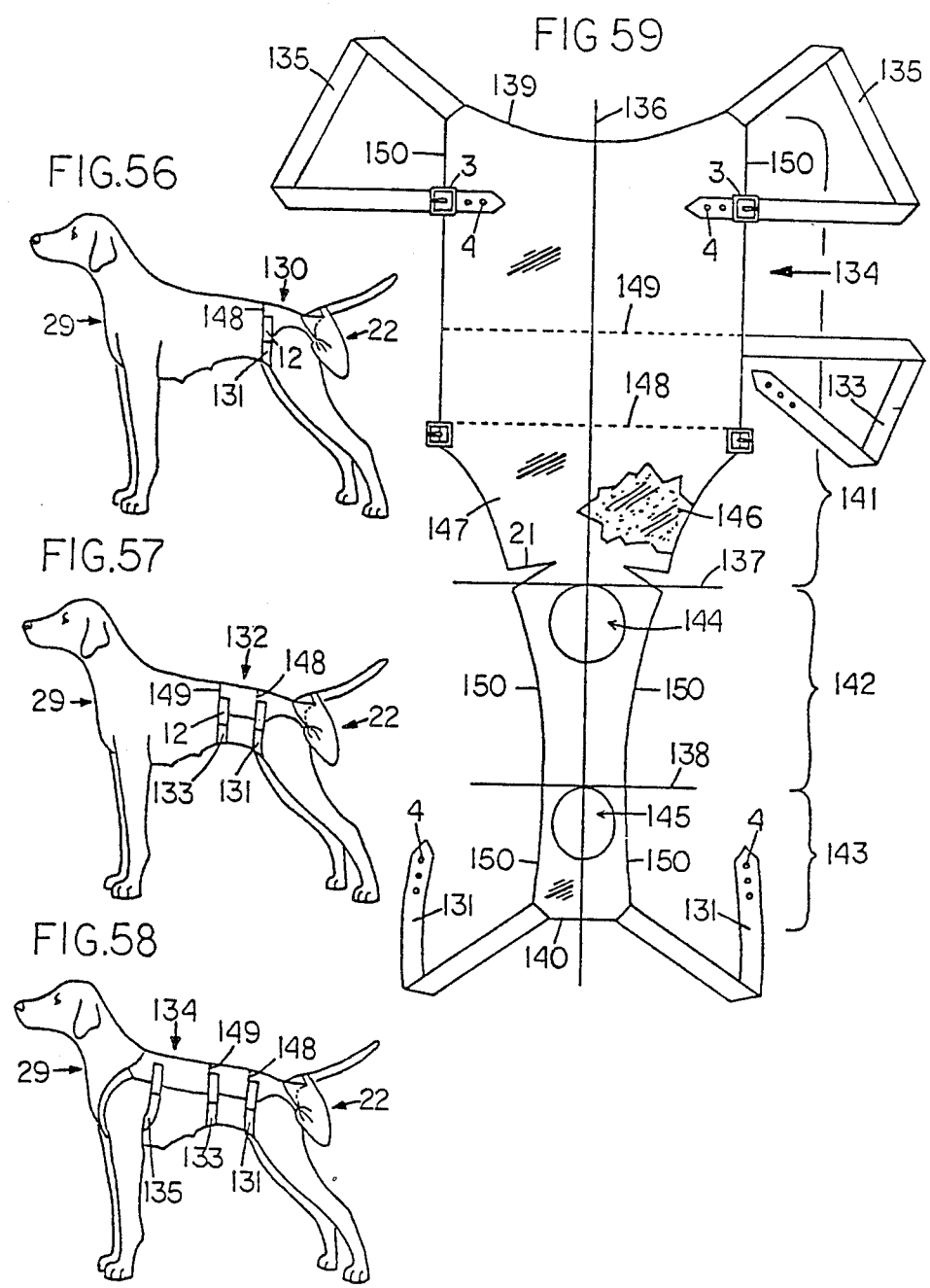

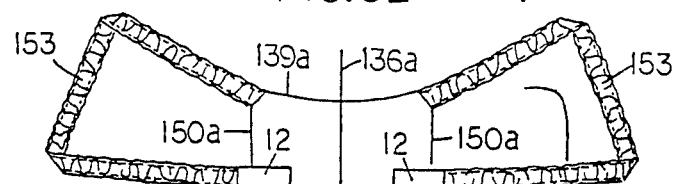
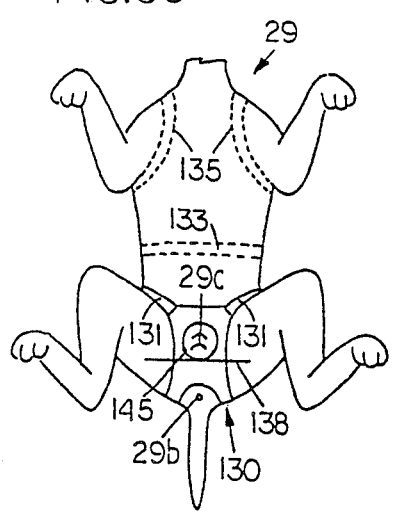
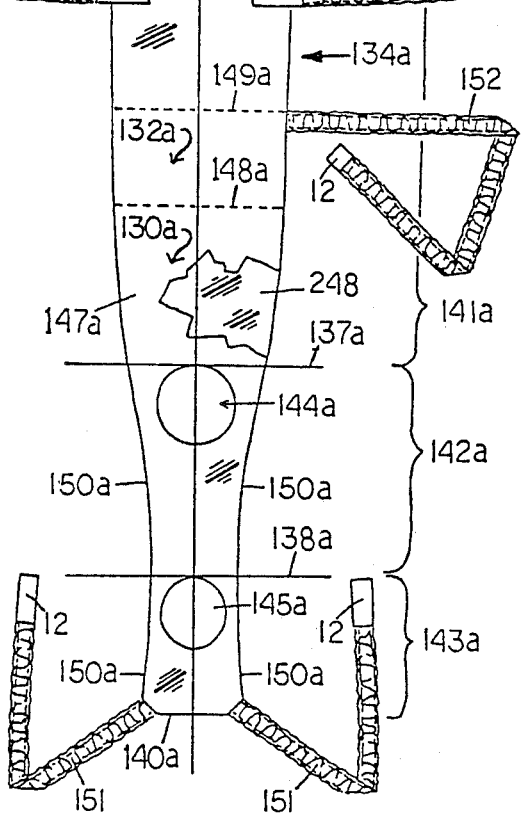
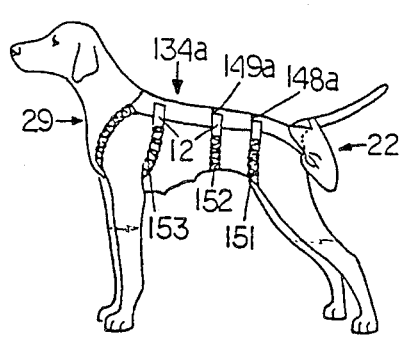

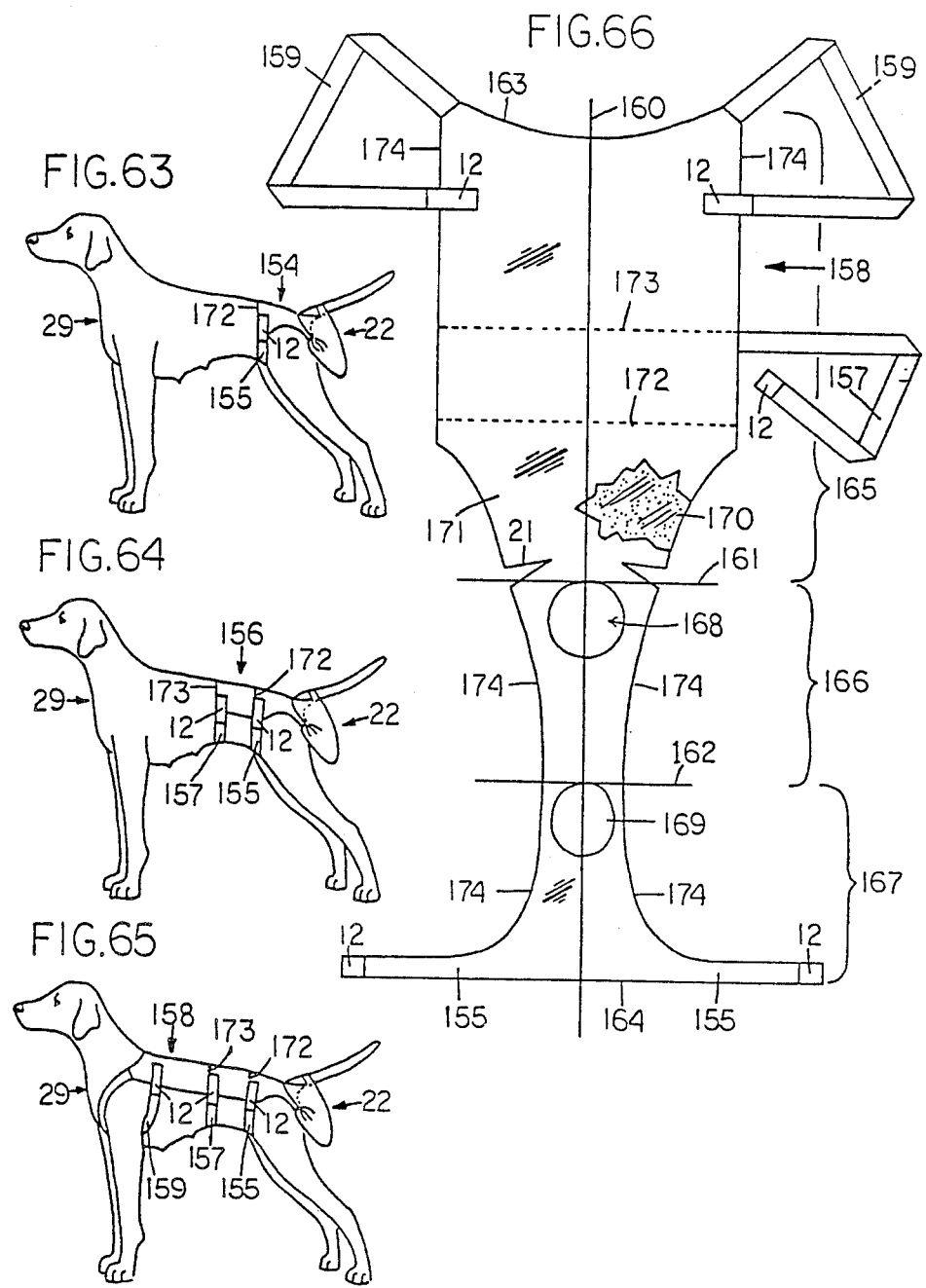

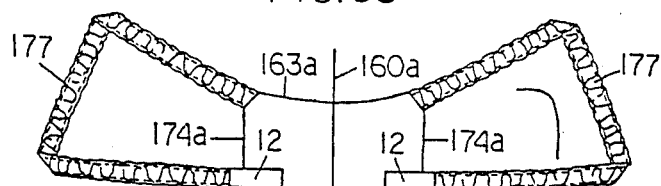
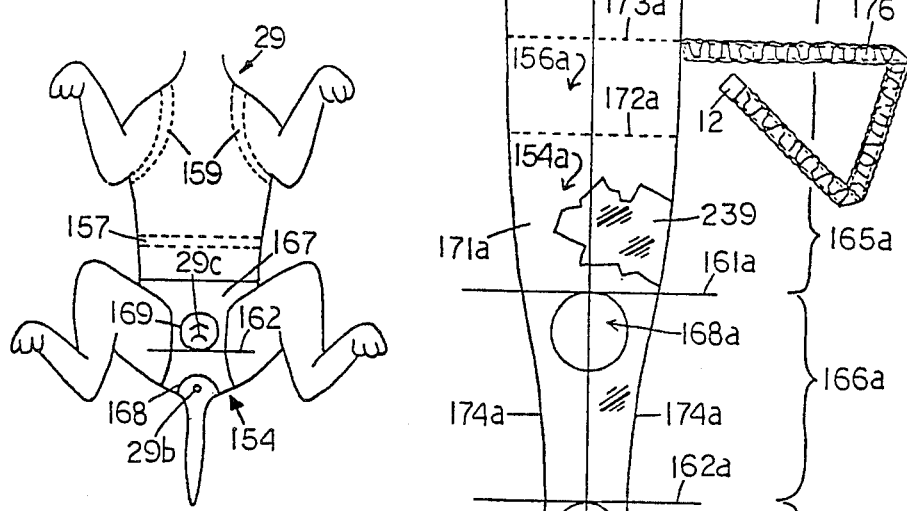
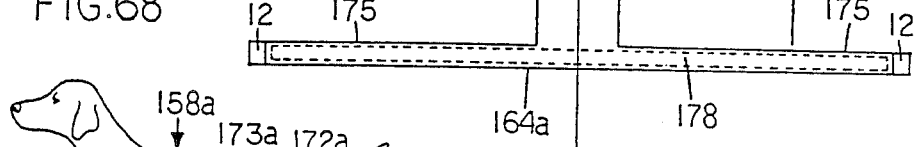
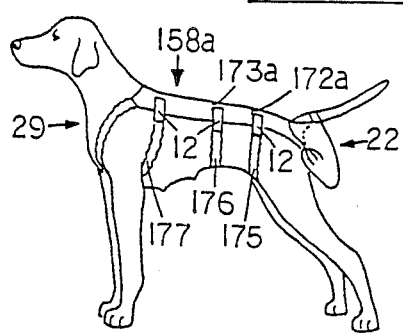

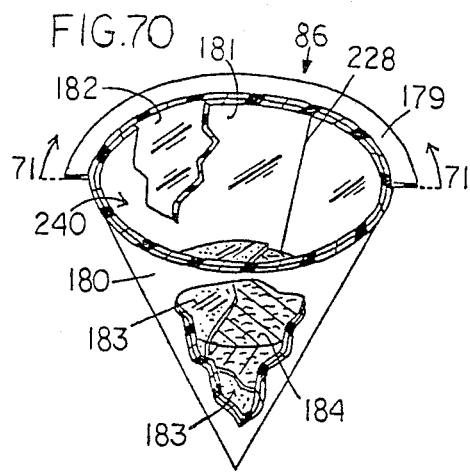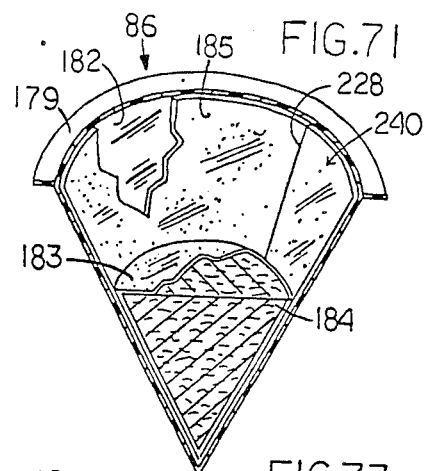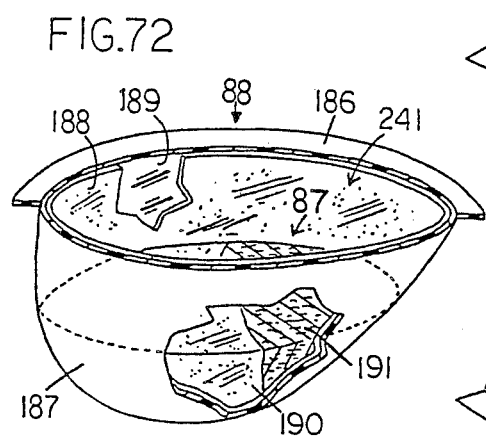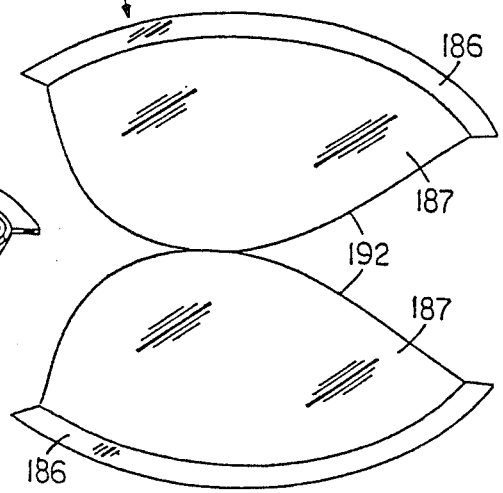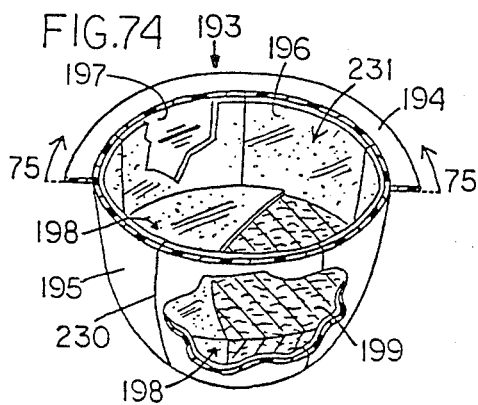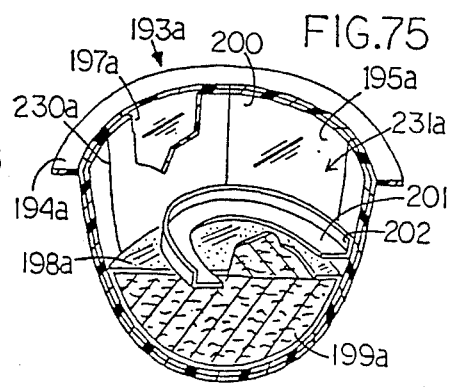

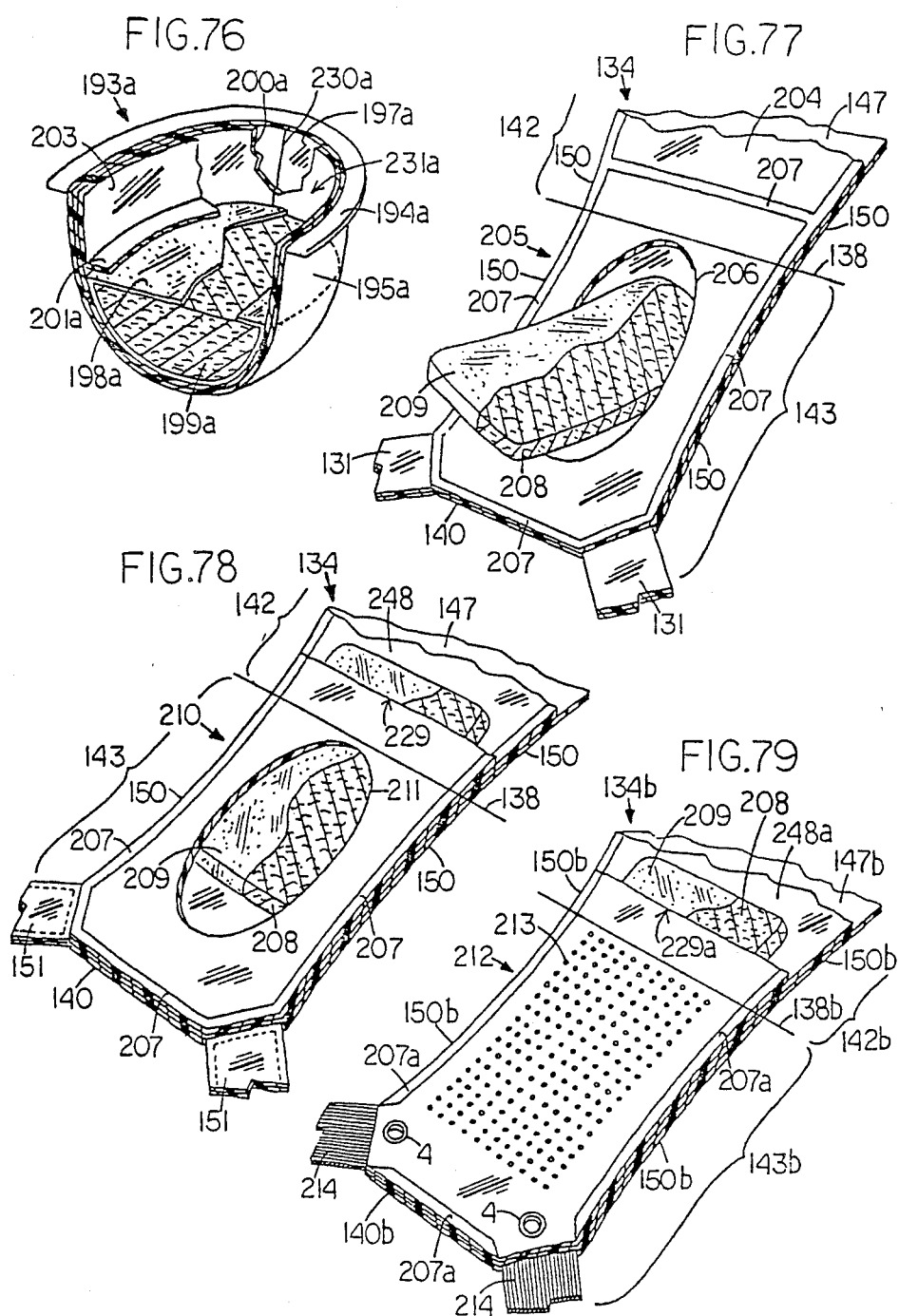

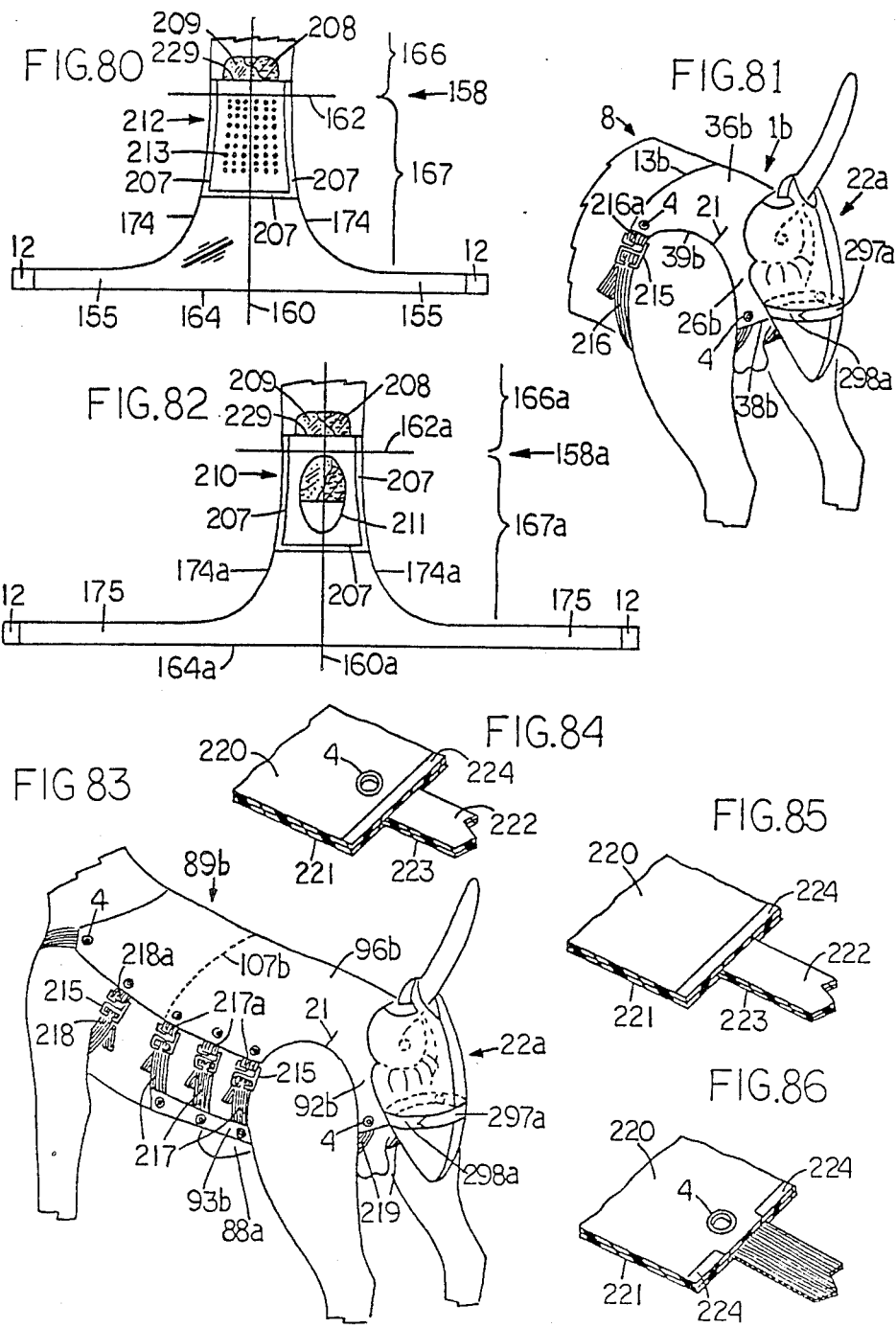

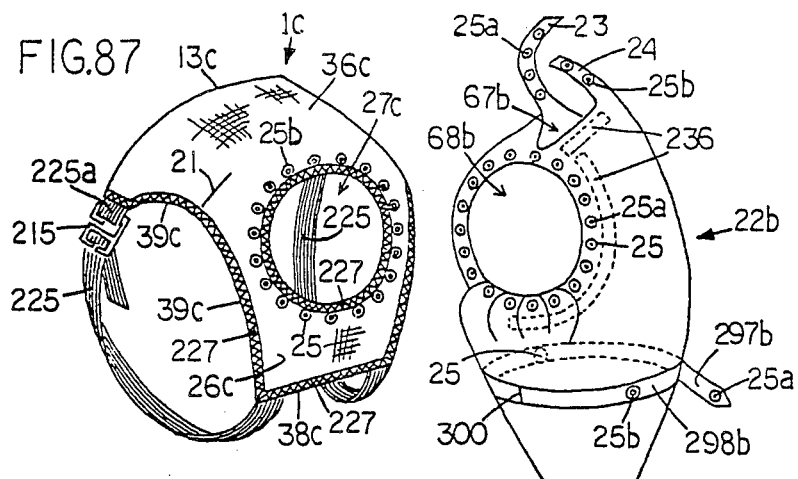
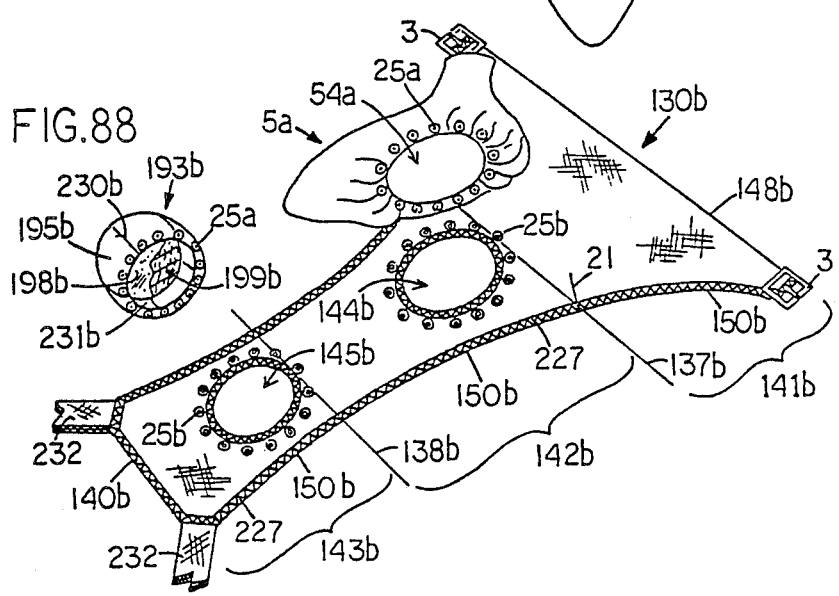
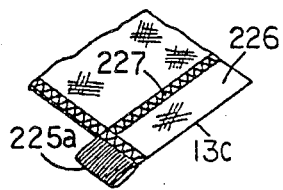
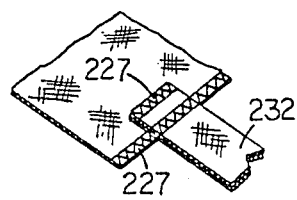
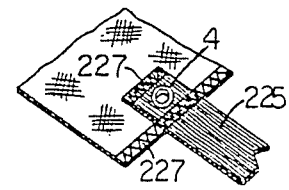

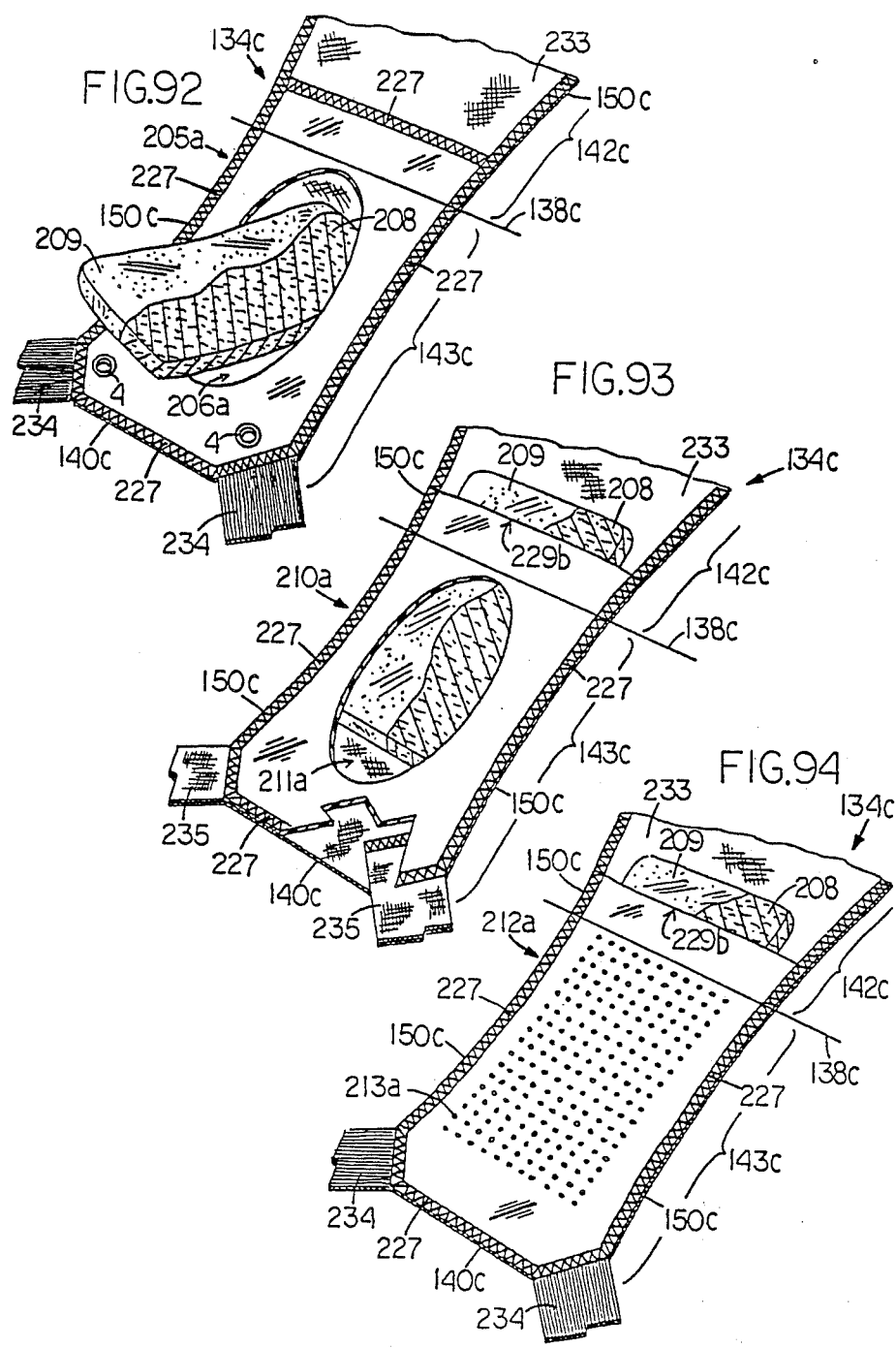

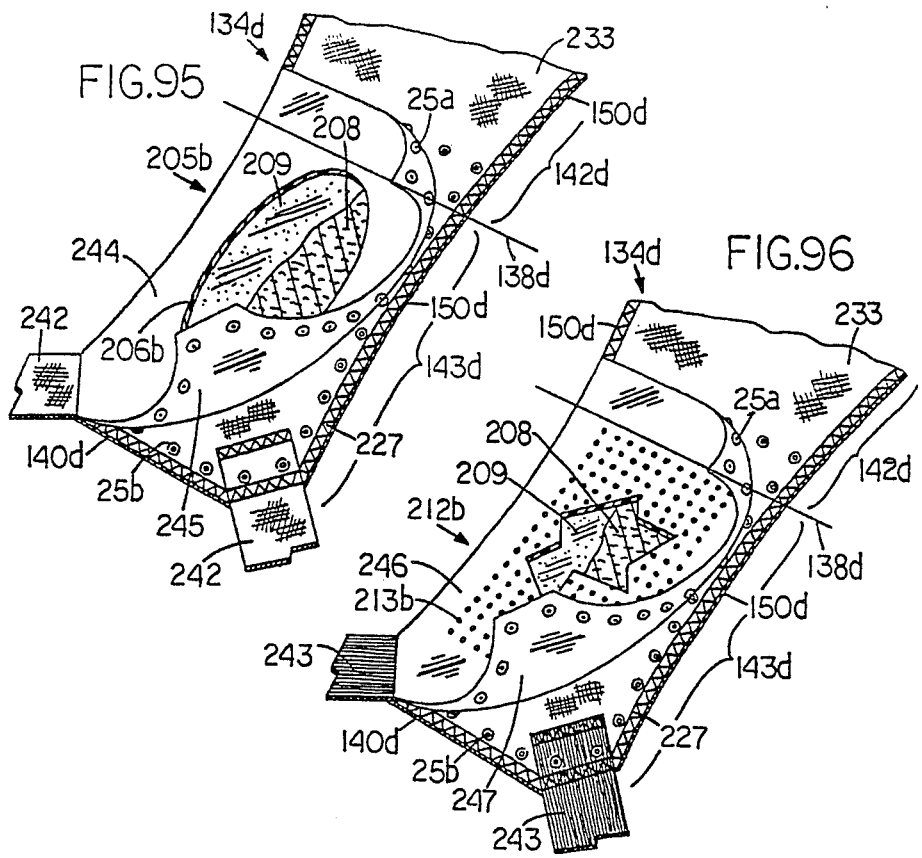
FIG.95 FIG.96
FIG.97 FIG.98 FIG.99 FIG.100
 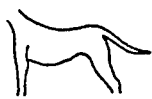  
FIG.101 FIG.102 FIG.103 FIG.104
   

DEVICE WITH POUCHES FOR RECEIVING ANIMAL WASTE

CROSS REFERENCE TO RELATED APPLICATIONS

This application is a continuation in part of applicant's copending U.S. patent application Ser. No. 06/755,263, filed July 15, 1985, now abandoned which is a continuation in part of applicant's U.S. patent application Ser. No. 06/623,222, filed June 21, 1984, now U.S. Pat. No. 4,537,153 which is a continuaton of applicant's U.S. patent application Ser. No. 06/337,712, filed Jan. 7, 1982, and now abandoned.

TECHNICAL FIELD

The present invention relates to receptors comprising portable appliances intended to be used to receive and retain discharge from a body and in particular relates to a new garment designed to be worn on the body by dogs, cats, mammals or the like, provided with pouches for receiving and retaining the discharge of their solid and fluid body wastes respectively, for the purpose of preventing the soiling of outdoor and indoor areas of public places in urban centers, as well as the soiling inside the house or inside laboratory facilities during diverse operations involving the use of mammals.

BACKGROUND OF THE INVENTION

Heretofore, the problem imposed by scattered body waste residuals of dogs, cats, or the like on outdoor and indoor areas of public places in urban centers has not yet been solved. Thereby, sidewalks, curbs, alleyways, parks, lawns and yards are constantly soiled with these residuals, making life miserable for pedestrians, who inadvertently step on the stuff, and for neighbours who find feces on their shrubbery and yards, besides constituting a health hazard, as well as a disgusting sight.

In addition, there are indoor public places which might be subject to the same problem, such as restaurants in countries where pets are allowed inside, or stores, or in the lobbies, elevators or corridors of apartment buildings and hotels, as well as in airport terminals, bus terminals, railroad stations or the like, where dogs are allowed to enter on a leash, also the same problem is encountered when traveling with a dog loose in a car.

Furthermore, in laboratory situations, during diverse operations involving the use of mammals or the like the facilities might also be subject to the same problem. Thus, the problem of scattered residuals of body wastes of dogs, cats, or the like, on public places, has not yet been solved and the usual way for dog owners to approach the problem is taking dogs to the curb to relieve themselves or to pick up the stool with a scooper and then drop the stool over the curb, in spite of cities's laws against this custom, for ecological reasons as well as for cleanliness. Another way of dealing with the problem is to remove the stool with a scooper and to dispose of it in the house. This approach constitutes a nuisance for the owner who has to carry the feces and, in most cases, the cleaning is not carried out leaving the residuals of solerd body wastes untouched with the result of soiled urban centers.

. Another way to approach the problem in some cities is to impose fines on the owners of dogs which foul the pavement. This approach represents an exta expenditure for the owner and above all soiling will keep recurring.

On the other hand, when the same problem is encountered inside the house, the furniture, the rugs, the floor, etc. are soiled and quite often ruined with urine puddles and stool, and the usual ways of dealing with the problem inside the house is by training dogs, cats or the like to perform their bodily function at a predetermined place on a paper or in a litter box. The disadvantage of this approach is that the toilet training on paper at a predetermined place or in a litter box could be a nuisance requiring the time and the attention of the owner at all times, and more often than not without good results, thus adding to the need of constant cleaning, the cost of ruined rugs, upholstery and the like, and the buying of stain removers, deodorizers, or the like. In addition, litter boxes for cats or existing toilets for dogs which do not requrie training still have the inconvenience that they take up space, thus reducing the available space in the house, and also that they need repreated cleanings, besides not being a good sight to have around.

Another way of overcoming this problem inside the house in reference to cats is by making cats share the same bathroom facilities used by humans. The disadvantage of this approach is that it might constitute a health hazard by itself besides being psychologically rejected by some people. On the other hand, the use of the garden by dogs, cats or the like to defecate and urinate requires repeated cleaning of the gardens, and in addition, shrubs could be ruined since repeated wetting with urine will kill plants. Therefore, the lack of a solution to the problem in reference to public places in urban centers and the disadvantages of the abovementioned approaches inside the house, prove the need for new means of solving this problem by preventing the soiling in the first place.

Furthermore, the few known devices which have been proposed to collect the waste products and for disposing the same, have been impractical or ineffective, generally cumbersome and uncomfortable and have interfered with the bodily movements of the animal and particularly with the natural movements of the tail. In addition, the receptacles placed under the tail are ineffective in preventing leakage of wastes outside the receptacle which can be easily displaced with the movements of the tail.

The present invention provides the means to overcome the foregoing problem and to avoid the aforementioned disadvantages of the abovemenioned approaches, offering novel means for preventing the soiling with body wastes residuals of outdoor and indoor areas of public places in urban centers, as well as in the house, laboratory facilities or the like, by providing a new garment to be worn on the body by dogs, cats, mammals or the like, with pouches to receive and retain the discharge of their solid and fluid body wastes respectively, thereby eliminating the problem imposed by scattered body wastes residuals of dogs, cats, mammals or the like, on the abovementioned outdoor and indoor public places in urban centers, as well as in the house or in laboratory facilities. The present invention also provides advantageous novel ways over the aforementioned usual ways, to dispose of body wastes residuals in a neat and clean manner, in addition to saving owners unwanted outing in bad weather and keeping precise hours in which dogs, cats or the like should relieve themselves, i.e. for dogs three or four times a day to defecate after feeding and 10 to 12 times a day to urinate (early in the morning and after each nap), and for cats, also after each feeding, by providing a garment to be worn inside the house as well as outside, at any time of the day or night, with pouches to receive and retain solid and fluid body wastes respectively, thus freeing the owners of dogs, cats, or the like, from being worried about the soiling of their house and valuable and of keeping tiresome time schedules. Another advantage of the present invention is that toilet training is no more needed when using the garment which could be applied all day long or only after feeding or when necessary to be worn inside the house as well as outside. If desired, dogs, cats, or the like, could also be taught, as in any regular training, to associate the use of the garment with relieving themselves by using for example scents or by any other well known methods of training, in which case dogs, cats or the like will relieve themselves only when waaring the garment.

SUMMARY OF THE INVENTION

According to the present invention, there is provided a new garment designed to be worn on the body by dogs, cats, mammals or the like, provided with pouches for receiving and retaining the discharge of their solid and fluid body wastes respectively.

The garment of the present invention has several preferred uses, i.e. as an integral disposable garment, as an integral reusable-washable garment, as an attachable reusable-washable garment. The abovementioned preferred uses of the garment are applicable to all the preferred embodimets of the garment, differing only in that in the attachable reusable-disposable garment as well as in the attachable reusable-washable garment, the disposable pouches as well as the reusable-washable pouches are attachaed with fastening means to the reusable garment when in use, and detached after use to be disposed of or to be washed and reused, respectively, while in the other preferred uses the pouches are permanently affixed to the garment.

The integral disposable garment is preferably made of a flexible moisture impervious opaque polyethylene film of a suitable thickness preferably using two layers, one for the backing layer and one for the facing layer of the garment and pouches alike.

And the integral reusable-washable garment is preferably made of a flexible moisture impervious opaque vinyl polyvinyl chloride (PVC) sheeting for a suitable thickness, preferably using two layers, one for the backing layer and another for the facing layer of the garment and pouches alike.

And in the attachable reusable-disposable garment, the reusable garment is preferably made of a soft fabric such as for example blue jean or cotton, or corduroy or the like, although it could also be made of opaque vinyl sheeting, and the disposable pouches are made of opaque polyethylene film of a suitable thickness, preferably using two layers, one for the backing layer and one for the facing layer of the pouch. While in the attachable reusable-washable garment the reusable garment is analogous to the reusable garment mentioned above and the attachable reusable washable pouches are preferably made of vinyl sheeting using also preferably two layers, one for the backing layer and one for the facing layer of the pouch.

Also, any other similar suitable material may be employed for each one of the abovementioned preferred uses of the garment.

The garment of the present invention in its mos preferred uses may be constructed employing several heat sealing techniques according with the specific plastic utilized. Also, adhesives may be used to bond together the different parts of the garment. Of course, any other equally suitable technique may also be employed.

Specifically, the functions of receiving and retaining the discharge of solid and fluid body wastes of dogs, cats, mammals or the like, are accomplished by a garment —primarily directed in the preferred exemplary embodiment described herein, to be worn by male and female dogs—which in one aspect of the invention to be worn by male or female dogs alike comprises a wearer-contacting garment constituted by distinctive portions which are placed over selected anatomical regions of the wearer, and provided with one pouch located around the root of the tail and the anus of the wearer, having an aperture to receive and retain solid body wastes, and a closed bottom and which in another aspect of the invention to be worn in some preferred embodiments by male dogs and in other preferred embodiments by female dogs, comprises a wearer-contacting garment constituted by distinctive portions which are placed over selected anatomical regions of the wearer, and provided with two pouches, one pouch to receive and retain solid body wastes as mentioned above as well as with one pouch located over and around the genitalia of the wearer, having an absorbent pad positioned therein to receive and retain fluid body wastes. The garment of the present invention in all its preferred embodiments is provided with adjustable straps, which might be plain, elasticized or of an elastic fabric, in several preferred embodiments, to fasten the garment tightly, yet comfortably and securely around the groins, the abdomen and the upper arms of the wearer, in several preferred embodiments, with several preferred fastening means.

In the disposable use of the garment, as well as in the attachable reusable-disposable use of the garment, the pouch to receive and retain solid body wastes is provided, in a preferred embodiment, with attachment means, and in another preferred embodiment, with occludent means, suitably located on the inner surface of the walls of the pouch near the aperture of the pouch and parallel to its edge, in order to close the aperture of the pouch, after removal of the garment, and before discarding the garment in a garbage can. The pouches may also be sealed if desired, with commercially available twist ties or "key-lock" closures before discarding the garment in a garbage can.

The garment of the present invention, in all its preferred embodiments is so constructed, that it is easily placed on the wearer, by leaving the adjustable straps, or in some embodiments, the lower portion of the garment, unattached until the tail of the wearer is secured in the opening for the tail located on the back portion of the garment, with the pouch to receive and retain solid body wastes surrounding the tail, and in the embodiments further comprising a pouch to receive and retain fluid body wastes, until the pouch to receive and retain fluid body wastes is placed surrounding the respective genitalia of the wearer. With the garment in place as described above the adjustable straps, or in some embodiments the lower portion of the garment, provided with fastening means, are fastened to the upper portion of the garment, around the body of the wearer sufficiently tightly, yet comfortably, to prevent leakage outside the pouches of solid or fluid body wastes. In the attachable reusable-disposable use of the garment, as well as in the attachable reusable-washable use of the garment, the pouches are preferably attached to the garment before placing the garment on the body of the wearer to facilitate the application of the garment.

Following use, the garment is removed from the body of the wearer by detaching the adjustable straps, or in some embodiments the lower portion of the garment. Then, in the disposable garment, the pouches to receive and retain solid body wastes are sealed with the attachment or occludent means provided inside the pouch and if desired with commercially available twist ties or "key-lock" closures, before discarding the garment in the garbage can, and in the reusable-washable garment, as well as in the attachable reusable washable garment provided with attachable reusable-washable pouches, the feces are flushed down a water closet and the absorbent pad is removed from the pouch and discarded in the waste baskt, at which point the garment and pouches may be washed and reused.

OBJECTS OF THE INVENTION

Accordingly, it is one of the major objects of the present invention to provide a new garment designed to be worn on the body by dogs, cats, mammals or the like provided with pouches for receiving and retaining the discharge of their solid and fluid body wastes, thereby preventing the soiling of outdoor and indoor areas of public places in urban centers as well as the soiling inside the house, laboratory facilities, or the like.

It is another object of the present invention to provide a garment of the above character which in one example, to be worn by male and female dogs alike, comprises a wearer-contacting garment and one pouch to receive and retain solid body wastes.

It is another object of the present invention to provide a garment of the above character which in another example, to be worn by male and female dogs in different preferred embodiments, comprises a wearer-contacting garment and one pouch to receive and retain solid body wastes as well as one pouch to receive and retain fluid body wastes.

It is another object of the present invention to provide a garment of the above character provided with pouches made of a flexible moisture impervious material to prevent leakage of body wastes.

It is another object of the present invention to provide a garment of the above character having a pouch to receive and retain solid body waste having at least one opening of a size to encompass both the root of the tail and the anal region of the wearer, extending entirely around the periphery defined by the top of the root of the tail in conjunction with the anal region of the wearer.

It is another object of the present invention to provide a pouch which extends in some embodiments a suitable distance along and around the tail in a sleeve-like manner and in other embodiments, adapted to short tails, enclosing the tail completely, thereby avoiding in all embodiments any leakage of wastes outside the pouch due to a possible displacement of the pouch by the movements of the tail or the body of the animal.

It is another object of the present invention to provide a garment of the above character having a pouch to receive and retain solid body waste which adapts to the anatomy of the wearer in order to reach a high degree of comfort.

It is another object of the present invention to provide a garment of the above character having a pouch to receive and retain fluid body wastes provided with an absorbent pad wherein the absorbent pad is positioned to receive and retain the discharge of fluid body wastes.

It is another object of the present invention to provide a garment of the above character having adjustable straps and fastening means mounted thereon to facilitate ready and convenient application of the garment.

It is another object of the present invention to provide a garment of the above character having adjustable straps which in several preferred embodiments are plain, elasticized, or of an elastic fabric so as to permit the garment to vary in size to adapt to the different weights of the wearer, within the same breed.

It is another object of the present invention to provide a garment of the above character wherein the adjustable straps and fastening means secure the garment to the body of the wearer sufficiently tightly around the groins, the abdomen and the upper arms, in several preferred embodiments, to prevent leakage of solid and fluid body wastes outside the pouches.

It is another object of the present invention to provide a garment of the above character which is neat in appearance, easy to apply, simple and light weight in construction, comfortable in use and made in different sizes to fit different breeds of dogs, or the like.

It is another object of the present invention to provide a garment of the above character which in a preferred use, having permanently affixed pouches, is adapted to be disposed of after each use.

It is another object of the present invention to provide a garment of the above character which in another preferred use, having permanently affixed pouches, is adapted to be washable and reusable.

It is another object of the present invention to provide a garment of the above character which in yet other preferred uses is adapted to be a reusable garment with attachable disposable pouches or with attachable reusable washable pouches.

It is another object of the present invention to provide a garment of the above character having pouches adapted to be disposed of, provided in some examples with attachment means and in other examples with occludent means, suitably located on the inner surface of the walls of the pouch to receive and retain solid body wastes, near its opening and parallel to its edge so that the pouch may be sealed before discarding the garment in a garbage can.

It is another object of the present invention to provide a garment of the above character which provides novel ways to dispose of body wastes residuals of dogs, cats, or the like in a neat and clean manner by enclosing solid body wastes residuals inside the plastic pouch, before discarding the disposable garment or the attachable disposable pouches, containing the enclosed residuals, in a garbage can, or by flushing the feces down a water closet when using the reusable-washable garment, or the attachable reusable washable pouches.

It is another object of the present invention to provide a garment of the above character which could be worn outside the house as well as inside the house.

It is another object of the present invention to provide a garment of the above character which prevents the soiling and ruining of costly furnishing inside the house and the soiling of public places in urban centers.

It is another object of the present invention to provide a garment of the above character which frees owners of dogs, cats or the like from being worried about the soiling of their house and valuables and from keeping tiresome time schedules when not possible or desired.

It is another object of the present invention to provide a garment of the above character which avoids the need for unwanted outings in bad weather.

It is another object of the present invention to provide a garment of the above character which does not require toilet training on a predetermined place.

It is another object of the present invention to provide a garment of the above character which in all the preferred uses is simple to construct and mass produce at low cost, and which is highly efficient and attractive.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

FIG. 4 is a fragmentary perspective view of the rear of a male dog illustrating the preferred embodiment of the garment and pouch of FIG. 1, and showing solid body wastes in phantom, falling into the pouch. Also shown in phantom are the openings for the anus and tail, one side of the back portion and a portion of the tail.

FIG. 5 is a perspective view of the preferred embodiment of the garment of FIG. 1, provided with another preferred embodiment of a pouch to receive and retain solid body wastes, in its configuration as applied to a male as well as to a female dog. One of the sides of the back portion and the opening for the anus and tail are shown in phantom.

FIG. 6 is a schematic view of the rear of a male dog illustrating the back portion of the garment without the pouch to show the opening for the anus and tail and the adjustable elasticized straps, around the groins of the male wearer.

FIGS. 7 and 8 are fragmentary schematic views of the underside of a male and of a female dog respectively, illustrating the location of adjustable straps of the preferred embodiment of the garment of FIG. 1 and showing in phantom the location of adjustable straps of the preferred embodimets of the garment of FIGS. 2 and 3. There is also shown the back portion of the garment and the opening for the anus and tail.

FIGS. 9 and 12 are fragmentary plan views of the underside of adjustable elasticized straps respectively provided on one end with a pressure sensitive tape fastener or with eyelets.

FIG. 10 is a plan view of the preferred exemplary embodiment of the garment illustrated in FIG. 3, to be worn by male and female dogs alike.

FIG. 11 is a plan view of another preferred exemplary embodiment of the garment similar to the embodiment illustrated in FIG. 10 but narrower, to be worn by male and female dogs alike.

FIGS. 13, 14 and 15 are fragmentary perspective views of the undersides of the adjustable elasticized straps showing a mode in which the adjustable elasticized straps may be secured to the edges of the disposable garment in several of its preferred embodiments, with a portion of the facing layer broken away in FIGS. 13 and 14.

FIGS. 16 and 17 are fragmentary perspective views of adjustable plain straps respectively provided on one end with a pressure sensitive tape fastener or with eyelets.

FIGS. 18, 19 and 21 are fragmentary perspective views similar to that of FIGS. 13, 14 and 15 of the underside of the adjustable plain straps showing a mode in which the adjustable plain straps may be secured to the edges of the disposable garment in several of its preferred embodiments.

FIGS. 20 and 23 are fragmentary perspective views of the edge of the garment showing modes in which the buckle may be secured to the edge.

FIGS. 22, 24 and 25 are fragmentary perspective views of preferred embodiments of flaps cut at the edge of the garment to secure the buckle to the edge.

FIG. 26 is a fragmentary perspective view of the rear of a male dog similar to FIG. 4, showing the preferred embodiments of FIG. 1 of the garment and of the pouch to receive and retain solid body wastes. One side of the back portion, the opening for the anus and tail, and a portion of the tail are shown in phantom.

FIG. 27 is an enlarged perspective view of the preferred embodiment of the pouch of FIG. 26 in its configuration as applied to a male as well as to a female dog, and showing in phantom strips of adhesive.

FIGS. 28 and 29 are plan views of the preferred embodiment of the pouch of FIGS. 26 and 27 showing a mode in which the pouch may be constructed.

FIG. 30 is a fragmentary perspective view similar to that of FIG. 16 showing another preferred exemplary embodiment of the pouch to receive and retain solid body waste illustrating in phantom an alternate embodiment of the top portion of the pouch.

FIG. 31 is an enlarged perspective view of the preferred embodiment of the pouch of FIG. 30 in its configuration as applied to a male as well as to a female dog and illustrating in phantom an alternate embodiment of the top portion of the pouch and two strips of adhesive.

FIGS. 32 and 33 are plan views of the preferred embodiment of the pouch of FIGS. 30 and 31 showing a mode in which the pouch may be constructed.

FIG. 34 is a fragmentary perspective view similar to that of FIG. 26 showing another preferred embodiment of the pouch to receive and retain solid body waste.

FIG. 35 is an enlarged perspective view of the preferred embodiment of the pouch of FIG. 34 in its configuration as applied to a male as well as to a female dog, showing in phantom strips of adhesive, and further comprising two transversal adjustable straps shown partially in phantom, with one adjustable strap partially loose in phantom.

FIGS. 36 and 37 are plan views of the preferred embodiment of the pouch of FIGS. 34 and 35 showing a mode in which the pouch may be constructed.

FIG. 45 is a fragmentary schematic view of the underside of a male dog illustrating the lower and back portions without the pouches, and the elasticized straps of the preferred embodiment of the garment of FIGS. 42 and 43 (also applicable to the embodiment of FIG. 44). The location of the adjustable straps of the embodiment of FIG. 44 around the upper arms of the wearer are shown in phantom.

FIG. 46 is a plan view of the preferred exemplary embodiment of the garment illustrated in FIG. 44 to be worn by male dogs.

FIG. 47 is a general side view of another preferred exemplary embodiment of the garment similar to the embodiment illustrated in FIG. 44 but narrower, to be worn by male dogs, provided with pouches to receive and retain solid and fluid body wastes respectively, as applied to a male dog.

FIG. 48 is a plan view of the preferred exemplary embodiment of the garment illustrated in FIG. 47, to be worn by male dogs.

FIGS. 49 and 50 are general side views of other preferred exemplary embodiment of the disposable garment to be worn by male dogs provided with preferred embodiments of pouches to receive and retain solid and fluid body wastes respectively, and showing in phantom solid body wastes, the penis and an absortive device.

FIG. 51 is a fragmentary schematic view of the underside of a male dog illustrating the elasticized lower portion and the back portion without the pouches and the adjustable elasticized straps of the preferred embodiment of the garment of FIG. 50, showing the openings for the penis and for the anus and tail of the male wearer. This figure also serves to illustrate the lower and back portions of the embodiment of FIG. 49, although the lower portion is not elasticized in this embodiment.

FIG. 52 is a plan view of the preferred exemplary embodiment of the garment illustrated in FIGS. 50 and 51, to be worn by male dogs.

FIG. 53 is a fragmentary plan vaiew of the underside of the elasticized lower portion with portions of the facing layer broken away. The adjustable elasticized straps joining the back portion to the lower portion are also shown.

FIG. 54 is a general side view of another preferred exemplary embodiment of the garment, similar to the embodiment illustrated in FIG. 50 but narrower, to be worn by male dogs, provided with pouches to receive and retain solid and fluid body wastes respectively, as applied to a male dog.

FIG. 55 is a plan view of the preferred exemplary embodiment of the garment illustrated in FIG. 54, to be worn by male dogs.

FIGS. 56, 57 and 58 are general side views of other preferred exemplary embodiment of the garment provided with pouches to receive and retain solid and fluid body wastes respectively, to be worn by female dogs. The pouch to receive and retain fluid body wastes is not shown.

FIG. 59 is a plan view of the preferred exemplary embodiment of the garment illustrated in FIG. 58, to be worn by female dogs.

FIG. 60 is a fragmentary schematic view of the underside of a female dog illustrating the lower and back portions without the pouches and the adjustable plain straps of the preferred embodiment of FIG. 56, showing the opening for the vulva and for the anus and tail of the wearer. The location of the adjustable straps of the embodiment of FIGS. 57 and 58 are shown in phantom.

FIG. 61 is a general side view of another preferred exemplary embodiment of the garment similar to the embodiment illustrated in FIG. 58, but narrower, to be worn by female dogs, provided with pouches to receive and retain solid and fluid body wastes respectively, as applied to a female dog. The pouch to receive and retain fluid body waste is not shown.

FIG. 62 is a plan view of the preferred exemplary embodiment of the garment illustrated in FIG. 61, to be worn by female dogs.

FIGS. 63, 64 and 65 are general side views of other preferred exemplary embodiments of the garment to be worn by female dogs provided with pouches to receive and retain solid and fluid body wastes respectively. The pouch to receive and retain fluid body wastes is not shown.

FIG. 66 is a plan view of the preferred exemplary embodiment of the garment illustrated in FIG. 65, to be worn by female dogs.

FIG. 67 is a fragmentary schematic view of the underside of a female dog illustrating the lower and back portions without the pouches. The location of the adjustable straps of the embodiments of FIGS. 64 and 65 are shown in phantom.

FIG. 68 is a general side view of another preferred exemplary embodiment of the garment similar to the embodiment illustrated in FIG. 65, but narrower, to be worn by female dogs, provided with pouches to receive and retain solid and fluid body wastes respectively, as applied to a female dog. The pouch to receive and retain fluid body wastes is not shown.

FIG. 69 is a plan view of the preferred exemplary embodiment of the garment illustrated in FIG. 68, to be worn by female dogs.

FIG. 70 is a perspective view of a preferred embodiment of a pouch to receive and retain fluid body wastes, to be worn by male dogs, with parts of the pouch broken away.

FIG. 71 is a perspective view of a cross section of the preferred embodiment of a pouch illustrated in FIG. 70 taken along section lines 71—71 of FIG. 70.

FIG. 72 is a perspective view of another preferred embodiment of a pouch to receive and retain fluid body wastes, to be worn by male dogs, with parts of the pouch broken away, and an absorbent pad shown partially in phantom.

FIG. 73 is a plan view of the preferred embodiment of the pouch of FIG. 72 showing a mode in which the pouch may be constructed.

FIG. 74 is a perspective view of another preferred embodiment of a pouch to receive and retain fluid body wastes, to be worn by female dogs, with parts of the pouch broken away.

FIG. 75 is a perspective view of a transverse cross section of the preferred embodiment of a pouch illustrated in FIG. 74 taken along section lines 75—75 of FIG. 74, showing a further modification of the embodiment.

FIG. 76 is a perspective view of a cross section of the preferred embodrment of the pouch illustrated in FIG. 75.

FIGS. 77, 78 and 79 are fragmentary perspective views of the lower portion of the preferred embodiment of the garment of FIG. 59, illustrating preferred exemplary embodiments of a pouch to receive and retain fluid body wastes, to be worn by female dogs and showing a partially inserted absorbent pad with parts of the tissue paper broken away.

FIGS. 80 and 82 are plan views of the lower portion of the preferred embodiments of the garment of FIGS. 66 and 69 respectively, illustrating preferred exemplary embodiments of a pouch to receive and retain fluid body wastes of FIGS. 79 and 78.

FIG. 81 is a fragmentary perspective view of the rear of a male dog showing another preferred embodiment of the garment similar to that of FIG. 1 illustrating a reusable-washable embodiment provided with adjustable elastic fabric straps.

FIG. 83 is a fragmentary perspective view of a male dog showing another embodiment of the garment similar to that of FIG. 44 illustrating a reusable-washable embodiment provided with the preferred embodiment of adjustable elastic fabric straps of FIG. 81.

FIGS. 84, 85 and 86 are fragmentary perspective views of the adjustable plain and adjustable elastic fabric straps respectively, showing modes in which the adjustable straps may be secured to the edges of the reusable-washable garment.

FIG. 87 is a perspective view of another preferred embodiment of the garment similar to that of FIG. 1 and of another preferred embodiment of a pouch to receive and retain solid body wastes, similar to that of FIG. 35, illustrating an attachable reusable-disposable embodiment, configured as applied to a male as well as to a female dog, and showing the provision of fastening means to attach the attachable disposable pouch to the back portion of the reusable garment, along the opening for the anus and tail.

FIG. 88 is a perspective view of another preferred embodiment of the garment similar to that of FIG. 56 and of other preferred embodiments of pouches to receive and retain solid and fluid body wastes, similar to that of FIGS. 27 and 74 respectively, illustrating an attachable reusable-disposable embodiment showing the provisions of fastening means to attach the attachable disposable pouches to the back and lower portions of the reusable garment along the openings for the anus and tail, and vulva of the female wearer.

FIG.-89 is a fragmentary perspective view showing one mode of securing an elastic fabric eyelet within the hem of the garment.

FIGS. 90 and 91 are fragmentary perspective views of the adjustable plain strap and of the adjustable elastic fabric strap respectively, showing modes in which the adjustable straps may be secured to the edges of a reusable-washable garment.

FIGS. 92, 93 and 94 are fragmentary perspective views of other preferred embodiments of the pouch to receive and retain fluid body wastes similar to that of FIGS. 77, 78 and 79, illustrating a reusable-washable embodiment of the pouch with parts of the pouch broken away in FIG. 93 to show the securement of the adjustable straps.

FIGS. 95 and 96 are fragmentary perspective views of other preferred embodiments of the pouch to receive and retain fluid body wastes, similar to that of FIGS. 92 and 94, illustrating attachable disposable pouches.

FIGS. 97 to 108 are fragmentary schematic side views of the different types of backs and tails of different breeds of dogs.

DETAILED DESCRIPTION OF THE PREFERRED EMBODIMENTS

Figure 1:
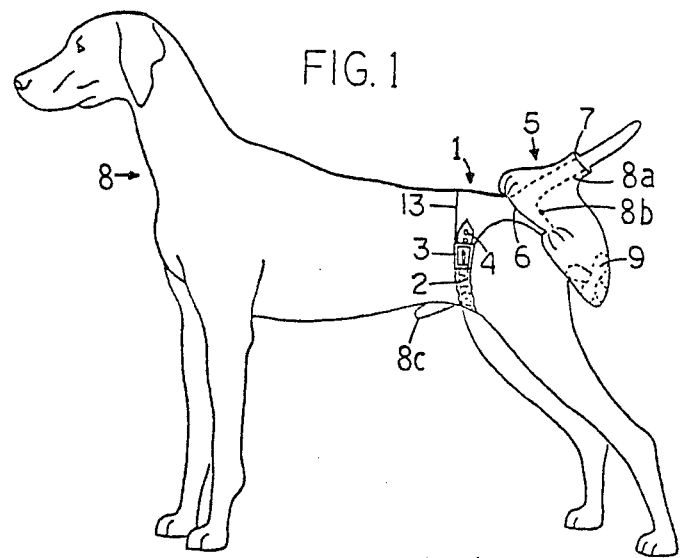
FIGS. 1, 2 and 3 are general side views of some of the preferred exemplary embodiments of the disposable garment to be worn by male and female dogs alike, provided with some of the preferred exemplary embodiments of a pouch to receive and retain solid body wastes (solid body wastes are shown in phantom). These figures illustrate the garment as applied to a male dog.

While this invention is susceptible of embodiment in many different forms, there is shown in the drawings and will herein be described in detail, preferred embodiments of the invention and modifications thereof, with the understanding that the present disclosure is to be considered as an exemplification of the principles of the invention, and is not 10 intended to limit the invention to the embodiments illustrated. The scope of the invention will be pointed out in the appended claims.

The discussion that follows is primarily directed to the use of the invention as a garment to be worn by male and 15 female dogs alike. While this is contemplated as being a prefereared use, it should be understood that the garment of the present invention may also be adapted to be worn by cats and other mammals or the like, as it is hereinafter shown in an example given of a mode, in which the garment of the 20 present invention may be adapted to be worn by cats. Thus, the detailed description of the garment and pouches, as well as the detailed description of its preferred uses as a disposable, or as a reusable-washable or as an attachable reusable-disposable, or as an attachable reusable-washable 25 garment, will allow anyone skilled in the art to readily adapt the invention to the requirements imposed by different wearers.

The garment of the present invention to be worn by male and female dogs in the preferred embodiments described herein, has several preferred uses, i.e. as an integral disposable garment, as an integral reusable-washable garment, as an attachable reusable-disposable garment, and as an attachable reusable-washable garment. The abovementioned preferred uses of the garment are applicable to all the preferred embodiments of the garment differing only in that in the attachable reusable-disposable garment, as well as in the attachable reusable-washable garment, the disposable pouches, as well as the reusable-washable pouches, are attached with fastening means to the reusable garment when in use, and detached after use to be disposed of, or to be washed and reused respectively, while in the other preferred uses, the pouches are permanently affixed to the garment.

The integral disposable garment is preferably made of a flexible moisture impervious opaque polyethylene film, preferably matte and smooth or embossed with a fine pattern to provide a textile-like texture to the garment, of a suitable thickness preferably not less than 4 mils. The garment as well as the pouches are formed in a preferred embodiment preferably using two layers of polyethylene film, one for the backing layer and one for the facing layer, totalling a suitable thickness preferably not less than 8 mils, and in another preferred embodiment, the garment as well as the pouches are formed using one layer of polyethylene film for the backing layer and a soft moisture pervious porous nonwoven bonded fibrous web for the facing layer, of a suitable thickness preferably not less than 4 mils, totalling a suitable thickness preferably not less than 8 mils.

And the integral reusable-washable garment is preferably made of a flexible moisture impervious opaque vinyl, polyvinyl chloride (PVC) sheeting, preferably matte and smooth or embossed with a fine pattern to provide a textile-like texture to the garment, and preferably approximately between about 4 mils to 8 mils thick. The garment as well as the pouches are formed preferably using two layers, one for the backing layer and one for the facing layer of vinyl sheeting, totalling a thickness preferably of approximately between about 8 to 16 mils.

And in the attachable reusable-disposable garment, the reusable garment is preferably made of a soft fabric such as for example blue jean or cotton or corduroy or the like, although it may also be made of opaque vinyl sheeting, preferable matte and smooth or embossed with a fine pattern to provide a textile-like texture to the garment, and the attachable disposable pouches are preferably made of opaque polyethylene film and are formed in a like manner as for the integral disposable garment.

While in the attachable reusable-washable garment the reusable garment is analogous to the reusable garment mentioned above and the attachable reusable-washable pouches are preferably made of vinyl sheeting. Also, other suitable materials may be employed, for each one of the above mentioned preferred uses of the garment.

The garment of the present invention in its most preferred uses may be constructed employing several heat sealing techniques according with the specific plastic utilized, such as for example non-high frequency thermal sealing may be employed when using polyethylene film or HF Techniques may be employed when using sheets of soft polyvinyl chloride (PVC). Also adhesives well known to those of ordinary skill in the art, such as for example, double sided pressure sensitive adhesive tapes, hot melt glues, or other adhesives may be used to bond the different parts of the garment together. In addition, heat sealing techniques and adhesives could be used in association to bond together different features. Of course, any other equally suitable technique may also be employed.

The dimensions of the garment of the present invention should be adapted to fit the different sizes imposed by different breeds of dogs, therefore there is intended a big size as well as a medium size and several small sizes of the garment to be worn by tall, middle, short, little and shrimpy breeds of dogs.

In addition, the garment is provided with adjustable straps to permit the garment to vary in size, to adapt to the different weights of the wearer within the same breed. Thus, in the preferred exemplary embodiments described herein and shown in the drawings, there are no given specific dimensions, since these are relative to the different breeds, thereby the portions of the garment are illustrated and described in relation with the different anatomical regions, which they covered, being this the unchangeable factor, while the sizes are relative to the different breeds.

All of the preferred embodiments of the garment and pouches may be worn by any breed of dogs, although some preferred embodiments of the garment as well as some preferred embodiments of the pouches are particularly suitable for some breeds more than for other, due to specific characteristics, such as types of back, setting of the tail and manner of carrying the tail as well as different types of tail, and long or docked tails. This will be pointed out later on, during the description of the embodiments.

Figure 109:
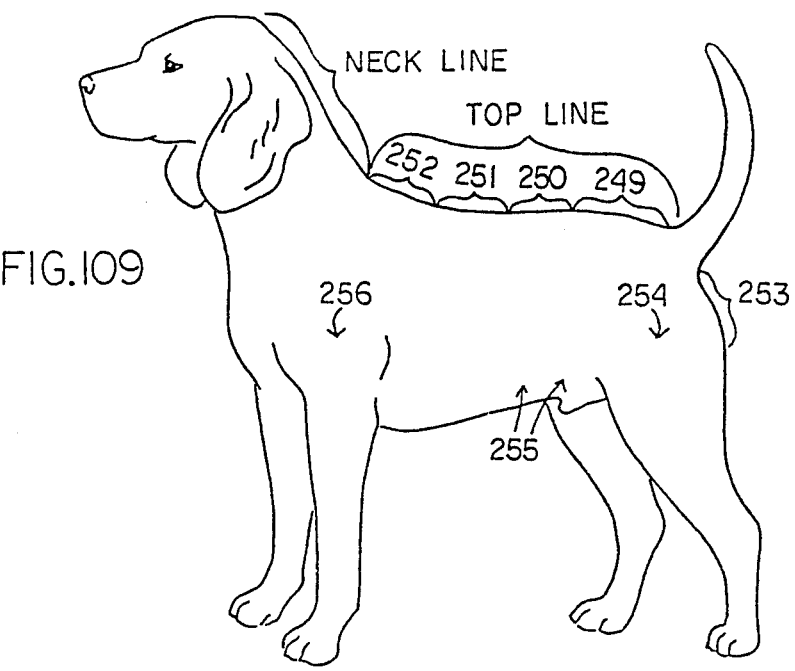
FIG. 109 is a general view of a dog showing the different anatomical regions.

The anatomical regions of the male and female dogs referred to herein, covered by the portions of the garment, as well as the different types of backs and tails are illustrated in FIG. 109 and in FIGS. 97 to 99 and FIGS. 100 to 108 respectively.

In one aspect, the present invention comprises, in several preferred embidments, a garment provided with one pouch to receive and retain solid body wastes, to be worn by male and female dogs alike (FIGS. 1, 2 and 3) and in another aspect the present invention comprises a garment provided with two pouches, one pouch to receive and retain solid body wastes as well as with one pouch to receive and retain fluid body wastes, which in some preferred embodiments is to be worn by male dogs (FIGS. 42, 43, 44, 47, 49, 50 and 54) and in other preferred embodiments is to be worn by female dogs (FIGS. 56, 57, 58, 61, 63, 64, 65 and 68).

To illustrate the preferred exemplary embodiments of the wearer-contacting garment as well as the preferred exemplary embodiments of the pouches, dogs having long tails carried up or down or having short docked tails have been chosen. Reference to other types of tails and backs of dogs are made in the detailed description of the invention to point out the suitability of the different embodiments to these anatomical features.

Figure 2:
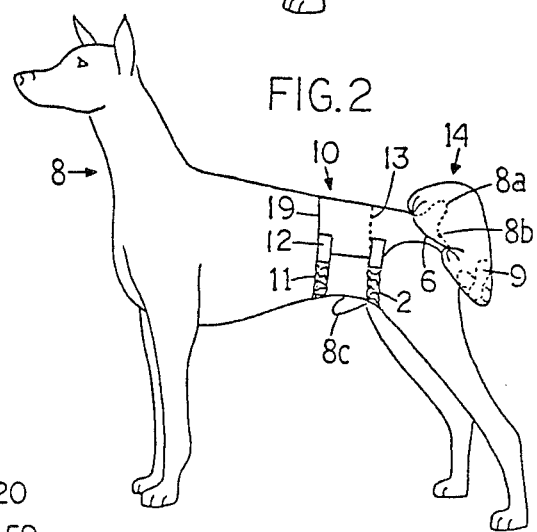
Figure 3:
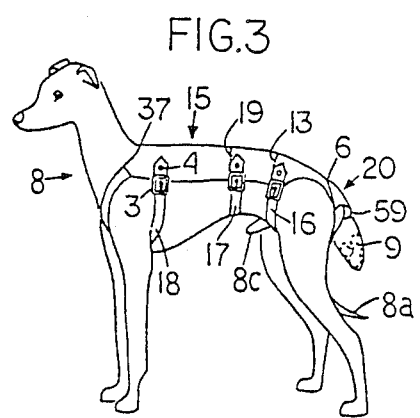

Referring now to FIGS. 1, 2 and 3, these general views illustrate the preferred embodiments 1, 10 and 15 of the garment provided with one pouch to receive and retain solid body wastes, as adapted to the disposable use and applied to a male dog 8. There are also shown some of the preferred embodiments of the pouch to receive and retain solid body wastes, namely the embodiments 5, 14 and 20 which will be described later. FIGS. 1, 2 and 3 also show in phantom the confinement of solid body wastes 9, while FIG. 4 illustrates in phantom solid body wastes 9 filling into the pouch during the act of excreting.

Any one of the preferred embodiments 1, 10 and 15 of the garment may be used in association with any one of the preferred embodiments 5, 14, 20 or 22 of FIGS. 34 and 35 of the pouch to receive and retain solid body wastes.

In a like manner any one of the preferred embodiments of adjustable straps, i.e. adjustable plain or elasticized straps and any one of the preferred embodiment of fastening means, i. e. a pressure sensitive tape fastener 12 or a buckle 3, may be applied to any one of the embodiments 1, 10 and 15 of the garment adapted to be disposed of. The embodiments 1, 10 and 15 comprise a wearer-contacting garment and one pouch, integrally affixed to the garment, and which is not in contact with the body of the wearer except around the tail.

Basically, the wearer-contacting garment in the preferred embodiments 1, 10 and 15 is of the shape best seen in FIG. 10 and comprises an upper portion 36 (FIG. 10) which is placed over the top line of the wearer. The term "top line" as used herein shall include all or any one of the anatomical regions that are located on the top of the body of the wearer and extending from the root of the tail up to the root of the neck, and being opposite to the underside of the body of the wearer (see FIG. 109). The wearer-contacting garment comprises also a back portion 26 (FIG. 10) which is placed over the buttocks (see FIG. 6), extending backwards a suitable length. The same reference numerals are used to designate the upper portion as well as the back portion of the garment in the most preferred embodiments 1, 10 and 15 respectively, since the upper portion is similar in these embodiments, except for its length along the top line of the wearer, while the back portion is analogous in the abovementioned embodiments. On the other hand, the front end of the upper portion in each embodiment is designated with a different numeral and indicated by dotted lines, to show the different length of the upper portion in the different embodiments. The upper portion 36 as well as the back portion 26 will be described in detail in reference to FIG. 10.

In the embodiment 1 of FIG. 1 the upper portion 36 is placed generally over the croup 249 of the wearer, see FIG. 109 for the anatomical regions. In the embodiment 10 of FIG. 2 the upper portion 36 is placed generally over the croup 249 and the loin 250, with dotted lines 13 indicating the front end 13 of the upper portion 36 on the top line of the wearer in the embodiment 1. And in the embodiment 15 of FIG. 3 the upper portion 36 is placed generally over the croup 249, the loin 250, the back 251 and the withers 252, i.e., over the complete top line of the wearer, with dotted lines 13 and 19 indicating the front ends 13 and 19 of the upper portion 36 on the top line of the wearer in the embodiments 1 and 10 respectively. In the preferred embodiments 1, 10 and 15 the back portion 26 of the wearer-contacting garment, which is placed over the buttocks 253 of the wearer, has a generally circular hole 27 (FIG. 10) defined therein, immediately below the upper portion 36, of a size to provide adequate room for the root of the tail and the anus of the wearer. The pouch to receive and retain solid body wastes is provided in the preferred embodiments 5 (FIGS. 26 and 27), 20 (FIGS. 30 and 31), and 22 (FIGS. 34 and 35) to be worn by dogs with long tails, with a generally circular lower hole for the root of the tail and the anus, as well as with a generally circular upper hole for the tail to come out from the pouch, while in the preferred embodiment 14 (FIGS. 38 and 39) to be worn by dogs with short or docked tails, the pouch is provided only with the lower hole. The lower hole of the pouch in all the preferred embodiments 5, 20, 22 and 14 is of a size corresponding to the size of the generally circular hole 27 located on the back portion 26 of the garment, in order to be aligned with it, when the pouch is affixed at 6 (FIGS. 1, 2 and 3), on the outer surface of the back portion 26, along the periphery of its hole to the periphery of the hole 27 located on the back portion of the garment, preferably using heat sealing, although adhesive or the like may also be employed. The preferred embodiments 5, 20, 22 and 14 of the pouch to receive and retain solid body wastes, as well as the portions of the wearer-contacting garment, will be described later in more detail.

Referring now to the number of adjustable straps and their location around the body of the wearer in the preferred embodiments 1, 10 and 15 of FIGS. 1, 2 and 3 (see also FIGS. 7 and 8) in the preferred embodiment 1 (of FIG. 1), the garment comprises two adjustable straps that pass over the groins and surround the upper thighs 254 of the wearer, defining hind legs openings when fastened to the upper portion 36, while in the preferred embodiment 10 of FIG. 2 the garment has three adjustable straps two around the groins and upper thighs 254, and one that passes over the abdomen 255 of the wearer defining a belly-band to fit the garment to the body of the wearer, and in the preferred embodiment 15 of FIG. 3, the garment is provided with five adjustable straps, two around the groins and upper thighs 254, one around the abdomen 255 and two that pass around the upper arms 256 of the wearer, defining forelegs openings when fastened to the upper portion 36.

The embodiments 1 and 10 are particularly suitable to be worn by dogs with straight loin 250 and croup 249 (see FIGS. 1 and 2), or with sway back (see FIG. 98) or with backs higher at croup 249 than at withers 252 (see FIG. 99), and the embodiment 15 is particularly suitable to be worn by dogs with roach back (see FIG. 97) like the Italian Greyhound or the like (see also FIG. 3), or in general by dogs with a sloping loin 250 and croup 249, or croup 249.

It should be noted however, that by virtue of the differences imposed by the different breeds, in reference to the length of each of the abovementioned anatomical regions, the front end 19 of the upper portion 36 in the embodiment 10, although generally coinciding with the end of the loin region, when convenient it may be suitably extended a little over the back region in order to exert a better hold in breeds having a short or arched or sloping loin. In a like manner, the adjustable strap that passes over the abdomen, defining a bellyband in the embodiment 10 as well as in the embodiment 15 could also be moved on the upper portion slightly forward, toward the back region of the wearer, whenever convenient. This remark is also applicable to the embodiments of the garment which will be hereinafter described and which front ends are equal to the front end 19 of the embodiment 10 and also to the adjustable straps which in those embodiments pass over the abdomen of the wearer.

In all the preferred embodiments of the garment of the present invention, different numerals have been used to designate the adjustable straps according with their location around the body of the wearer, in each of the preferred embodiments of adjustable straps.

As stated earlier, each of the preferred embodimetns 1, 10 and 15 of the garment adapted to be disposed of, is provided with any one of the preferred embodiments of adjustable straps and fastening means. FIG. 1 illustrates the preferred adjustable elasticized straps 2 that surround the groins and upper thighs of the wearer, provided with eyelets 4, placed at the free end of the strap, to be engaged to a buckle 3 which is secured to the lateral edges of the upper portion 36 of the garment (see also FIG. 11). FIG. 2 shows the adjustable elasticized straps 2 and the adjustable elasticized strap 11 which surrounds the abdomen of the wearer, provided with a pressure sensitive tape fastener 12 placed at the free end of the strap and fastened to the lateral edges of the upper portion 36 (see also FIG. 10). And FIG. 3 illustrates the preferred adjustable plain straps 16, 17 and 18 surrounding respectively the groins and upper thighs 254, the abdomen 255 and the upper arms 256 of the wearer provided with eyelets 4 to be engaged with a buckle 3 to the upper portion 36 of the garment. Also FIG. 5 illustrates the adjustable plain strap 16 and the embodiment 1 of the garment in its configuration as applied to the wearer showing another preferred embodiment 22 of the pouch to receive and retain solid body wastes. FIGS. 7 and 8 show the underside of a male dog 8 and a female dog 29 respectively, illustrating the location of the adjustable elasticized and plain straps of the preferred embodiments 1, 10 and 15, with the location of the straps of the embodiments 10 and 15 shown in phantom. There is also shown the relationship of the back portion 26 as well as the location of the straps, to the anatomical parts of the male dog 8 (tail 8a, anus 8b, testicles 8d and penis 8c) and female dog 29 (tail 29a, anus 29b, and vulva 29c).

Turning now to FIG. 10, this plan view illustrates the preferred embodiment 15 of the garment of FIG. 3 showing a longitudinal center line 34 and a lateral line 35. The upper portion 36 is that part of the garment from the lateral line 35 to the front end 37 of the garment. The back portion 26 is that part of the garment from the lateral line 35 to the back end 38 of the garment. Dotted lines 13 and 19 indicate the front ends 13 and 19 of the upper portion 36 of the top line of the wearer in the embodiments 1 (FIG. 1) and 10 (FIG. 2) respectively, since it was deemed unnecessary to show the plan view of the embodiments 1 and 10 in separate figures. In the embodiments 1, 10 and 15 the upper portion 36 has a suitable width so as to cover the top line of the wearer extending laterally generally half way over the sides of the body of the wearer. Thus, the upper portion 36 is wider than the back portion 26, and is preferably provided with darts 21 immediately abobe the back portion 26, in order to adapt the fitting of the upper portion to the different croups of the different breeds of dogs. An it has been mentioned before, the upper portion 36 in the preferred embodiment 1 (FIG. 1) is placed generally over the croup 249, while in the embodiment 10 (FIG. 2) it is placed generally over the croup 249 and the loin 250, and in the embodiment 15 (FIGS. 3 and 10) it is placed generally over the croup 249, the loin 250, the back 251 and the withers 252, i.e. over the complete top line of the wearer. The back portion 26 is placed over the buttocks 253 and has a suitable width, extending backwards a suitable length, as needed in order to serve as support for the adjustable straps, which are secured at both ends of the back end 38 of the garment. As stated before, the back portion 26 has a generally circular hole 27 defined therein immediately below the lateral line 35, of a size to provide adequate room for the root of the tail and the anus of the wearer. The lateral edges 39 of the back portion 26 are generally linear and the back portion 26 gets suitably narrower from the lateral line 35 towards the back end 38. The lateral edges 39 of the upper portion 36 are linear along the area of the upper portion 36 which is placed generally over the loin 250, the back 251 and the withers 252, on the top line of the wearer, while the lateral edges 39 are curvilinear and inwardly directed toward the longitudinal center line 34 along the area of the upper portion 36 which is placed generally over the croup 249. Thus, the lateral edges 39 are incurved above the upper thighs 254 of the wearer. In the embodiment 1 of FIG. 1 the lateral edges 39 of the upper portion 36 are incurved except for a small linear lateral edges immediately below the front end 13, which serve as support for the engagement of the adjustable straps to the upper portion 36. The area of the upper portion 36 having linear lateral edges 39 is wider than the area having curvilinear lateral edges 39. This wider area of the upper portion 36 is placed over the top line and extends laterally generally half way over the sides of the body of the wearer, as previously mentioned. The front end 37 of the embodiment 15 of the garment is generally curved inwards to surround the neck of the wearer while the front end 19 of the embodiment 10 which is placed generally between the loin 250 and the back 251 on the top line of the wearer, and the front end 13 of the embodiment a which is placed generally beetween the croup and the loin on the top line of the wearer, are generally linear, as well as the back end 38. The preferred embodiment 15 shown in FIG. 10 is provided with adjustable elasticized straps 2, 11 and 28 having at their free ends a pressure sensitive tape fastener 12. The adjustable elasticized straps 2 that surround the groins of the wearer in all the preferred embodiments 1, 10 and 15, are located as mentioned earlier, at both ends of the back end 38, to be engaged to the upper portion 36 at the small linear lateral edges 39, located immediately below the front end 13 and at the equivalent location for all the abovementioned embodiments alike, while the adjustable elasticized strap 11 that surrounds the abdomen of the wearer in the embodiments 10 and 15 is located immediately below the front end 19 in the embodiment 10 and at the equivalent location in the embodiment 15. And the adjustable elasticized straps 28 that surround the upper arms of the wearer in the embodiment 15 are located at the corners formed by the front end 37 with the lateral edges 39. The same location applies to the preferred embodiments of adjustable plain straps. The adjustable elasticized or plain straps should have a suitable width to be comfortable to the wearer while affording a sufficiently tight fitting of the garment around the body of the wearer to prevent any leakage of solid body wastes outside the pouch.

FIG. 11 illustrates another preferred exemplary embodiment of the garment to be worn by male and female dogs alike, similar to the embodiment illustrated in FIG. 10 but with narrower upper and back portions and longer adjustable straps to compensate for the difference in width so that similar reference numerals, accompanied by a letter, to indicate the aforementionee differences, are used to designate those elements in FIG. 11 which correspond with those in FIG. 10. Thus, the preferred embodiment 15a comprises, as the previous embodiment 15, an upper portion 36a and a back portion 26a which extend over the same anatomical regions of the wearer, as the ones described in embodiment 15. The lateral edges 39a of the upper portion 36a, as well as the lateral edges 39a of the back portion 26a are relatively linear. The upper portion 36a is slightly wider than the back portion 26a, thereby starting at the front end 37a the upper portion 36a gets gradually narrower towards the back portion 26a and from the lateral line 35a the back portion 26a gets gradually narrower towards the back end 38a, being the widest area of the garment at the corners formed by the incurved front end 37a with the lateral edges 39a, and the narrowest area of the garment at the back end 38a. Thus, the widest area is placed generally over the withers on the top line of the wearer and the narrowest area is placed over the buttocks of the wearer. In the embodiment 15a, the upper portion 36a has a suitable width in all its extension up to the front end 37a, not greater than required to cover only the top of the croup, loin, back and wither regions of the werarer, i.e. without extending laterally over the sides of the body of the wearer as in the embodiment 15. The adjustable elasticized or plain straps are longer in this embodiment 15a than in the embodiment 15, to compensate for the narrower upp-er portion 36a. On the other hand, the location of the adjustable elasticized straps as well as of the adjustable plain straps in this embodiment 15a is the same as described for the embodiment 15. There is shown in FIG. 11 adjustable elasticized straps provided at their free ends with eyelets 4 to be engaged with a buckle 3 secured to the lateral edges 39a of the garment. Dotted lines 13a and 19a indicate the front ends 13a and 19a on the upper portion 36a, on the top line of the wearer, which correspond to the embodiments 1a and 10a of the garment, which are similar to the embodiments 1 and 10 but with narrower upper and back portions. The embodiments 1a and 10a are illustrated in the plan view of the embodiment 15a by virtue of the dotted lines 13a and 19a and thereby not shown in separate figures.

The preferred embodiments 1, 10 and 15 as well as 1a, 10a and 15a of the garment adapted to the disposable use, have a backing layer and a facing layer which in a preferred embodiment are both of polyethylene film and in another embodiment the backing layer is of polyethylene film and the facing layer is of a non-woven fibrous web. Thus, in a preferred embodiment the backing layer 32 (FIG. 10) and 32a (FIG. 11) and the facing layer 42 (FIG. 11) are both made of a flexible moisture impermeable opaque polyethylene film. The polyethylene film as stated earlier may be smooth or may be embossed with a fine pattern to provide a textile-like texture to the garment and being of a suitable thickness preferably not less than 4 mils, using one layer of polyethylene film for the backing layer and one layer of polyethylene film for the facing layer totalling a suitable thickness preferably of not less than 8 mils. It is preferred that the opaque polyethylene film used for the backing as well as for the facing layers be of suitable colors, although if desired it could also be white In another preferred embodiment the backing layer 32 (FIG. 10) and 32a (FIG. 11) is made of polyethylene film as described above and the facing layer 30 (FIG. 10) is made of a suitable soft porous non-woven bonded fibrous web of a suitable weight and of a thickness preferably not less than 4 mils, thus totalling a thickness preferably not less than 8 mils. For example, the web may comprise polyester fibers and rayon fibers, and a binder The web is preferably carded, saturated with binder solution, dried and cured by means well known to those skilled in the art. The backing layer and facing layer described above also apply to the preferred embodiments 5, 20, 22 and 14 of the pouch to receive and retain solid body wastes, although it is not illustrated, i.e., the pouch is formed in a preferred embodiment with two layers of polyethylene film, one layer for the backing layer and one layer for the facing layer, and in another preferred embodiment the pouch is formed with one layer of polyethylene film for the backing layer and one layer of a non-woven fibrous web for the facing layer The backing layers 32 and 32a and the facing layers 30 or 42 that form the preferred embodiments 1, 10 and 15 or 1a, 10a and 15a of the garment as well as of the preferred embodiments 5, 20, 22 and 14 of the pouch, whether they are both of polyethylene film, or of polyethylene film and of a non-woven bonded fibrous web, respectively, they are superposed and coextensive in dimension throughout the entire interface between them and are bonded to each other preferably by heat sealing or if desired by an adhesive or the like and preferably over the entire interface between them as well as along their periphery.

While the adjustable straps, whether being elastcized or plain, are secured to the garment, in the preferred embodiments 1, 10 and 15 as well as in the preferred embodiments 1a, 10a and 15a, shown in FIGS. 10 and 11 respectively at the previously described locations, by sandwiching one end of the adjustable straps which extends beyond the margins of the garment, between the backing layer and the facing layer (See FIGS. 13 to 15 and 18, 19 and 21) and preferably heat sealing the adjustable straps at 40 to the margins of the garment or if desired bonding them to the margin of the garment with adhesives or the like.

Referring now to FIGS. 9 and 12 these figures illustrate a fragmentary plan view of the underside of the adjustable elasticized straps comprising a backing layer 32b made of the previously described polyethylene film used for the garment, an elastic member 31 for the purpose of providing an elasticized contractable adjustable strap, and a facing layer 42a (FIG. 9) made in a preferred embodiment of the abovementioned polyethylene film or a facing layer 30a (FIG. 12) made in another preferred embodiment of the previously described soft porous non-woven bonded fibrous web used for the facing layer 30 (FIG. 10) of the garment. In addition, the adjustable elasticized straps are provided on their free end in a preferred embodiment shown in FIG. 9 with a fastening tape 12 or, in another preferred embodiment shown in FIG. 12, with a plurality of metal or plastic rimmed eyelets affixed to the free end of the adjustable strap by inserting them by pressure, or by any other suitable way. The adjustable elasticized straps comprising a backing layer and a facing layer, both made of polyethylene film, are best used im association with the preferred embodiment of the garment also comprising a backing layer and a facing layer made of the same polyethylene film. In a like manner, the adjustable elasticized straps comprising a backing layer of polyethylene film and a facing layer made of a nonwoven bonded fibrous web are best used in association with the preferred embodiment of the garment also comprising similar backing and facing layers.

The fastening tape 12 shown in FIG. 9 can be any of those well known to those skilled in the art, such as the fastening tape disclosed in U.S. Pat. No. 3,646,937 issued to Gellert on Mar. 7, 1972. The fastening tapes 12 have a fixed end secured to the free end of the adjustable elasticized straps and a free end wherein the adhesive surface 12b, illustrated in FIG. 16, is covered with a facing layer 12a. The facing layer 12a is removed to expose the adhesive surface when the garment is applied to the body of the wearer and the free end of the fastening tape 12 is secured to the lateral edges 39 of the upper portion of the garment as illustrated in FIG. 10 with the adjustable elasticized straps 28. The same applies to the preferred embodiment 15a (also 1a and 10a) of FIG. 11.

The elastic member 31 is sandwiched between the backing layer 32b and the facing layer 42a or 30a of the adjustable strap and is operatively associated with the adjustable strap in an elastically contractable condition so that in a normally unrestrained configuration, the elastic member 31 effectively contracts or gathers the adjustable strap material, therefore providing an elasticized contractable adjustable strap with contractable lateral edges 33. The elastic member 31 can be operatively associated with the adjustable strap in an elastically contractable condition in at least two ways, i.e. stretch the elastic member to its stretched condition and fix it to the adjustable strap while the adjustable strap is in an uncontracted or stretched condition, or contract the adjustable strap—for example, by pleating it—and fix the elastic member to the contracted adjustable strap while the elastic member is in its relaxed or unstretched condition. The elastic member 31 should have a suitable tensional force in order to exert a suitable contact pressure to provide continued contact with the body of the wearer at the previously mentioned locations, thereby preventing any leakage of solid body wastes outside the pouch. It is preferred that the elastic member be an elastic tape made from natural rubber. The elastic member 31 is preferably slightly narrower than the adjustable straps in order to leave suitable margins on each side of the adjustable strap and extends lengthwise the adjustable straps, except in the area where the fastening tape 12 or eyelets 4 are lcoated as shown in FIGS. 9 and 12 respectively, and in the area beyond the marginal edges of the garment as shown in FIGS. 13 to 15. The elastic member 31, shown in FIGS. 9 and 12, as well as in FIGS. 13 to 15, is operatively associated with the adjustable straps by securing it to the backing layer 32b, the facing layer 42a or 30a or to both the backing and facing layers with an elastic attachment means. This elastic attachment means should be flexible and of sufficient adhesiveness to hold the elastic member 31 in its stretched condition substantially indefinitely. A suitable attachable mean could be for example a double sided transfer tape which is compatible with the material of the elastic member. Other flexible adhesives compatible with the elastic meber could also be used as the attachment means. The elastic member 31 has an effective length equal to its stretched length and when contracted is shorter in length than the portion of the adjustable straps to which it is secured and therefore tends to gather the backing and facing layers of the adjustable straps, although the adjustable straps may be stretched lengthwise due to the resiliency of the elastic member, when putting the garment on the wearer. The elastic member 31 is preferably secured to the adjustable straps along its entire length, although, if desired, the elastic member may be attached, for example, only at its two ends and be operatively associated for the remainder of its length by extending through a sleeve within the adjustable strap or by loops integral with the adjustable strap.

FIGS. 13 to 15 show the adjustable elasticized straps extending inward beyond the marginal edges of the garment and sandwiched between the facing layer 30 (FIGS. 13 and 14) or 42 (FIG. 15) and the backing layer 32, which in a preferred embodiment are superposed and coextensive, while in another embodiment shown in FIG. 14, the backing layer 32 is folded down at the edge forming a hem 41.

And FIGS. 16 to 19 and 21 illustrate the adjustable plain straps, showing in FIG. 16 the fastening tape 12 located at the loose end of the adjustable plain strap, with facing layer 12a removed to expose the adhesive surface 12b and the backing layer 12c, and showing in FIG. 17 a series of metal or plastic, or the like, rimmed eyelets 4. FIGS. 18, 19 and 21 are similar to FIGS. 13, 14 and 15 but referring to the adjustable plain straps.

FIGS. 20 and 22 to 25 illustrate some modes in wich the buckle 3 may be secured to the lateral edges of the garment in any one of its preferred uses. FIGS. 20 and 22 illustrate one mode in which the buckle 3 made of plastic or discardable metal, may be secured to the lateral edges 39 or 39a of the disposable garment, with a flap 43 cut on the lateral edges 39 or 39a of the preferred embodiments 1, 10 and 15 or 1a, 10a and 15a of the garment respectively. The flap 43 has a generally circular hole 44 defined therein in order to pass the prong 3a of the buckle 3 through the flap 43. The buckle 3 is secured to the lateral edges 39 or 39a by wrapping the flap 43 around the center bar 3b of the buckle 3 (FIG. 20). The flap 43 as well as the lateral edge 39 are folded down forming a hem 41 which is bonded down preferably by heat sealing, although adhesives or the like could also be employed. FIGS. 23 and 24 illustrate another mode in which the buckle 3 may be secured to the lateral edges of the garment with two flaps 45 cut on the lateral edges or 39a and separated by a "U" shaped opening 46 to give room to the prong 3a of the buckle 3. The buckle 3 is secured to the lateral edges 39 or 39a by wrapping the flaps 45 around the center bar 3b of the buckle 3 (FIG. 23). The flaps 45 as well as the lateral edge 39 are folded down forming a hem 41 similar to the embodiment of FIG. 20.

FIG. 25 shows another embodiment in which the lateral edges 39 or 39a are cut away on each side of the flaps 45, thus not forming a hem. The embodiments illustrated in FIGS. 20 and 22 to 25 are all provided with a facing layer 30 or 42 although it is not shown for clarity purposes.

The preferred modes described herein of securing the adjustable straps and the buckle to the marginal edges of the garment may be subject in practice to modifications and adjustments whenever convenient. Of course, any other suitable fastening means could also be employed.

Referring now to the preferred embodiments of the pouch to receive and retain solid body wastes, all the preferred embodiments 5, 20, 22 and 14 of the pouch may be used in association as previously mentioned, with any one of the preferred embodiments 1, 10 and 15 or 1a, 10a or 15a of the garment. This also applies to the preferred embodiments of the garment further comprising a pouch to receive and retain fluid body wastes, which will be described later.

In the description that follows there are given examples of a mode, shown in the plan views of the drawings, in which each one of the preferred embodiments of the pouch may be constructed and which could be subject in practice to modifications and adjustments whenever convenient. Of course, any other way of constructing the pouch in each of the embodiments may also be employed and any other suitably shaped pouch may also be used, besides the embodiments described herein, provided that the pouch functions in a like manner and fulfills the objective.

In addition, the plan views of the preferred embodiments of the pouch are only exemplary and illustrative and do not intend to represent the actual proportions and dimensions of the pouch, which should be adapted in practice to the different breeds of dogs and to the different tail settings, etc.

The different parts of the pouch in all its preferred embodiments, as well as the backing layer made of polyethylene film and the facing layer made in a preferred embodiment of polyethylene film and in another preferred embodiment made of porous non-woven fibrous web, which form the pouch, may be bonded together preferably by heat sealing, although adhesives, or the like, may be also employed.

In general, the pouch in all the preferred embodiments comprises a top portion which is the part of the pouch that, in some preferred embodiments having a hole defined therein for the tail to come out, surrounds the tail laterally, and that in other preferred embodiments covers the tail, a closed bottom a back portion which is the part of the pouch with a hole defined therein for the root of the tail and the anus and along which the pouch is affixed at 6 to the back portion of the garment. Thus, the back portion of the pouch includes the hole for the root of the tail and anus and extends downwards up to the bottom of the pouch, and a front portion which is the part of the pouch opposite to the portion. These portions are seen in FIGS. 26, 30, 34, and 38 which illustrate the pouch and garment as applied to a male dog. The top of the pouch has several preferred embodiments to adapt to the different shapes, lengths and settings of the tail, as well as to facilitate a freer movement of the tail.

Besides, the pouch is preferably provided in all its preferred embodiments with a puff located below the opening for the anus and tail to add width to the walls of the pouch, in order to give more room for the solid body wastes. It is also preferred that the puff be provided with extra blousing in order to facilitate a freer movement of the tail before and during the act of excreting. The puff as well as the addition of extra blousing should be suitably dimensioned, to adapt to the different sizes required by the different breeds of dogs.

If desired, any and all of the pouches 5, 20, 22 and 14 may also be constructed without puffs either below or above the opening for the anus and tail.

In addition, the pouch in all its preferred embodiments should have a suitable length in order to provide enough room for the solid body wastes, as well as to provide a suitable distance between the opening for the anus and tail and the bottom, where the feces are confined, in order to prevent any contact in the area defined by the opening for anus and tail between the body of the wearer and the stool and to prevent also any leakage of solid body wastes outside the pouch. Furthermore, all the preferred embodiments of the pouch are preferably provided in a preferred embodiment with attachment means and in another preferred embodiment with occludent means. The attachment means as well as the occludent means are located on the inner surface of the walls placed near the openings of the pouch and parallel to their edges in order to seal the openings of the pouch affixed to the garment adapted to be disposed of, before discarding the garment in the garbage can, thus providing a neat and clean manner of disposing of solid body waste residuals, by enclosing them inside the plastic pouch. The abovementioned attachment means are for example two strips of pressure sensitive adhesive covered with a protective removable backing paper which is peeled off after removal of the garment in order to seal the opening of the pouch, being one strip of pressure sensitive adhesive placed suitably near each opening of the pouch, parallel to its edge. And the occludent means may be any of those occludent means well known to those skilled in the art, such as the occludent means comprising interlocking rib and groove elements disclosed in U.S. Pat. No. Re. 28,969 reissued to Naito on Sept. 21, 1976, said patent being hereby incorporated herein by reference. The occludent means comprising for example rib and groove elements which are integrally parts of the polyethylene walls of the pouch on facing inner surfaces thereof are located suitably near the openings of the pouch and parallel to their edges. The pouch could also be sealed if desired, without attachment means or occludent means, with commercially available twist ties or "Key-lock" closures before the garment is discarded in the garbage can.

Turning now to FIG. 27, the preferred embodiment 5 of the pouch shown in this figure comprises two walls 47. The preferred embodiment 5 of the pouch has a generally circular hole 54 for the anal region and the root of the tail, located at the back of the pouch, over one side of the walls 47, of a size to provide adequate room for the root of the tail and the anal region of the wearer and corresponding to the size of the generally circular hole 27 (or 27a) located on the back portion 26 (or 26a) of the garment, in order to be aligned with it when the pouch is affixed at 6 on the outer surface of the back portion 26 (or 26a) along the periphery of its hole to the periphery of the hole 27 located on the back portion of the garment, preferably using heat sealing, although adhesives or the like could also be employed. Basically, the pouch is affixed along the opening for the root of the tail and the anus in a similar manner as a sleeve is affixed around an armhole. The top portion of the pouch in the preferred embodiment 5 has a sleeve-like shape preferably oriented in an oblique outwardly directed portion and having a generally circular hole 7 defined therein being of a size to provide adequate room for the tail to come out from the pouch. The sleeve-like shaped top portion of the pouch in the preferred embodiment 5 extends along the tail for a suitable length, so as to establish a suitable distance between the two openings 54 and 7; i.e., the sleeve-like top portion extends for a length along the tail, sufficient to prevent any leakage of solid body wastes during and after the act of excreting. As indicated, preferably, the preferred embodiment 5 has a puff 52 below the opening 54 for the anus and tail, and in addition the embodiment 5 preferably has a puff 50 above the opening 54 for the anus and tail, to facilitate a freer movement of the tail as required by the different manners of carrying the tail. The walls 47 of the pouch are sealed together to form a front seam 48, a top seam 49 and an optional dart of short seam 51 located at the bottom 53 of the pouch along the back portion. And the upper and lower edges of the opening 54 are gathered to form the upper and lower puffs 50 and 52 respectively, which results in the construction of the preferred embodiment 5 of the pouch. The embodiment 5 of the pouch is suitable for different types of tails and tail settings and manners of carrying the tail, such as for example tails set high or low and carried up or down or free, because the top portion of the pouch laterally surrounds the tail and extends a suitable distance along the tail, sufficient to prevent any leakage of solid body wastes outside the pouch, regardless of the type of tail involved, and because the top portion of the pouch being provided with a puff above the opening for the anus and tail, easily adapts to the abovementioned differences in tails. Two narrow strips of pressure sensitive adhesive 236, shown in phantom, are applied on the inner surface of the walls 47 near the openings 54 and 7 of the pouch and parallel to their edges to seal the openings 54 and 7 after the disposable garment has been removed from the wearer and before discarding it in the trash basket. The previously mentioned occludent means are not shown.

FIGS. 28 and 29 illustrate the plan views of the substantial shape of the preferred embodiment 5 of the pouch, and show a mode in which the pouch may be constructed by tracing designer lines 55 directed towards the opening 7 and towards the bottom 53 of the pouch, along the areas best seen in FIG. 28, in order to form the puffs 50 and 52, above and below the opening 54 respectively. To construct the puffs 50 and 52, designer lines 55 are cut and spread evenly adding paper 56 (shown in shade) as exemplified in FIG. 29. Preferably, curves 57 and 58 are added at the edge of the puffs 50 and 52 respectively, to give an extra amount of blousing to the puffs. The embodiment 5 illustrated in FIGS. 28 and 29 has the back portion cut as one piece with an optional short seam or dart 51, while the top portion has a seam 49 and the front portion has a seam 48, although if desired, the pouch may also be cut as one piece at the top portion and have a seam at the bottom, and at the front or in any other suitable way.

Figure 105:
Figure 106:
Figure 107:
Figure 108:

FIGS. 30 and 31 illustrate the preferred embodiment 20 of the pouch which is similar to the embodiment 5, except for the fact of not having a puff above the opening 65 for the anus and tail, and also for the fact that the top portion in this embodiment 20 is constructed at different angles, since the top portion of the pouch in this embodiment is intended to fit specific types of tails and tail settings and manners of carrying the tail that are always carried in a particular way, such as for example tails carried always up or bent acutely forward, or tightly curled upwards as illustrated in FIGS. 100, 105, and 106 respectively, or tails carried always down (FIG. 104) or horizontally (FIG. 102), or cranked tails as shown in FIGS. 101, etc., as opposed to a free carrying of the tail, and the flexibility of the plastic material used to form the pouch is sufficient by itself to facilitate the movement required by the abovementioned specific carrying of the tail. Therefore, the top portion in this embodiment 20 is adapted to the different positions of the different tails and preferably to an upright position and to an oblique position of the tail. FIGS. 30 and 31 show the preferred positions of the top portion of the pouch, a generally upright position shown in phantom, and an oblique position, the latter also adapting suitably to tails carried down, because of the degree of inclination of the angle and because of the abovementioned flexibility of the plastic film used to make the pouch. In addition, if desired, the top portion of the pouch could also be constructed having a wider angle of inclination, to adapt to a lower position of the tail. The embodiment 20 comprises, as the previous embodiment 5, two walls 60, a generally circular opening 65 for the anus and root of the tail, a puff 63 below the opening 65, and a generally circular opening 59 for the tail to come out. The sleeve-like shaped top portion in this embodiment 20, also extends for a suitable length along the tail, i.e., the sleeve-like top portion extends for a length along the tail, sufficient to prevent any leakage outside the pouch as in the embodiment 5. To form the pouch shown in FIG. 31, the walls are sealed together to form a front seam 61 and a top seam 62, and the lower edge of the opening 65 is gathered to form the puff 63. Two strips of pressure sensitive adhesive 236 are also shown in phantom in FIG. 31.

FIGS. 32 and 33 illustrate the plan views of the substantial shape of the preferred embodiment 20 and show a mode in which the pouch may be constructed by tracing designer lines 55 directed towards the bottom 64 of the pouch, along the area best seen in FIG. 32, in order to form the puff 63 below the opening 65. To construct the puff 63, designer lines 55 are cut and spread evenly adding paper 56, as exemplified in FIG. 33. Preferably a curve 66 is added at the edge of the puff 63 to give an extra amount of blousing to the puff. The embodiment 20 illustrated in FIGS. 32 and 33 has the back portion also cut as one piece as the previous embodiment 5, while the top portion has a seam 62 and the front portion has a seam 61. If desired, the pouch could also be cut in any other suitable way.

FIGS. 34 and 35 illustrate the preferred embodiment 22 of the pouch which is similar to the embodiments 5 and 20 except for a different top portion which in this embodiment has preferably two adjustable straps 23 and 24. Each one of the said straps being integral to each one of the two walls 69 of the pouch and located at the front on the top of the pouch, where the walls of the pouch meet, the adjustable straps 23 and 24 have a plurality of snap fasteners 25, affixed at their free ends, being the snap fasteners 25 placed on opposite adjustable straps complementary, thus, as seen in FIG. 35, the male fasteners 25a placed on the right hand adjustable strap 23 are adapted to engage with the female fasteners 25b, placed on the left-hand adjustable strap 24. The snap fasteners 25 may be affixed to the adjustable straps by inserting them by pressure or by any other suitable way. The adjustable straps may have the same length as shown in FIGS. 36 and 37, or if desired, for example, the right-hand adjustable strap 23, where the male snap fasteners 25a are affixed, may be longer than the left-hand adjustable strap 24, where the female snap fasteners 25b are affixed, so that a plurality of male snap fasteners 25a may be selectively engaged with female snap fasteners 25b. While snap fasteners are preferred, any other fastening means or a knot may also be employed. The embodiment 22, being provided at the top portion with adjustable straps, is particularly suitable for tails very heavily feathered (FIG. 107) or profusely covered with long spreading hair or well furred or with specific types of clip such as for example the clip for poodles which leaves a pompom on the end of the tail (see FIG. 108), although this embodiment can also be used with any type of tail or tail carriage since it can be adjusted with the adjustable straps to the different thickness of different tails and the top portion being open above the tail, enables the free movement of the tail in any type of carriage. The embodiment 22 comprises, as the previous embodiments 5 and 20, two walls 69 and a puff 71 below the opening 68 for the anus and tail and an opening 67 for the tail to come out configured as best seen in FIGS. 34 and 35. To form the pouch as in the previous embodiments, the walls are sealed together to form a front seam 70 and the lower edge of the opening 68 is gathered to form the puff 71. Two strips of pressure sensitive adhesive 236 are shown in phantom in FIG. 35.

In addition, the embodiment 22 as wellas the preferred embodiments 5, 20 and 14 (FIG. 39) of the pouch to receive and retain solid body wastes, are provided in another preferred embodiment with two adjustable straps 297 and 298 (shown in FIG. 35) placed outside the pouch and located transversally to the pouch and at a suitable distance from the bottom. The two adjustable straps being bonded preferably by heat sealing, or using adhesives, or the like, at the center of the back of the pouch (as best seen in FIG. 87) and fastened at the front preferably with snap fasteners 25a and 25b which are suitably located at the free end and along each one of the two adjustable straps, in order to fasten the adjustable straps mainly at two positions, i.e. loose or tight around the pouch. The adjustable straps provide a belt which is to be carried loose or to be fastened loose around the pouch before excretion, and which is to be fastened tightly around the pouch after excretion, in order to enclose the solid body wastes within the bottom of the pouch, while the wearer is still wearing the garment, thereby isolating the solid body wastes from the gearer, or before discarding the garment in a garbage can.

The abovementioned adjustable straps are also applicable to the other preferred uses of the garment which will be hereinafter described, i.e. to the integral reusable-washable garment, to the attachable reusable-disposable garment and to the attachable reusable washable garment, and the adjustable straps may be plain, elasticized or of an elastic fabric, according with the preferred uses of the garment, being the elastic fabric straps secured to the reusable-washable pouch with metal rimmed eyelets, or the like, inserted by pressure, or the like. If desired, the adjustable straps may be fastened with a knot instead or with any other separable fasteners.

FIGS. 36 and 37 illustrate the substantial shape of the embodiment 22, showing a mode to construct the pouch similar to the previously described, wherein section lines 55 oriented towards the bottom 72 of the pouch (FIG. 36) are cut and spread (FIG. 37) to form the puff 71 below the opening 68 and a curve 73 is also added at the edge of the puff 71.

Figure 38:
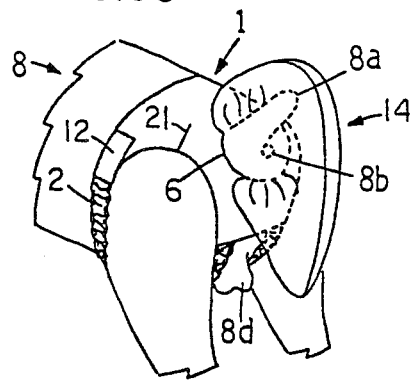
FIG. 38 is a fragmentary perspective view similar to that of FIG. 26 showing another preferred exemplary embodiment of the pouch to receive and retain solid body wastes.
Figure 39:
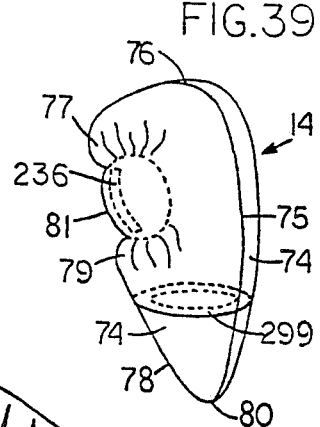
FIG. 39 is an enlarged perspective view of the preferred embodiment of the pouch of FIG. 38 in its configuration as applied to a male as well as to a female dog, and showing in phantom a strip of adhesive and further comprising a flange shown partially in phantom, located inside the pouch.

FIGS. 38 and 39 illustrate the preferred embodient 14 of the pouch which is similar to the previous embodiments of the pouch, except for the fact that the top portion in this embodiment 14 is closed, i.e. without an opening for the tail to come out, since this embodiment is intended to fit specifically docked tails as shown in FIGS. 2 and 38, or stump tails (FIG. 103), or short tails in general. The top portion of the pouch in the embodiment 14 is provided preferably with a puff 77 above the opening 81 for the anus and the root of the tail, to add width to the walls 74 of the pouch on the top portion, in order to insure enough room for the tail which is enclosed in the pouch. The embodiment 14 preferably comprises a puff 79 below the opening 81. To form the pouch shown in FIG. 39, the walls 74 are sealed together to form a front seam 75, a bottom seam 78 and a seam 76 at the top portion of the pouch, and the upper and lower edges of the openings 81 are gathered to form the upper and lower puffs 77 and 79 respectively. One strip of pressure sensitive adhesive 236 is shown in phantom in FIG. 39.

The embodiment 14 as well as the previously described embodiments 5, 20 and 22 of the pouch to receive and retain solid body wastes are provided in another preferred embodiment with an integral flange 299 shown in phantom in FIG. 39, which has a suitable width, placed transversally within the pouch along its periphery, being laterally inwardly projected and located at a suitable distance from the bottom of the pouch. The flange is preferably provided with an integral rim with a suitable height in order to facilitate the bonding of the flange to the pouch. The flange forms a pocket inside the pouch, within which, solid body wastes remain enclosed. The abovementioned flange provided inside the pouch to receive and retain solid body wastes in the disposable use of the garment, is also applicable to the other preferred uses of the garment which will be hereinafter described, i.e. to the integral reusable-washable garment, to the attachable reusable-disposable garment and to the attachable reusablewashable garment. For illustrative purposes, see the flange 201 shown in detail in the embodiment of the pouch to receive and retain fluid body wastes of FIG. 75, since the flange 201 is similar in every respect to the flange 299.

The adjustable straps 297 and 298 (FIG. 35) and the flange 299 (FIG. 39) previously described, are preferably provided to the pouch separately, i.e. the pouch is provided with adjustable straps 297 and 298 or the pouch is provided with a flange 299 since both embodiments intend to fulfill the same objective, although, if desired, both embodiments may be provided together to the pouch.

Figure 40:
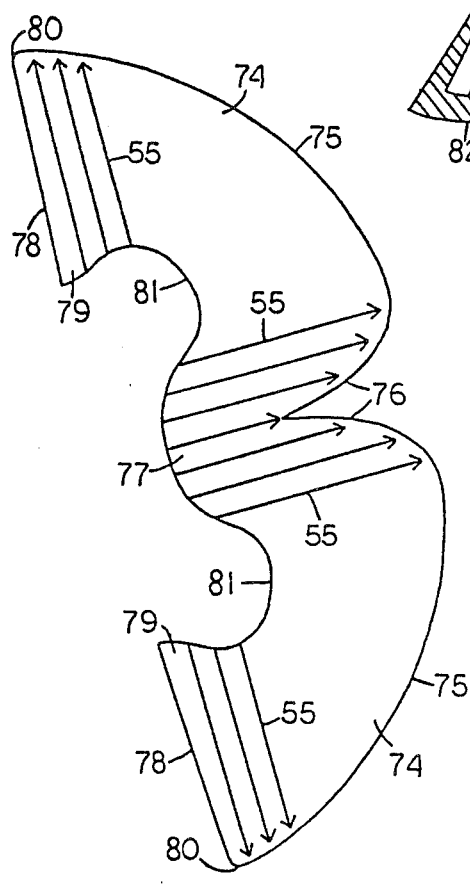
FIGS. 40 and 41 are plan views of the preferred embodiment of the pouch of FIGS. 38 and 39 showing a mode in which the pouch may be constructed.
Figure 41:
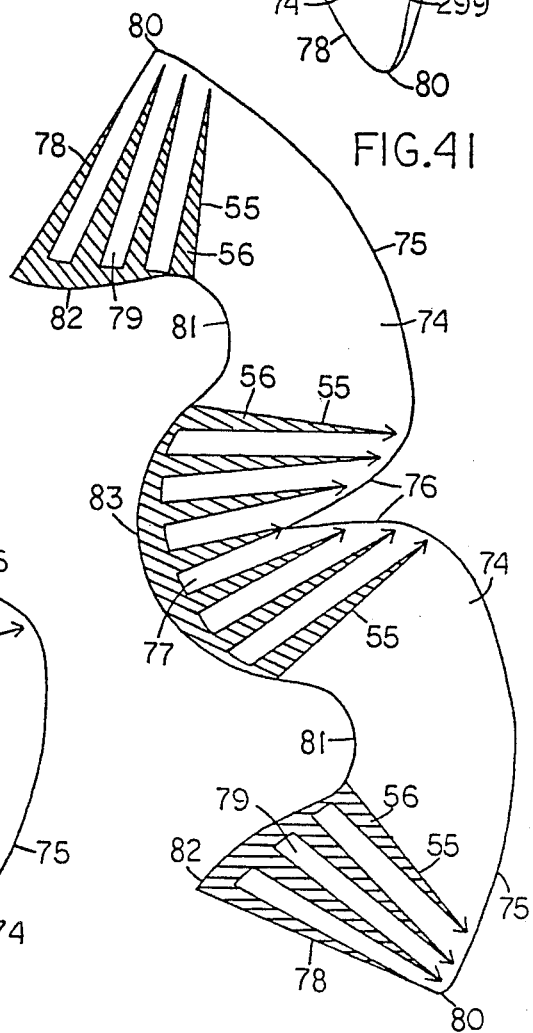

FIGS. 40 and 41 illustrate the substantial shape of the preferred embodiment 14, showing a mode to construct the pouch wherein section lines 55 directed towards the front portion of the pouch and the bottom 80 (FIG. 40) are cut and spread (FIG. 41) to form the puffs 77 and 79 above and below the opening 81, and curves 83 and 82 are also added at the edges of the puffs 77 and 79 respectively.

In all the preferred embodiments of the pouch to receive and retain solid body wastes, the opening for the anus and root of the tail is preferably provided with an integral laterally outwardly projected flat flange, with a suitable width (not shown) and located peripherally about the edge of the opening, to facilitate the bonding of the pouch along the periphery of the hole located on the back portion of the garment. For illustrative purposes see the flange 179 shown in the embodiment of the pouch to receive and retain fluid body wastes shown in FIG. 70.

Referring now to the preferred exemplary embodiments of the garment adapted to be disposed of, provided with one pouch to receive and retain solid body wastes as well as with one pouch to receive and retain fluid body wastes, which in some preferred embodiments is to be worn by male dogs as illustrated in FIGS.

42, 43, 44, 47, 49, 50, and 54, and in other preferred embodiments is to be worn by female dogs as illustrated in FIGS. 56, 57, 58, 61, 63, 64, 65 and 68, basically the upper portion and back portion of the garment in the abovementioned embodiments, are similar and are placed over similar anatomical regions of the wearer, to that already described in connection with the embodiment 15 of FIG. 10 (including also the embodiments 1 and 10) and with the embodiment 15a of FIG. 11 (including also the embodiments 1a and 10a). In a like manner the backing and facing layers of the garment, as well as the adjustable elasticized or plain atraps and the preferred modes of securing the straps and fastening means, to the garment in the abovementioned embodiments, are similar to that already described in connection with the embodiments of FIGS. 10 and 11, so that a detailed description of the abovementioned portions of the garment as well as of the backing and facing layers, and of the adjustable straps and modes of securing the straps and also the fastening means to the garment, is deemed unnecessary and will be omitted for the sake of brevity, although these features will be mentioned in the hereinafter description of each embodiment Turning now to FIGS. 42, 43 and 44, these general views illustrate the preferred exemplary embodiments 84 and 89 of the disposable garment provided with two pouches, one pouch to receive and retain solid body wastes, and one pouch to receive and retain fluid body wastes, to be worn by male dogs, as applied to a male dog 8. The preferred embodiments 86 and 88 of the pouch to receive and retain fluid body wastes are also illustrated, showing in phantom the penis 8c and the absorbent pads 184 and 87.

Any one of the preferred embodiments 84 and 89 of the garment may be used in association with any one of the preferred embodiments 86 and 88 of the pouch to receive and retain fluid body wastes, as well as with any one of the preferred embodiments of the pouch to receive and retain solid body wastes already described. In a like manner any one of the preferred embodiments of adjustable straps, i.e., plain or elasticized and any one of the preferred embodiments of fastening means, i.e. a pressure sensitive fastener 12 or a buckle 3 may be applied to any one of the embodiments 84 and 89 adapted to be disposed of.

The same reference numerals are used to designate the upper portion, as well as the back portion and the lower portion of the garment, in its most preferred embodiments 84 and 89 respectively, since the upper portion is similar in these embodiments, except for its length along the top line of the wearer, while the back and lower portions in the abovementioned embodiments are analogous. On the other hand, the front end of the upper portion in each embodiment is designated with a different numeral and indicated by dotted lines, to show the different lengths of the upper portion in the different embodiments. The same criteria, as mentioned above, in reference to the use of the same numerals for designating similar and analogous portions in the embodiments of the garment in different embodiments, also applies to the other preferred embodiments of the garment to be worn by male dogs and to other preferred embodiments of the garment to be worn by female dogs which will be described hereinafter.

Figure 42:
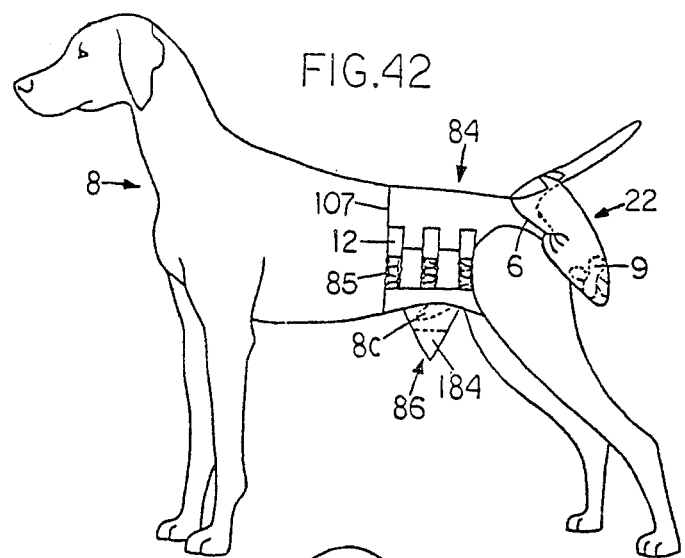
FIGS. 42, 43 and 44 are general side views of other preferred embodiments of the disposable garment to be worn by male dogs provided with some preferred embodiments of a pouch to receive and retain solid body wastes (solid body wastes are shown in phantom), as well as with some preferred embodiments of a pouch to receive and retain fluid body wastes (penis and absortive device are shown in phantom).
Figure 43:
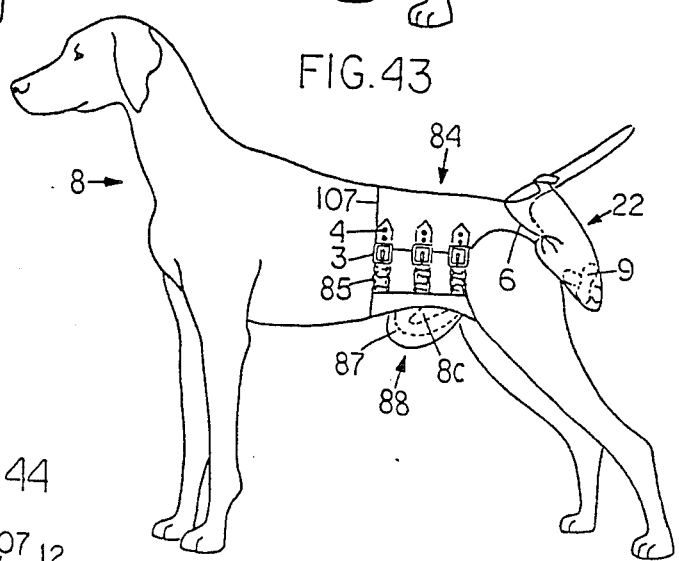
Figure 44:
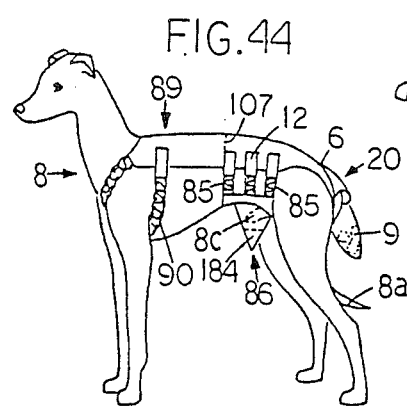

The embodiment 84 of FIGS. 42 and 43 is particularly suitable to be worn by male dogs with sway back (FIG. 98) or with back higher at croup than at withers (FIG. 99), and the embodiment 89 of FIG. 44 is particularly suitable to be worn by male dogs with roach back (FIG. 97) like the Italian Greyhound or the like, or in general by male dogs with a 5 sloping loin and croup, or croup. And the same applies to the preferred embodiments 84a and 89a of FIGS. 47 and 48.

Basically, the preferred embodiments 84 and 89 comprise a wearer-contacting garment and the abovementioned pouches which will be described later and which are integrally affixed to the garment. The wearer-contacting garment in the preferred embodiment 89 is of the shape best seen in FIG. 46 and comprises an upper portion 96 which is placed over the top line of the wearer, a back portion 92 which is placed over the buttocks extending backwards a suitable length, and a lower portion 93 which is placed over the genital region of the male wearer and extends a suitable distance over the abdomen of the wearer.

Turning now to FIG. 46, the preferred embodiment 89 illustrated therein has a longidutinal center line 97, and lateral lines 98, 99 and 100. The upper portion 96 extends from the lateral line 98 to the front end 101 of the garment. The back portion 92 extends from the lateral line 98 to the lateral line 99 and the lower portion 93 is the part of the garment from the lateral line 100 to the back end 102 of the garment. Dotted lines 107 indicate the front end 107 of upper portion 96 on the top line of the wearer in embodiment 84 of FIGS. 42 and 43, since it was deemed unnecessary to show the embodiment 84 in a separate figure. In the embodiment 84 the upper portion 96 is placed generally over the croup and the loin and in the embodiment 89 (FIG. 44) it is placed generally over the croup, the loin, the back and the withers, i.e. over the complete top line of the wearer, and in both embodiments the upper portion 96 is preferably provided with darts 21. The back portion 92 has a generally circular hole 94 defined therein along which periphery the pouch to receive and retain solid body wastes is to be affixed, and adjustable elasticized straps 91 are secured at both ends of the linear horizontal end 99 of the back portion 92 indicated by the lateral line 99 and at both ends of the linear horizontal end 100 of the lower portion 93 indicated by the lateral line 100, in order to attach the back portion 92 to the lower portion 93. It is preferred that the adjustable straps connecting the back portion with the lower portion generally be elasticized to provide a snug fit around the groins of the wearer, and the same applies to the embodiments of FIGS. 48, 52 and 55 which will be described later. The lower portion 93 is of the shape best seen in this figure, and has a generally central hole defined therein of a size to provide adequate room to surround the penis 8c, and which in a preferred embodiment is a generally circular hole 95 (see FIG. 45), along which periphery the preferred embodiment 86 of the pouch to receive and retain fluid body wastes is to be affixed, and in another preferred embodiment is a generally eliptical hole 95 shown in FIG. 46, along which periphery the preferred embodiment 88 of the pouch to receive and retain fluid body wastes is to be affixed. The lateral edges 103 of the lower portion 93 are curvilinear and inwardly directed toward the longitudinal center line 97 along the area of the lower portion 93 which surrounds the groins of the wearer, and are linear along the area of the lower portion 93 which is placed over the genital region of the wearer surrounding with the opening 95 the penis 8c, (see FIG. 45), and which extends a suitable distance over the abdomen of the wearer. The lower portion 93 has two linear horizontal ends, one linear horizontal end indicated by the lateral line 100, and the other being the back end 102 of the wearer-contacting garment. The area of the lower portion 93 having linear lateral edges 103 is wider than the area having incurved lateral edges 103. This wider area of the lower portion 93, with linear lateral edges 103, is placed over the genital region of the male wearer and extends a suitable distance over the abdomen, and also extends laterally so as to cover a suitable distance over the sides of the body of the wearer, approximately as illustrated in FIGS. 42, 43 and 44 and also in FIG. 47 in the preferred embodiment 89a. Adjustable elasticized straps 85 generally in number of three are secured along both linear lateral edges 103 of the lower portion 93, in order to attach the lower portion 93 to the upper portion 96 at the area 106 which extends generally up to the end of the loin region (see FIG. 46) along the linear lateral edges 103 with fastening tape 12 (FIGS. 46 and 42) or with a buckle 3 which is affixed to the lateral edges 103 of the upper portion, as has been previously described and shown in FIGS. 20 and 22 to 25, and as shown in FIG. 43 and also in FIG. 48, in the preferred embodiment 89a, thus keeping the lower portion 93 firmly-attached to the upper portion 96 of the garment on both sides of the body of the wearer. The adjustable elasticized straps 85 provide a close fit of the garment without gaps around the body of the wearer regardless of the different weight of the wearer within the same breed, because of the ability of the adjustable elasticized straps 85 to stretch or contract accordingly. In addition, the elasticized straps 91 connecting the back portion 92 to the lower portion 93 also insure a close fit of the garment around the groins (see FIG. 45), and the two adjustable elasticized straps 90 which are provided in the embodiment 89 at the corners deformed by the incurved front end 101 with the linear lateral edges 103 of the upper portion 96, surrounds the upper arms of the wearer insuring the close fit of the garment and also preventing the garment from slipping backwards when the garment is worn by dogs with sloping loin and croup. The adjustable straps 85 located at the lateral edges 103 of the lower portion 93 and the adjustable straps 90 surrounding the upper arms of the wearer, may be in another preferred embodiment adjustable plain straps, provided with fastening tape 12 or a buckle 3 to be attached to the upper portion 93. On the other hand the straps 91 connecting the back portion 92 to the lower portion 93 are preferably generally elasticized. The adjustable elasticized straps 90, 91 and 85, as well as the adjustable plain straps are secured to the marginal edges of the garment as has been previously described, sandwiched between the backing layer 105 made of polyethylene film and the facing layer 104 made of porous nonwoven bonded fibrous web, as shown in FIG. 46.

Referring now to FIGS. 47 and 48 these figures illustrate the preferred embodiment 89a which is similar to the embodiment 89 except for having a narrower upper portion and back portion and longer adjustable elasticized straps 85a and 90a or plain straps (not shown) to compensate for the difference in width so that similar reference numerals accompanied by a letter to indicate the aforementioned differences are used to designate those elements in FIG. 48 which correspond with those in FIG. 46. In addition, the upper portion 96a and back portion 92a are similar, as stated earlier, to that of the embodiments shown in FIG. 11 already described. There is also shown in FIG. 48 the other preferred embodiment of the facing layer 237 made of polyethylene film, and dotted line 107a indicating the front end 107a of the upper portion 96a on the top line of the wearer which corresponds to the embodiment 84a of the garment which is similar to the embodiment 84 except for having a narrower upper and back portions. The embodiment 84a is illustrated in the plan view of the embodiment 89a by virtue of the dotted line 107a and thereby not shown in a separate figure.

Turning now to FIGS. 49 and 50, these figures illustrate the preferred embodiments 108 and 110 of the disposable garment provided with a pouch to receive and retain solid body wastes and with a pouch to receive and retain fluid body wastes, to be worn by male dogs, as applied to a male dog 8. The embodiments 108 and 110 are similar to the embodiments 84 and 89 in every respect, except for the lower portion of the garment, so that no further explanation will be presented in reference to the other portion of the garment which has been already described.

The embodiments of FIGS. 49, 50 and 54 are suitable to be worn by male dogs with the anatomical characteristics previously mentioned for the embodiments of FIGS. 42, 44 and 47.

FIG. 49 shows a preferred embodiment of a plain lower portion 109, and FIGS. 50 and 51 show a preferred embodiment of an elasticized lower portion 111, also shown in FIGS. 52 and 53 and in FIGS. 54 and 45 in the preferred embodiment 110a. The elasticized lower portion 111, as well as the plain lower portion 109, is of the shape best seen in FIGS. 52 and 55 and have a generally central hole defined therein, which in a preferred embodiment is a generally circular hole 114 (FIG. 51) and in another preferred embodiment is a generally eliptical hole 114 (FIGS. 52 and 53), as described earlier for the embodiment 89 of FIG. 46.

Referring now to FIGS. 52 and 53, the elasticized lower portion 111 shown in a stretched condition as well as in FIG. 55, has curvilinear lateral edges 125 inwardly directed towards the longitudinal center line 119 along the area which surrounds the groins of the wearer, and has linear lateral edges 125 along the area which is placed over the genital region of the wearer, surrounding with the opening 114 the penis 8c (see FIG. 51), and which extends a suitable distance over the abdomen of the wearer, in a like manner as described for the embodiment of FIG. 46. The lower portion 111 has two linear horizontal ends, one linear horizontal end indicated by the lateral line 122 and the other being the back end 124 of the wearer-contacting garment. The area of the lower portion 111 having linear lateral edges 125 is wider than the area having incurved lateral edges 125. The wider area of the lower portion 111 extends laterally on each side of the longitudinal center line 119 a suitable length as needed to be placed over the sides of the body of the male wearer, as illustrated in FIG. 50, and also in FIGS. 49 and 54 in the preferred embodiments 108 and 110a, to be attached to the upper portion 118 at the area 126 which extends generally up to the end of the loin region (see FIG. 52) along the linear portion of the lateral edges 125, preferably with fastening tapes 12, which are provided on the lateral edges 125 of the lower portion 111. The lateral edges 125 of the lower portion 111 preferably overlap the lateral edges 125 of the upper portion 18 (see FIG. 50) so as to make the lower portion 111 more expandable when necessary to accomodate bodies of different weight within the same breed. This also applies to the plain lower portion 109 shown in FIG. 49 and to the lower portion 111a of FIGS. 54 and 55. The elasticized lower portion 111 is provided with a sequence of elastic members 129, each elastic member having a suitable thickness, sandwiched between the backing layer 128 made of polyethylene film and the facing layer 129 made of porous non-woven fibrous web as shown in FIG. 53, and placed lengthwise on the lower portion parallel to the back end 124 over the area of the lower portion 111 with linear lateral edges 125, except along the periphery of the opening 114 and near the area where the fastening tapes 12 are secured, and the elastic member 129 next to the back end 124 extending all along the length of the back end 124 except near the area where the fastening tapes 12 are secured. Thus the elastic members 129 form a sequence of elasticized contractable lines, through the area of the lower portion 111, having linear lateral edges 125, the elastic members 129 being suitably spaced from each other, with the outer elastic members 129 of the abovementioned sequence being preferably placed leaving suitable margins adjacent to the back end 124 and to the incurved lateral edge 125, so as to permit the backing sheet 128 and the facing sheet 127 to be attached thereto, as well as along the spaces between the elastic members 129 by attachment means such as heat sealing or adhesives, or the like; this is also applicable to the elasticized lower portion 111a of FIG. 55. Each elastic member 129 has an effective length equal to its stretched length and when contracted is shorter in length than the area of the lower portion 111 to which it is secured, and therefore it gathers the backing and facing layers of the lower portion, although the lower portion stretche due to the resiliency of the elastic member when putting the garment on the wearer. The elastic members 129 are preferably secured to the lower portion 111 of the garment along their entire length. The description given for the adjustable elasticized straps of FIGS. 9 and 12 in reference to the elastic member 31 and its operative association with the adjustable straps with elastic attachment means, is applicable to the elasticized lower portion 111 (FIGS. 52 and 53) and 111a (FIGS. 54 and 55) so that no further explanation thereof will be presented. The elasticized lower portion 111 (or 111a) permits to maintain a good fit around the body of the wearer along the previously mentioned anatomical regions. Also shown in FIG. 52 are the elasticized straps 115 connecting the back portion 16 to the lower portion 111, and the adjustable elasticized straps 112 sandwiched between the backing layer 128 and the facing layer 127, and the dotted lines 13 indicating the front end 113 of the upper portion 118 on the top line of the wearer, on the embodiment 108 of FIG. 49, since this embodiment is not shown in a separate figure.

The preferred embodiment 110a shown in FIGS. 54 and 55 is similar in every respect to the embodiment 110 except for having a narrower upper and back portions and a longer elasticized lower portion 111a, and adjustable elasticized straps 112a. Also, in the embodiment 110a the upper and back portions are similar to that of the embodiment of FIG. 11. Dotted line 113a indicates the front end 113a of the embodiment 108a of the garment, which is similar to the embodiment 108 but with a narrower upper portion. The embodiment 108a is illustrated in the plan view of the embodiment 110a by virtue of the dotted line 113a and thereby not shown in a separate figure. The facing layer 238 made of polyethylene film is also shown.

Turning now to FIGS. 56, 57 and 58, these general views illustrate the preferred exemplary embodiments 130, 132 and 134 of the disposable garment, provided with a pouch to receive and retain solid body wastes and with a pouch to receive and retain fluid body wastes (not shown) to be worn by female dogs, and applied to a female dog 29.

Any one of the preferred embodiments 130, 132 an 134 of the garment may be used in association with any one of the preferred embodiments of the pouch to receive and retain fluid body wastes of FIGS. 74, 77, 78 and 79 which will be described later, as well as with any one of the preferred embodiments of the pouch to receive and retain solid body wastes already described. In a like manner, any one of the preferred embodiments of adjustable straps and fastening means previously mentioned may be used in association with any one of the embodiments of FIGS. 56, 57 and 58. This remain is also applicable to the preferred embodiments of FIGS. 61, 63, 64, 65 and 68 which will be described later.

The embodiments 130 and 132 of FIGS. 56 and 57 are particularly suitable to be worn by female dogs with sway backs (FIG. 98) or with backs higher at croup than at withers (FIG. 99) and the embodiment 134 of FIG. 58 is particularly suitable to be worn by female dogs with roach back (FIG. 97) like the Italian Greyhound or the like, or in general by female dogs with a sloping loin and croup, or croup. The aforegoing remark is also applicable to the preferred embodiments 130a, 132a and 134a (see FIG. 62) as well as to the preferred embodiments 154, 156 and 158 (FIGS. 63, 64 and 65) and to the preferred embodiments 154a, 156a and 158a (see FIG. 69).

Basically, the preferred embodiments 130, 132 and 134 comprise a wearer-contacting garment and the abovementioned pouches which in the disposable use of the garment are integrally affixed to the garment. The wearer-contacting garment, in the preferred embodiment 134, is of the shape best seen in FIG. 59, and comprises an upper portion 141 which is placed over the top line of the wearer, a back portion 142 which is placed over the buttocks extending backwards a suitable length and a lower portion 143 which is placed over the anatomical region between the groins of the wearer.

Turning now to FIG. 59, the preferred embodiment 134 illustrated therein has a longitudinal center line 136 and lateral lines 137 and 138. The upper portion 141 extends from the lateral line 137 to the front end 139 of the garment. The back portion 142 extends from the lateral line 137 to the lateral line 138 and the lower portion 143 is the part of the garment which extends from the lateral line 138 to the back end 140 of the garment.

Dotted lines 148 and 149 indicate the front ends 148 and 149 of the upper portion 141 on the top line of the wearer, in the embodiments 130 (FIG. 56) and 132 FIG. 57) respectively, since it was deemed unnecessary to show them in separate figures. In the embodiment 130 (FIG. 56) the upper portion 141 is placed generally over the croup, while in the embodiment 132 (FIG. 57) it is placed generally over the croup and the loin, and in the embodiment 134 (FIG. 58) it is placed generally over the croup, the loin, the back and the withers.

The upper portion 141 of the embodiment 134 of FIG. 59 is analogous to that of FIG. 10, so that no further explanation will be necessary, while the back portion 142 is similar to that of the embodiment of FIG. 10, but slightly longer, extending from the root of the tail up to the genital region of the female wearer and having relatively incurved lateral edges 150. The back portion 142 has a suitable width and gets narrower, from the lateral line 137, towards the lateral line 138. The back portion 142 has a generally circular hole 144 defined therein immediately below the lateral line 137. The lower portion 143 is of the shape best seen in FIG. 59 and has linear lateral edges 150 and a linear horizontal end which constitutes the back end 140 of the wearer-contacting garment. The lower portion 143, in a preferred embodiment, has a generally circular hole 145 defined therein, located generally immediately below the back portion indicated by the lateral line 138, of a size to provide adequate room to surround the vulva 29c of the female wearer (see FIG. 60) and along which periphery the preferred embodiment 193 of the pouch to receive and retain fluid body wastes, shown in FIG. 74, is to be affixed, while in another preferred embodiment the lower portion 143 (or 143a, FIG. 62) is solid and is provided with the preferred embodiments 205, 210 and 212 of the flat pouch, as shown in FIGS. 77, 78 and 79 respectively. The lateral edges 150 of the lower portion 143 are generally linear and the lower portion 143 is generally of the same width as the narrowest area of the back portion 143 adjacent the genital region of the female wearer, and extends a suitable length over the anatomical region between the groins.

The number of adjustable straps increases in each embodiment, in a like manner to that of the previously described embodiments of FIGS. 1, 2 and 3 as shown in FIGS. 56, 57, 58 and 60. The adjustable plain straps 135 and 133 are located at the same areas described for the embodiment of FIG. 10, while the adjustable plain straps 131, which go around the groins of the wearer are located on the lower portion 143 at the corners formed by the back end 140 with the lateral edges 150 so as to follow the contour of the groins and upper thighs of the wearer, to be attached to the upper portion 141, at the area of the linear lateral edges 150 immediately below the dotted lines 148, with a buckle 3 affixed to the lateral edges 150 of the upper portion 141, or with fastening tapes 12 as shown in the embodiment 134a on FIG. 62. The adjustable straps, plain or elasticized, insure a close fit of the garment around the body of the wearer in all the abovementioned embodiments. The adjustable plain straps 135, 133 and 131 are secured to the marginal edges of the garment, sandwiched between the backing layer 147 made of polyethylene film and the facing layer 146 made of porous non-woven bonded fibrous web.

Referring now to FIGS. 61 and 62 these figures illustrate the preferred embodiment 134a which is similar to the embodiment 134 of FIG. 59 except for having narrower upper and back portion and longer adjustable elasticized straps 153, 152 and 151, so that similar reference numerals accompanied by a letter to indicate the aforementioned differences are used to designate those elements in FIG. 62 which correspond with those in FIG. 59. Also, the upper portion 141a is similar to that of the embodiment of FIG. 11 and the back portion 142a is similar to that of the embodiment of FIG. 11 but slightly longer and with relatively incurved lateral edges. There is also shown in FIG. 62 the other preferred embodiment of the facing layer 248 made of polyethylene film, and dotted lines 148a and 149a indicating the front ends 148a and 149a of the upper portion 141a on the top line of the wearer, which corresponds to the embodiments 130a and 132a of the garment which are similar to the embodiments 130 and 132 except for having a narrower upper and back portions, the embodiments 130a and 132a are illustrated in the plan view of the embodiment 134a by virtue of the dotted lines 148a and 149a, and thereby not shown in separate figures.

FIGS. 63, 64 and 65 show the preferred embodiments 154, 156 and 158 respectively, which are similar to the embodiments 130, 132 and 134 (FIGS. 56, 57 and 58) in every respect, except for the lower portion 167 of the garment (FIG. 66) which is placed over the anatomical region between the groins of the female wearer and extends a suitable distance over the abdomen and has in a preferred embodiment a generally circular hole 169 defined therein located immediately below the lateral line 162, of a size to provide adequate room to surround the vulva 29c (FIG. 67) as previously described for the embodiment 134 of FIG. 59, and in another preferred embodiment the lower portion 167 (or 167a of FIG. 69) is solid and is provided with the preferred embodiments 205, 210 and 212 of the flat pouch as shown in FIGS. 77, 78 and 79 respectively. The lower portion 167 extends laterally from the longitudinal center line 160 at the area adjacent and parallel to the back end 164 forming strap-like portion 155 on each side of the lower portion 167 and said strap-like portions have a suitable thickness and length in order to surround the groins and the upper thighs of the wearer and to be attached to the upper portion 165 at the linear lateral edges 174 over the area adjacent to the incurved lateral edges and immediately below the dotted lines 172. The lower portion 167 or 167a (FIG. 69) in a preferred embodiment has plain strap-like portions and in another preferred embodiment has elasticized strap-like portions. FIG. 66 shows the lower portion 167 having the preferred embodiment of plain strap-like portions 155 extending on each side of the longitudinal center line 160, and FIG. 69 shows the lower portion 167a having the preferred embodiment of elasticized strap-like portions 175 extending on each side of the longitudinal center line 160a and shown in a stretched condition. In a preferred embodiment of the lower portion (see FIG. 66) the lateral edges 174 of the lower portion 167 are linear along the area of the lower portion which is placed over the anatomical region between the groins (see FIG. 67) and are curvilinear and inwardly directed towards the longitudinal center line 160, along the area of the lower portion which is placed over the abdomen of the wearer (see FIG. 67) extending laterally forming strap-like portions 155 which surround the groins and the upper thighs of the wearer. In another preferred embodiment of the lower portion (see FIG. 69), the lateral edges 174a are lineal, forming a right angle with the strap-like portions 175. The elongated strap-like portions 155 or 175 are provided at each end with fastening tapes 12 or with eyelets 4 to be engaged with a buckle 3 (not shown).

Referring now to FIGS. 68 and 69, these figures illustrate the preferred embodiment 158a which is similar to the embodiment 158, except for having a narrowe upper and back portions and longer adjustable elasticized straps 177 and 176 and also longer strap-like portions 175 formed on the area adjacent and parallel to the back end 164a of the lower portion 167a, so that similar reference numerals accompanied by a letter to indicate the aforementioned differences are used, to designate those elements in FIG. 69 which correspond with those in FIG. 66. Also, the upper portion 165a is similar to that of the embodiment of FIG. 11 and the back portion 166a is similar to that of the embodiment of FIG. 11 but slightly longer and with relatively incurved lateral edges 174a. There is also shown in FIG. 69 the other preferred embodiment of the facing layer 239 made of polyethylene film, and dotted lines 172a and 173a indicating the front ends 172a and 173a of the upper portion 165a on the top line of the wearer, which corresponds to the embodiments 154a and 156a of the garment which are similar to the embodiments 154 and 156 except for having a narrower upper and back portions. The embodiments 154a and 156a are illustrated in the plan view of the embodiment 158a by virtue of the dotted lines 172a and 173a, and thereby not shown in separate figures. FIG. 69 shows the preferred embodiment of the lower portion 167a having linear lateral edges 174a forming a right angle with the elasticized strap-like portions 175 as stated before, and being the elasticized strap-like portions 175 at the area adjacent and parallel to the back end 164a, and extending on each side of the longitudinal center line 160a. The elasticized strap-like portions 175 comprise an elastic member 178 sandwiched between the backing layer 171a made of polyethylene film and the facing layer 240 made of polyethylene film. The elastic member 178 has a suitable thickness and is placed lengthwise on the strap-like portions 175, up to the area immediately before the location of the fastening means and parallel to the back end 164a forming a contractable line within the strap-like portions, thus providing elasticized contractable strap-like portions 175. The elastic member 178 has an effective length equal to its stretched length and when contracted is shorter in length than the strap-like portions 175 to which it is secured, and therefore gathers the backing and facing layers of the straplike portions 175, although the strap-like portions stretch due to the resiliency of the elastic member when putting the garment on the wearer and attaching the strap-like portions to the lateral edges 174a of the upper portion 165a, configuring hind legs openings. The elastic member 178 is preferably secured to the strap-like portions 175 along its entire length. The description given for the adjustable elasticized straps of FIGS. 9 and 12 in reference to the elastic member 31 and its operative association with the adjustable straps with elastic attachment means, is applicable to the elasticized strap-like portions 175, so that no further explanation thereof will be presented.

Turning now to the preferred embodiments of the pouch to receive and retain fluid body waste, FIGS. 70 and 72 illustrate the embodiments 86 and 88 respectively which are particularly suitable to be worn by male dogs, and which may be used in association with any one of the preferred embodiments of the garment 84, 89, 84a, 89a, 108, 110, 108a and 110a, to be worn by male dogs, while FIGS. 74, 77, 78 and 79 illustrate the embodiments 193, 205, 210 and 212 respectively, which are to be worn by female dogs and which may be used in association with any one of the preferred mbodiments of the garment 130, 132, 134, 130a, 132a, 134a, 154, 156, 158, 154a, 156a and 158a to be worn by female dogs. The abovementioned figures illustrating the preferred embodiments of the pouch to receive and retain fluid body wastes do not intend to represent the actual proportions and dimensions of the pouch which should be adapted in practice to the different breeds of dogs.

In the description that follows there are given examples of a mode in which each one of the preferred embodiments of the pouch may be constructed and which could be subject in practice to modifications and adjustments whenever convenient. Of course, any other way of constructing the pouch, in each one of the abovementioned embodiments, may also be employed and any other suitably shaped pouch may also be used, besides the embodiments described herein, provided that the pouch functions in a like manner and fulfills the same objective. The different parts of the pouch in all its preferred embodiments, as well as the backing layer made of polyethylene film and the facing layer made in a preferred embodiment of polyethylene film and in another preferred embodiment made of a porous nonwoven fibrous web, which forms the pouch are bonded together preferably by heat sealing, although adhesives or the like may also be employed Referring now to FIGS. 70 and 71 there is shown the preferred embodiment 86 of the pouch to receive and retain fluid body wastes adapted to the disposable use, having a conic shape with a circular hole 240 defined therein and preferably comprising an integral laterally outwardly projected flat flange 179 with a suitable width located peripherally about the edge of the circular hole 240, which constitutes the base of the cone, in order to facilitate the bonding of the pouch. The circular hole 240 is of a size to provide adequate room for the penis 8c and corresponding to the size of the generally circular hole located on the lower portion of the preferred embodiments of the garment 84, 89, 84a, 89a, 108, 110, 108a and 110a in order to be aligned with it, when the pouch is affixed by means of the flange 179 on the outer surface of the lower portion, along the periphery of the hole defined therein.

The conic pouch 86 may be constructed for example by folding preferably a semicircle and bonding together the radiuses 228. The sealing of the radiuses 228 preferably precedes the sealing of the flange 179 to the periphery of the so formed circular hole 240 which constitutes the base of the cone. Thereby, the flange 179 is preferably cut after the radiuses 228 forming the cone are sealed, so as to design the flange 179, following the contour of the circular hole 240 of the pouch, thus, defining the outer circumference of the circular flange 179, with the necessary fullness. Also, the conic pouch and flange may be constructed in any other mode well known to those skilled in the art.

The conic pouch 86 has a backing layer 182 made of polyethylene film and a facing layer 181 made of polyethylene film or in another embodiment shown in FIG. 71 a facing layer 185 made of a porous non-woven fibrous web, while the flange 179 is in both embodiments preferably of polyethylene film.

The conic pouch 86 incorporates an absorbent pad 184 configured to define a conic shape and located at the bottom of the pouch occupying approximately between about ⅓ to ⅓ of the total height of the pouch, and attached to the bottom and the lower portion of the walls 180 of the pouch by attachment means such as those as are well known to those skilled in the art, for example, double sided pressure sensitive adhesive tapes, hot melt glues, or other adhesives. The absorbent pad 184 is preferably secured and held immobile to the bottom and lower portions of the walls 180 of the conic pouch by a uniform continuous layer of adhesive. The absorbent pad 184 can comprise materials commonly used in absortive devices and wellknown in the art, for example, a multiplicity of plies of creped cellulose wadding, fluffed cellulosic fibers or comminuted wood pulp generally referred to as airfelt, or textile fibers or other absorbent materials. It is desired that a tissue paper envelope 183, preferably comprised of wet strength tissue paper or the like, is utilized to encapsulate the airfelt as well as any of the other abovementioned materials, and provide an absorbent pad 184 exhibiting satisfactory in use integrity. The foregoing description of the absorbent materials and of the tissue paper to encapsulate the absorbent pad are also applicable to the other preferred embodiments of the pouch to receive and retain fluid body wastes, which will be hereinafter described.

FIG. 72 illustrates the preferred embodiment 88 of the pouch to receive and retain fluid body wastes adapted to the disposable use, having a crescent-like shape with an elliptical hole 241 defined therein and preferably comprising, as the previously described embodiment 86 of the pouch, an integral laterally outwardly projected flange 186 with a suitable width located along the periphery of the elliptical hole 241 which is also of a size to provide adequate room for the penis 8c and corresponds to the size of the generally ellptical hole located on the lower portion of the preferred embodiments of the garment 84, 89, 84a, 89a, 108, 110, 108a and 110a in order to be aligned with it, when the pouch is affixed by means of the flange 186 as previously mentioned. The crescent-like shaped pouch 88 has a backing layer 189 made of polyethylene film and a facing layer 188 made of porous non-woven fibrous web or in another embodiment (not shown) a facing layer made of polyethylene film.

The crescent-like shaped pouch 88 also includes an absorbent pad 191 encapsulated within a tissue paper 190. The absorbent pad is configured to define, in a preferred embodiment, a crescent-like shaped absorbent pad 191 (see also FIGS. 43 and 50) and is located at the bottom of the pouch and raising upwards along the seam 192 (shown in FIG. 73), i.e. at the front and back of the pouch, and in another preferred embodiment the absorbent pad 191 is configured to define a crescent-like shape with a flat top, and it is located at the bottom of the pouch and over the lower portions of the walls 187 as shown in FIG. 72. In all embodiments the absorbent pad should have a suitable thickness sufficient to absorb all fluid waste and is secured within the pouch as previously described for the conic pouch 86.

FIG. 73 illustrates a mode in which the crescent-like shaped pouch 88 may be constructed, showing the plan view of the two walls 187 before being sealed, and the flange 186. The seam lines 192 are of the shape best seen in this figure, and being outwardly curved at the front and relatively linear at the back. The sealing of the seam lines 192 preferably precedes the sealing of the flange 186 to the periphery of the so formed elliptical hole 241. Thereby, the flange 186 is preferably cut, after the walls 187 of the pouch are sealed, so as to design the flange 186 following the contour of the elliptical hole 241 of the pouch, thus defining the outer ellipsis of the elliptical flange 186, with the necessary fullness. Of course, the crescent-like shaped pouch 88 may be constructed in any other convenient way.

Turning now to FIG. 74 there is shown the preferred embodiment 193 of the pouch to receive and retain fluid body wastes, adapted to the disposable use, having a semispherical shape with a circular hole 231 defined therein and preferably comprising also, as the aforementioned embodiment, an integral laterally outwardly projected narrow flange 194, located along the circumference of the circular hole 231 which is of a size to provide adequate room for the vulva 29c and corresponds to the size of the generally circular hole located on the lower portion of the preferred embodiments of the garment 130, 132, 134, 130a, 132a, 134a, 154, 156, 158, 154a, 156a and 158a, in order to be aligned with it, when the pouch is affixed by means of the flange 194 as stated earlier. The semispherical pouch 193 may be constructed for example with a sequence of curved sided triangular segments 195 as shown in FIG. 74. The sealing of the curved sided triangular segments forming sealed seams 230 preferably precedes the sealing of the flange 194 to the periphery of the so formed circular hole 231. Thereby, the flange 194 is preferably designed and cut in a like manner as stated for the aforementioned embodiments, after the curved sided triangular segments are sealed. The semispherical pouch 193 may also be constructed in any other suitable way. The semispherical pouch has a backing layer 197 made of polyethylene film and a facing layer 196 made of porous nonwoven fibrous web or, in another preferred embodiment (not shown) a facing layer made of polyethylene film.

The semispherical pouch 193 also has an absorbent pad 199 encapsulated within a tissue paper 198 configured to define a semispherical shape and located at the bottom of the pouch and over the lower portion of the walls of the pouch, formed by the curved sided triangular segments 195. The absorbent pad 199 is secured within the pouch as previously described.

FIG. 75 illustrates another preferred exemplary embodiment of the pouch to receive and retain fluid body wastes, to be worn by female dogs, which is similar to the embodiment illustrated in FIG. 74 but unlike the embodiment of FIG. 74, the embodiment of FIG. 75 is adapted to the reusable-washable use of the garment so that similar reference numerals accompanied by a letter have been used to establish the aforementioned difference when designating those elements in FIG. 75 which correspond with those in FIG. 74. The embodiment of the pouch 193a has a semispherical shape as the previous embodiment of FIG. 74, comprising also an integral laterally outwardly projected flange 194a with a suitable width and a backing layer 197a made of vinyl and a facing layer 200 made of vinyl. The walls of the semispherical pouch 193a are formed by the previously described curved sided triangular segments 195a forming sealed seams 230a. The semispherical pouch 193a, as stated earlier is adapted to the reusable-washable use of the garment (this use as applied to the different embodiments of the garment will be described later in more detail) and thereby it is provided with an integral flange 201 having a suitable width and placed transversally within the pouch along its circumference, and being laterally inwardly projected, and located approximately at the middle of the semispherical pouch, in order to form a pocket in which the absorbent pad 199a, having a suitable size configured to define a semispherical shape and encapsulated within a tissue paper 198a, is inserted and enclosed, thus remaining confined within the bottom of the pouch before applying the garment to the wearer, instead of being the absorbent pad attached permanently to the bottom of the pouch as in the embodiment of FIG. 74. After the garment has been used, the absorbent pad 199a is removed from the pocket formed by the flange 201, and discarded. The flange 201 is secured preferably by means of a short rim 202 to the walls of the pouch formed by the curved sided triangular segments 195a preferably by heat sealing, although adhesives or the like may be used. FIG. 75 shows the rim 202 partially bonded.

FIG. 76 illustrates the semispherical pouch 193a showing another preferred embodiment of the flange 201a having a longer rim 203 flush with the edge of the opening 231a of the semispherical pouch 193a. The description as well as the location of the flange 201 with rim 202 and of the flange 201a with rim 203 of the semispherical pouch 193a of FIGS. 75 and 76 also applies to the preferred conic shaped pouch 86 of FIG. 70 and to the preferred crescent-like shaped pouch 88 of FIG. 72 when adapted to the reusable-washable use of the garment, with the flange extending along the circumference of the conic shaped pouch 86 or along the ellipsis of the crescent-like shaped pouch 88. Of course, any other way of applying the pocket within the pouches of FIGS. 70, 72, 75 and 76 or any other type of pocket could also be employed besides the one described herein as long as it fulfills the purpose of holding the absorbent pad and of keeping it confined to the bottom of the pouch. In a like manner the preferred conic shaped pouch 86 and the preferred crescentlike shaped pouch 88 adapted to the reusable-washable use of the garment have the backing and facing layers preferably made of vinyl as described for the embodiment 193a of FIGS. 75 and 76.

Referring now to FIGS. 77, 78 and 79 these figures illustrate the preferred embodiments 205, 210 and 212 respectively of a flat pouch having a substantially rectangular shape to be worn by female dogs and which may be used in association with any of the preferred embodiments of FIGS. 56, 57, 58, 61, 63, 64, 65 and 68 and which is provided on the inner surface of the solid lower portion, extending also a suitable distance over the back portion of the abovementioned embodiments and being of the shape best seen in FIGS. 77, 78 and 79. FIGS. 77 to 79 illustrate the lower portion and a fragment of the back portion of the embodiment 134 of FIG. 59, provided with the preferred embodiments 205, 210 and 212 of the flat pouch, while FIGS. 80 and 82 illustrate the solid lower portion and a fragment of the back portion of the preferred embodiments 158 of FIG. 66 and 158a, with incurved lateral edges, of FIG. 69, provided with the preferred embodiments 212 and 210 of the flat pouch. Basically, the embodiments 205, 210 and 212 of the flat pouch are constructed in a similar way for the disposable use as well as for the reusable-washable use of the garment, and differing in reference to the material employed, i.e. for the disposable use of the garment preferably polyethylene film and for the reusable-washable use of the garment preferably vinyl sheeting, and also differing in reference to the adjustable straps which are provided in the aforementioned uses, i.e. in the disposable use the adjustable straps may be plain 131 or elasticized 151 as shown in FIGS. 77 and 78 respectively, while in the reusable washable use, the adjustable straps may be plain (see also FIG. 77) or may be of an elastic fabric strip as shown in FIG. 79. Thus, FIGS. 77 and 78 illustrate the flat pouch 205 and 210 adapted to the disposable use, and FIG. 79 illustrates the flat pouch 212 adapted to the reusable-washable use. Therefore, similar reference numerals accompanied by a letter to indicate the aforementioned difference has been used in FIG. 79 to designate those elements in FIG. 79 which correspond with those of FIGS. 77, 78 and also with those of FIG. 59.

The absorbent pad which is incorporated in the embodiment of the flat pouch of FIGS. 77 to 79, is preferably permanently attached inside the pouch in the disposable use of the garment, and inserted into the pouch in the reusable-washable use of the garment before each use and removed from the pouch after each use, to be discarded. In reference to the placement of the absorbent pad, the embodiments 210 and 212 of the flat pouch, which have an open end 229 (FIGS. 78, 80 and 82) and 229a (FIG. 79) are more suitable for the reusable-washable use of the garment, while the embodiment 205 which has close ends (FIG. 77) is more suitable for the disposable use of the garment, although, as stated earlier, any one of the abovementioned embodiments 205, 210 and 212 may be adapted to either use.

Turning now to FIG. 77 this figure illustrates the preferred embodiment 205 of the flat pouch provided on the inner surface of the solid lower portion 143 and also extending a suitable distance over the back portion 142 of the preferred embodiment 134 of the garment of FIGS. 58 and 59, wherein the flat pouch 205 is formed by the facing layer 204, which is superposed and coextensive with the backing layer 147, the facing layer 204 having a generally oval hole 206 defined therein at the level of the lower portion 143, located generally at the center of the flat pouch 205 and immediately below the back portion indicated by the lateral line 138 and oriented towards the back end 140 in order to be positioned wherein all fluid discharges will be absorbed by the absorbent pad 208 and being of a suitable size in order to provide adequate room for a generally rectangular absorbent pad 208 encapsulated within a tissue paper 209, which is inserted into the pouch, and in order to leave uncovered a suitable area of the surface of the absorbent pad which is to be in contact with the female wearer, in order to receive and retain the discharge of fluid body wastes. The facing layer 204, as well as the backing layer 147, are made of polyethylene film in the disposable use and vinyl sheeting in the reusable-washable use of the garment as stated earlier, and are sealed to form the flat pouch 205 at the seams 207, along the back end 140 and the lateral edges 150 of the lower potion 143 and of the back portion 142 and at the lateral seam 207 located suitably above and parallel to the lateral line 138, thus the flat pouch 205 being closed at both ends.

The adjustable plain straps 131 have a facing and backing layers made of polyethylene film in the disposable use and of vinyl sheeting in the reusable-washable use, and secured as previously described, sandwiched between the facing layer 204 and the backing layer 147.

FIG. 78 illustrated the preferred embodiment 210 of the flat pouch, provided on the inner surface of the solid lower portion 143 and extending a suitable distance over the back portion 142 of the preferred embodiment 134 of the garment of FIGS. 58 and 59, wherein the flat pouch 210 is formed generally by one layer made of the plastic films mentioned before, which is superposed and coextensive with the facing layer 248 and backing layer 147, along the lower portion 143 and also along a suitable width over the area of the back portion 142, which is adjacent and parallel to the lateral line 138, and has a generally oval hole 211 defined on the lower portion 143, located generally at the center of the flat pouch 210 and immediately below the back portion indicated by the lateral line 138 being of a suitable size, and positioned as described for the previous embodiment of FIG. 77. The flat pouch 210 is sealed at the seams 207 along the back end 140 and the lateral edges 150 of the lower portion 143 and along a suitable length of the lateral edges 150 of the back portion 142, over the area of the back portion 142 which is adjacent and parallel to the lateral line 138, thus the flat pouch 210 being closed at the back end 140 and being open at the opposite end 229. The adjustable elasticized straps 151 shown in this figure being adapted to the disposable use of the garment, have a facing and backing layers made of polyethylene film and comprise an elastic member indicated with dotted lines. The adjustable elasticized straps are secured as previously described, sandwiched between the facing layer 248 and the backing layer 147.

FIG. 79 illustrates the preferred embodiment 212 of the flat pouch which is similar to the embodiment of FIG. 78 so that similar reference numerals accompanied by a letter have been used to designate those elements in FIG. 79 which correspond with those in FIG. 78, and no further explanation thereof will be presented, except for those elements of the embodiment 212 which differ from those of the embodiment 210 of FIG. 78. The flat pouch 212 is provided with perforations 213, formed through the plastic layer, along a generally rectangular area of a suitable size, said area being located generally at the center of the flat pouch 212 and immediately below the lateral line 138b and extending towards the back end 140b, whereby said perforations are positioned wherein all fluid discharges will pass through them, so that all fluids may be absorbed by the absorbent pad 208 positioned inside the pouch. The absorbent pad being of a generally rectangular shape and encapsulated within a tissue paper 209 and shown in this figure partially inserted into the pouch through the open end 229a. The flat pouch 212 is sealed at the seams 207a along the back end 140b and the lateral edges 150b as described for the embodiment of FIG. 78 and is open at the end 229a. The flat pouch 212 when adapted to the reusable-washable use of the garment as shown in FIG. 79, is provided as previously mentioned with plain straps or with adjustable elastic fabric straps 214 as shown in this figure, preferably made of commercially available elastic tape which is formed from parallel strands of rubber woven into a flat fabric covered tape, of course, any other resilient material that may be extended and normally is urged to contracted position, may also be employed. The adjustable elastic rabric straps 214 are secured on the lower portion 143b at the corners formed by the back end 140b with the lateral edge 150b, sandwiched between the facing layer 248a, made of vinyl sheeting and the backing layer 147b also made of vinyl sheeting, with metal or plastic rimmed eyelets 4.

FIGS. 80 and 82 illustrate the preferred embodiments 212 and 210 of the flat pouch previously described, provided on the inner surface of the solid lower portion of the preferred embodiments 158 and 158a respectively, and extending towards the back end 164 and 174a a suitable distance and also extending along a suitable width over the area of the back portion 167 and 167a which is adjacent and parallel to the lateral line 162 and 162a in order to be positioned over the lower portions 167 and 167a, wherein all fluid discharges will be absorbed by the absorbent pad 208. The embodiments 212 and 210 are sealed at the seams 207 mentioned earlier and also along a lateral seam 207 located on the lower portion parallel to, and at a suitable distance from, the lateral lines 162 and 162a of the embodiments 158 and 158a respectively.

Referring now to the reusable-washable use of the garment, all the preferred embodiments of the garment, as well as all the preferred embodiments of the pouch to receive and retain solid body wastes and of the pouch to receive and retain fluid body wastes, that have been previously described as adapted to the disposable use and thus preferably made of polyethylene film, may be adapted to the reusable washable use by using preferably vinyl sheeting for the backing layer as well as for the facing layer in the construction of the abovementioned embodiments, and by using adjustable plain straps or adjustable elastic fabric straps provided with eyelets and a buckle or with hooks or with any other suitable separable fastening means that may be reused, in order to fasten the garment around the body of the wearer. While the embodiments of the garment 108 and 110 (FIGS. 49 and 50) and 108a and 110a (FIG. 54) when adapted to the reusable-washable use will require the addition of snap fasteners or hooks, or the like, along the lateral edges of the plain lower portion 109 of FIG. 49, as well as the additional complementary fastener members placed at the area 126 and 126a (FIGS. 52 and 55) along the lateral edges of the upper portion 118 or 118a, so as to attach the plain lower portion 109 with the upper portion 118 or 118a (FIGS. 52 and 55). The elasticized lower portion 111 or 111a of FIGS. 52 and 55 is more suitable for the disposable use of the garment than for the reusable-washable use of the garment, due to the easier pliability of the polyethylene film as compared with that of vinyl sheeting. Furthermore, in reference to the embodiment 158 and 158a of FIGS. 66 and 69, when adapted to the reusable-washable use of the garment, the strap-like portions adjacent and parallel to the back end 164 and 164a of the lower portion 167 and 167a are plain, since the embodiment of elasticized strap-like portions is more suitable, as stated before in reference to the elasticized lower portion, for the disposable use of the garment. The straps connecting the back portion to the lower portion in the embodiments of FIGS. 46, 48, 52 and 55 are in the reusable-washable use of the garment generally preferably elastic fabric straps to provide a snug fit around the groins of the wearer. The backing and facing layer of vinyl sheeting that form the garment and pouches in the reusable-washable use of the garment are also preferably bonded together along the entire interface between them, although if desired they may be bonded only along their margins, preferably by heat sealing although adhesives or the like may also be used.

Turning now to FIGS. 81 and 83 these figures exemplify with some of the preferred embodiments the reusable-washable use of the garment, illustrating the preferred embodiment of the garment 1b provided with the pouch 22a and the preferred embodiment of the garment 89b provided with the pouch 22a and 88a respectively. These embodiments are similar to the embodiments 1 and 89 of FIGS. 1 and 44, but unlike the embodiments of FIGS. 1 and 44 the embodiments of FIGS. 81 and 83 are adapted to the reusable-washable use of the garment, so that similar reference numerals accompanied by a letter have been used to indicate the aforementioned difference when designating those elements in FIGS. 81 and 83, which correspond with those in FIGS. 1 and 44. FIG. 81 shows the adjustable elastic fabric straps 216 surrounding the groins and the upper thighs of the wearer, secured to the back portion 26b of the garment at both ends of the back end 38b, with eyelets 4 and being provided at their free ends with a hook 215 to be attached with a folded piece of elastic fabric strip 216a forming a loophole also secured to the lateral edges 39b of the upper portion 36b along the portion adjacent to the front end 13b with an eyelet 4. The adjustable straps 297a and 298a are also shown around the pouch 22a. FIG. 83 shows the adjustable elastic fabric straps 219, 217 and 218 secured to the marginal edges of the garment with eyelets 4, at the areas previously described. The straps 217 and 218 are provided at their free ends with hooks 215 to be attached respectively with folded pieces of elastic fabric strip forming a loophole 217a and 218a which are secured to the marginal edges of the garment with eyelets 4 at the areas previously described, as best seen in this figure, while the straps 219 surrounding the groins of the wearer and connecting the back portion 92b with the lower portion 93b are secured at both ends with eyelets 4. The adjustable straps 297a and 298a are also shown around the pouch 22a.

FIGS. 84, 85 and 86 show several modes in which the adjustable straps may be secured to the marginal edges of the garment in the reusable-washable use of the garment, thus the adjustable plain strap shown in FIG. 84 comprises a backing layer 222 and facing layer 223 of vinyl bonded together preferably along the entire interface between them, although if desired the backing and facing layers 222 and 223 may be bonded only along their periphery, using preferably heat sealing, although adhseives or the like may also be used. The adjustable plain straps are sandwiched between the backing layer 220 and the facing layer 221 of vinyl, and being sealed at 224 to the marginal edges of the garment preferably by heat sealing, although adhesives or the like may also be used, and being also reinforced at the marginal edges of the garment with an eyelet 4 which may be inserted by pressure or by any other suitable way, while the adjustable plain strap shown in FIG. 85 which is similar to the one of FIG. 84 is sandwiched between the backing layer 220 and facing layer 221 and sealed at 224 to the marginal edges of the garment. The adjustable plain straps are preferably provided on their free ends with a series of metal or plastic or the like rimmed eyelets 4, as shown in FIG. 17 for the disposable use of the garment, to be engaged with a buckle 3 made of metal, plastic or the like secured to the marginal edges of the garment as shown for example in FIG. 3 for the disposalbe use of the garment, although if desired the adjustable plain straps may be provided on their free ends with a hook 215 to be attached with a folded piece of double layer vinyl forming a loophole, secured to the marginal edges of the garment, in a like manner as shown in FIGS. 81 and 83 for the adjustable elastic fabric straps. Also the adjustable plain straps may be provided with any other suitable fastening means. The aforementioned preferred fastening means are also applicable to the adjustable elastic fabric strap, shown in FIG. 86 sandwiched between the backing layer 220 and the facing layer 221 and secured to the marginal edges of the garment with an eyelet 4, while the margins are sealed at 224 on each side of the adjustable elastic fabric strap.

Referring now to the attachable reusable-disposable use of the garment, all the preferred embodiments of the garment, as well as all the preferred embodiments of the pouch to receive and retain solid body wastes and of the pouch to receive and retain fluid body wastes that have been previously described as adapted to the disposable use, and thus, preferably made of polyethylene film, and as adapted to the reusable-washable use, and thus, preferably made of vinyl sheeting, may be adapted to the attachable reusable-disposable use, by using for the reusable wearer-contacting garment preferably soft fabric such as blue jeans, cotton, corduroy or the like, although if desired, it may also be made of opaque vinyl sheeting preferably matte and smooth or embossed with a fine pattern to provide a textile-like texture to the garment, and preferably being of suitable colors as described earlier, and by using, for the attachable disposable pouches preferably polyethylene film. In the attachable reusable-disposable use of the garment the disposable pouches are attached with fastening means to the reusable wearer-contacting garment before applying the garment to the wearer and detached after used to be disposed of. In addition, the adjustable straps in the attachable reusable-disposable use of the garment are adjustable plain straps made of soft fabric, when the reusable garment is made of soft fabric, or made of vinyl when the reusable garment is made of vinyl, or they are adjustable elastic fabric straps. And the abovementioned adjustable straps are provided with eyelets and a buckle or with hooks or with any other suitable fastening means that may be reused, in order to fasten the garment around the body of the wearer. While in the embodiment of the garment 108 and 110 (FIGS. 49 and 50) and 108a. and 110a (FIG. 54) when adapted to the attachable reusable-disposable use, the wearer-contacting garment will require the addition of snap fasteners or hooks or the like in the same areas of the upper portion of the garment as described for the reusable-washable use of the garment, and apply also to the linear lateral edges of the plain lower portion 109 as well as to the linear lateral edges of the elasticized lower portion 111, which in the attachable reusable-disposable use of the garment is provided with commercially available elastic tape, formed from parallel strands of rubber woven into a flat fabric covered tape, similar to the one used for the adjustable elastic fabric straps previously described. Each one of the elastic fabric strips has a suitable width, and is located in the same area on the elasticized lower portion made of soft fabric adapted to the attachable reusable-disposable use of the garment as described for the elastic member 129 on the elasticized lower portion 111, in the disposable use of the garment and secured to the inner side of the lower portion by over-stitching. Also the elasticized lower portion of the embodiments 108, 110, 108a and 110a, may be made in the attachable reusable-disposable use of the garment of ah elasticized fabric, formed for example with parallel strands of rubber stitched to the inner surface of the soft fabric used for the reusable garment. Furthermore, in reference to the embodiments 158 and 158a of FIGS. 66 and 69 when adapted to the attachable reusable-disposable use of the garment, the strap-like portions adjacent and parallel to the back end 164 and 164a of the lower portion 167 and 167a are in a preferred embodiment plain strap-like portions made of soft fabric and in another embodiment the strap-like portions are provided with the abovementioned elastic fabric strip having a suitable width and located along the same area as described for the elastic member 178 on the elasticized strap-like portions 175, in the disposable use of the garment. The straps connecting the back portion to the lower portion in the embodiments of FIGS. 46, 48, 52 and 55 are also in the attachable reusable-disposable use of the garment, generally preferably elastic fabric straps, to provide a snug fit around the groins of the wearer. And in the attachable reusable-washable use of the garment the reusable garment is analogous to the previously described reusable garment in the attachable reusable-disposable use of the garment, so that no further explanation will be presented thereof, while the attachable pouches are preferably made of vinyl sheeting in which case they may be washed and reused and they are also attached with fastening means to the reusable wearer-contacting garment, except in the embodiments 205a, 210a and 212a of the flat pouch of FIGS. 92, 93 and 94 to be worn by female dogs, where the washable flat pouch is secured to the lower portion of the garment by stitching. These embodiments will be described later in detail. In the attachable reusable-washable use of the garment the embodiments 86, 88 and 193 of the pouch to receive and retain fluid body wastes are attachable washable pouches provided with a flange inside the pouch to form a pocket in order to hold the absorbent pad therein as shown in FIGS. 75 and 76.

Turning now to FIGS. 87 and 88, these figures exemplify with some of the preferred embodiments the attachable reusable disposable use of the garment and these figures also serve to illustrate the attachable reusable-washable use of the garment. FIG. 87 illustrates the preferred embodiment of the reusable wearer-contacting garment 1c, and attachable disposable pouch 22b, and FIG. 88 illustrates the preferred embodiment of the reusable wearer-contacting garment 130b and the attachable disposable pouches 5a and 193b. While FIGS. 92, 93 and 94 illustrate the preferred embodiments 205a, 210a and 212a of the reusable washable flat pouch, of the attachable reusable-washable use of the garment, previously mentioned showing the partially inserted disposable absorbent pad 208, encapsulated within the tissue paper 209. And FIGS. 95 and 96 illustrate the preferred embodiments 205b and 212b of the attachable disposable flat pouch and these figures also serve to illustrate the attachable reusable-washable use of the garment. The abovementioned embodiments of the garment 1c (FIG. 87) and 130b (FIG. 88) are similar to the embodiments 1 and 130 of FIGS. 1 and 56 respectively, and the abovementioned embodiments of the pouches 22b, 5a, 193b, 205a, 210a, 212a, 205b, and 212b are similar to the embodiments of the pouches 22, 5, 193, 205, 210 and 212 of FIGS. 35, 27, 74, 77, 78 and 79 respectively, but unlike the embodiments of FIGS. 1, 56, 35, 27, 74, 77, 78 and 79, the embodiments of FIGS. 87, 88, 95 and 96 show the attachable reusable-disposable use of the garment and also serve to illustrate the attachable reusable-washable use of the garment, and FIGS. 92, 93 and 94 show the attachable reusable-washable use of the garment, so that similar reference numerals accompanied by a letter have been used to indicate the aforementioned difference when designating those elements in FIGS. 87, 88, 92, 93, 94, 95 and 96, which correspond with those in FIGS. 1, 56, 35, 27, 74, 77, 78 and 79.

Referring now to FIG. 87 there is shown the embodiment 1c of the reusable wearer-contacting garment to be worn by male or female dogs alike, preferably made of soft fabric such as blue jeans, cotton, corduroy or the like, having a plurality of snap fasteners 25 affixed on the outer surface of the garment along the periphery of the opening 27c for the anus and the root of the tail, located on the back portion 26c of the garment 1c, and having adjustable elastic fabric straps 225 surrounding the groins and upper thighs of the wearer, secured to the back portion 26c, at both ends of the back end 38c and also having folded pieces of elastic fabric strips forming loophole 225a secured to the lateral edges 39c of the upper portion 36c, along the portion adjacent to the front end 13c, as by over-edge stitching 227, preferably stitched thereto, as shown in FIG. 87, whereby the needle thread of the stitching provided along the back end 38c and the lateral edges 39c of the upper and back portions respectively passes through the elastic fabric straps 225 and through the folded piece of elastic fabric strip forming a loophole 225a to secure the same to the back portion 26c and to the upper portion 36c respectively. Over-edge stitching 227 is also provided along the periphery of the opening 27c. The adjustable elastic fabric straps 225 are provided at their free ends with a hook 215 which is to be engaged with the elastic fabric loophole 225a. FIG. 87 also shows the disposable pouch 22b preferably made of polyethylene film and comprising a backing layer and a facing layer as described before for the disposable use of the garment having a plurality of snap fasteners 25 affixed on the outer surface of the pouch along the periphery of the opening 68b for the anus and the root of the tail, located on the back portion of the pouch 22b, and being the snap fasteners 25, placed along the aforementioned opening 27c and openig 68b, complementary, thus as seen in FIG. 87, the male fasteners 25a placed along the periphery of the opening 68b located on the back portion of the pouch 22b are adapted to engage with the female fasteners 25b placed along the periphery of the opening 27c located on the back portion of the garment 1c. The snap fasteners may be affixed inserting them by pressure or by any other suitable way, while snap fasteners are preferred, any other type of separable fastener may also be employed. There is also shown in FIG. 87 the snap fasteners 25 placed on the adjustable straps 23 and 24 provided at the front on the top of the pouch, where the walls of the pouch meet, and two strips of pressure sensitive adhesive 236 (shown in phantom), one placed near the opening 68b and parallel to its edge, and the other placed near the opnning 67b and parallel to its edge as well as the adjustable straps 297b and 298b which are shown also partially in phantom and bonded at 300 at the center of the back of the pouch. The adjustable strap 297b is shown partially loose. Snap fasteners 25a and 25b are also shown suitably located on the straps, in order to be fastened mainly in two positions, i.e. loose or tight around the pouch. This figure also serves to illustrate the attachable reusable-washable use of the garment as previously mentioned wherein the attachable pouch is made prefebably of vinyl sheeting and is not provided with strips 236 of pressure sensitive adhesive.

FIG. 88 illustrates the preferred embodiment 130b of the reusable wearer-contacting garment to be worn by female dogs, made preferably of soft fabric as stated before, and having female snap fasteners 25b affixed on the outer surface of the garment along the periphery of the opening 144b for the anus and root of the tail located on the back portion 142b and along the periphery of the opening 145b for the vulva located on the lower portion 143b, which are adapted to engage with complementary male snap fasteners 25a affixed on the outer surface of the pouches along the periphery of the opening 54a of the disposable pouch 5a to receive and retain solid body wastes preferably made of polyethylene film, and along the periphery of the opening 231b of the disposable pouch 193b to receive and retain fluid-body wastes made also preierably of polyethylene film respectively, as described for the previous embodiment of FIG. 87. The pouch 5a is also provided with 2 strips of pressure sensitive adhesive, not shown for clarity purposes, and the pouch 193b is provided with an attached absorbent pad 199b encapsulated within a tissue paper 198b as described for the embodiment of FIG. 74 adapted to the disposable use. There is also shown in FIG. 88 a fragmentary view of the adjustable plain straps 232 which surround the groins and upper thighs of the wearer made preferably of soft fabric, secured to thelower portion 143b as by over-edge stiching 227 and the buckle 3 secured as described in FIGS. 20, 23 and 25 to the lateral edges 150b of the upper portion 141b, along the portion adjacent to the front end 148b, as by overedge stitching 227 also, as described for the embodiment of FIG. 87. The adjustable plain straps 232 are provided on their free ends with a series of eyelets 4 (not shown). This figure also serves to illustrate the attachable reusable-washable use of the garment wherein attachable pouches are made preferably of vinyl sheeting and the pouch to receive and retain fluid body wastes is provided with a flange inside the pouch as shown in FIG. 75, and the pouch to receive and retain solid body wastes is not provided with strips 236 of adhesive.

FIGS. 89, 90 and 91 illustrate several modes in which the adjustable straps may be secured to the marginal edges of the reusable garment in both attachable uses of the garment, i.d. disposable and washable alike, thus, FIG. 89 shows a fragmentary view of the inner side of the front end 13c (FIG. 87) wherein the elastic fabric loophole 225a is sandwiched inside the hem 226 folded down the edge of the front end 13c, as by over-edge stitching 227, while FIGS. 90 and 91 show fragmentary views of the inner side of the marginal edges of the garment wherein the adjustable plain straps 232 and the adjustable elastic fabric strap 225 are secured to the margins, as by over-edge stitching 227. In addition, the adjustable plain strap 232 as well as the adjustable elastic fabric strap 225 may be reinforced with an eyelet 4 as shown in FIG. 91.

Turning now to FIGS. 92, 93 and 94, the preferred embodiments of the flat pouch to be worn by female dogs, illustrated in these figures are similar as stated before to the embodiments of FIGS. 77, 78 and 79, so that no further explanation of similar features will be thereof presented. In the attachable reusable-washable use of the garment, the embodiments 205a, 210a and 212a of the flat pouch are formed with one layer preferably of vinyl sheeting, although any other suitable commercially available water-proof and flexible material may be employed to prevent the soiling of the backing layer 233 of the garment, made of soft fabric, and the flat pouch is secured to the lower portion 143c and also along a suitable width over the area of the back portion 142c which is adjacent and parallel to the lateral line 138c of the embodiment 134c of the garment, as by over-edge stitching 227, thus joining together the flat pouch to the backing layer 233 made of soft fabric, along the back end 140c, the lateral edges 150c and, on the embodiment 205a also along the lateral seam 227 located suitably above and parallel to the lateral line 138c. Thereby, the embodiments 210a and 212a are closed at the back end 140c and are open at the opposite end 229b, while the embodiment 205a is closed at the back end 140c and also at the opposite end, along the seam 227. The generally rectangular absorbent pad 208 encapsulated within a tissue paper 209 is shown partially inserted. The adjustable plain straps 235, as well as the adjustable elastic fabric straps 234 are secured to the lower portion 143c, at the corners of the back end 140c, sandwiched between the flat pouch and the backing layer 233 and stitched thereto as illustrated in FIGS. 92, 93 and 94. FIG. 93 has parts of the flat pouch broken away to show in more detail the securement of the adjustable straps. In addition, the adjustable plain straps 235 as well as the adjustable elastic fabric strap 234 may be reinforced with an eyelet 4 as shown in FIG. 92.

The flat pouch, in the embodiments 205a, 210a and 212a, adapted to the attachable reusable-washable use of the garment, is permanently affixed by stitching to the lower portion of the preferred embodiments of the garment to be worn by female dogs and the absorbent pad 208 encapsulated within a tissue paper 209 is discarded after use. While the embodiment 193 of the pouch to receive and retain fluid body wastes as well as the embodiments of the pouch to receive and retain solid body wastes adapted to the attachable reusable-washable use, are attached with snap fasteners to the reusable garment.

FIGS. 95 and 96 illustrate the preferred embodiments 205b and 212b of the flat pouch adapted to the attachable reusable-disposable use, which are similar to the embodiments of FIGS. 92 and 94 and differing only in that the embodiments 205b and 212b are provided with separable fasteners, so the pouch may be attached to the reusable garment when in use and detached after use to be disposed of, in a like manner as the embodiments shown in FIGS. 87 and 88. The embodiment 205b provided with an oval hole 206b, and the embodiment 212b provided with perforations 213b, comprise a backing layer superposed and coextensive with a facing layer made preferably of polyethylene film, and the generally rectangular absorbent pad 208 preferably encapsulated within a tissue paper 209, is sandwiched between the backing layer and the facing layer, and held therein relatively immobile, preferably by bonding the backing layer and the absorbent pad together with the aforementioned attachment means. The facing layer 244 in the embodiment 205b, has an oval hole 206b defined therein, while the facing layer 246 in the embodiment 212b has perforations 213b defined therein, and said oval hole 206b and said perforations 213b are located generally at the center of said oblong flat pouch immediately below the back portion, wherein all fluid discharges will pass, and in both embodiments 205b and 212b, the absorbent pad 208 is sandwiched between the facing and backing layers as mentioned above, and in the disposable use of the garment the facing layer is attached to the backing layer all along their periphery as well as where their surfaces meet, that is in the areas beyond the periphery of the absorbent pad 208 by a facing layer-backing layer highly flexible attachment means. The embodiments 205b and 212b are provided on the outer surface of their backing layers with a plurality of male snap fasteners 25a, affixed all along their periphery, adapted to engage with the female snap fasteners 25b, placed on the inner surface of the solid lower portion 143d of the embodiment 134d of the garment, adjacent to the over-edge stitching 227 along the back end 140d and over the adjustable straps as shown in FIGS. 95 and 96 and along the lateral edges 150d, and at a suitable distance over and parallel to the lateral line 138d, as shown in FIGS. 95 and 96. FIGS. 95 and 96 also serve to illustrate the attachable reusable-washable use of the garment wherein the attachable pouch 205b, is made preferably of vinyl sheeting and the backing and facing layers are bonded only along their periphery, and the attachable pouch 212b adapted to the attachable reusable-washable use of the garment is also preferably made of vinyl sheeting and is open at the end above the lateral line 138d, and the backing and facing layers are bonded only along their periphery except at the open end. The attachable reusable-washable flat pouch in the embodiments 205b and 212b is provided with an insertable absorbent pad 208 encapsulated with tissue paper 209, which is to be discarded after use. In the embodiment of the attachable flat pouch 205b and 212b the adjustable plain straps 242 and the adjustable elastic fabric straps 243 are secured on the inner side of the solid lower portion 143d as by over-edge stitching 227, as best seen in FIGS. 95 and 96.

The aforementioned embodiments 205a, 210a and 212a of the flat pouch of FIGS. 92, 93 and 94 which are permanently affixed to the lower portion 143c of the garment 134c as well as the aforementioned embodiments 205b and 212b of the flat pouch, which are attachable to the lower portion 143d of the embodiment 134d and to be disposed of or washed and reused as described before, are also provided on the inner surface of the solid lower portion of the embodiments 158 and 158a of the garment, in the same location, as shown in FIGS. 80 and 82, for the disposable use of the garment.

In the description that follows there is given an example of a mode in which the garment of the present invention may be adapted to be worn by both male and female cats, and which could be subject in practice to modifications and adjustments whenever convenient. Of course, any other way of adapting the garment to be worn by cats may also be employed. Basically, the previously described preferred uses of the garment, i.e. as an integral disposable garment, as an integral reusable-washable garment, as an attachable reusable-disposable garment and as an attachable reusable-washable garment, are applicable to the garment to be worn by cats, as well as the previously described preferred embodiments of adjustable straps plain, elasticized, or elastic fabric straps, and the previously described preferred fastening means and also the occludent and attachment means to seal the disposable pouches. In addition, the previously mentioned materials forming the backing and facing layers of the garment, pouches and straps as well as the sealing techniques or adhesives that may be employed in the construction of the garment, pouches, and straps, are also applicable to the garment adapted to be worn by cats.

Specifically, the preferred embodiment 1 of the garment shown in FIG. 1 is particularly suitable to be adapted to be worn by cats, as well as the preferred embodiment 5 of the pouch of FIG. 27. Therefore, these embodiments were selected to exemplify the abovementioned adaptation, as it will be described next.

Figure 110:
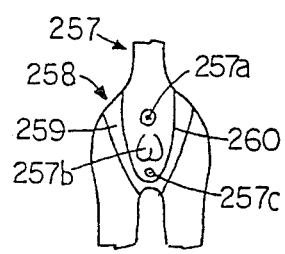
FIGS. 110 to 112 are fragmentary schematic views of the rear of a male cat and of a female cat respectively, with FIG. 111 indicating with doted lines the removed testicles of a castrated male cat, showing several modes in which the back portion of the garment may be adapted, to be worn by cats.
Figure 111:
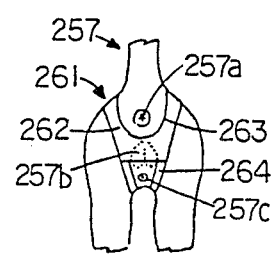
Figure 112:
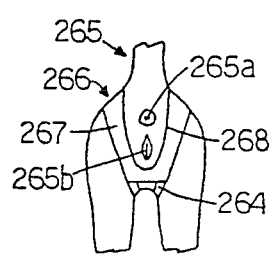

Turning now to FIGS. 110 to 112, these figures illustrate the embodiments 258, 261 and 266 of the disposable garment adapted to be worn by cats. FIG. 110 shows the rear of a male cat 257, illustrating the back portion 259 of the embodiment 258 having a generally oval hole 260 defined therein of a size to provide adequate room for the tail, anus 257a, testicles 257b and penis 257c, while the back portion 262 of the embodiment 261 shown in FIG. 111, which is suitable to be worn by male cats that have been castrated, has a generally circular hole 263 defined therein of a size to provide adequate room for the tail and anus 257a. This figure shows the removed testicles with dotted lines and adjustable plain straps 264. FIG. 112 shows the rear of a female cat 265 illustrating the back portion 267 of the embodiment 266 having a generally oval hole 268 defined therein of a size to provide adequate room for the tail, anus 265a and vulva 265b. There are also shown the adjustable plain straps 264.

Figure 113:
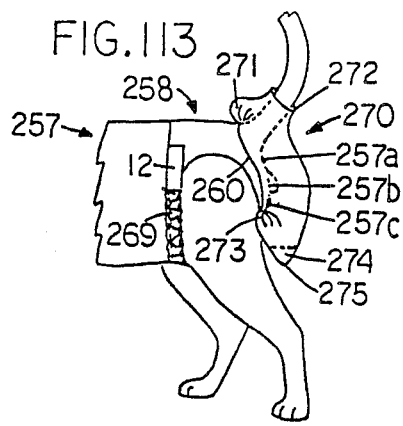
FIGS. 113 and 114 are fragmentary side views of a male and of a female cat respectively illustrating the disposable garment adapted to be worn by male and female cats respectively, provided with one pouch to receive and retain solid as well as fluid body wastes.
Figure 114:
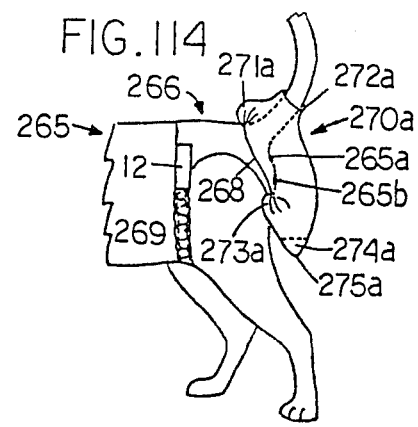

FIGS. 113 and 114 show the embodiments 258 and 266 of the garment as applied to a male and to a female cat respectively, provided with one pouch adapted to receive and retain solid as well as fluid body wastes These figures also show the adjustable elasticized straps 269 provided with fastening tapes 12. Basically, the pouch 270 shown in FIG. 113 is similar, as stated earlier, to the preferred embodiment 5 of the pouch of FIG. 27, so that the pouch of FIG. 113 is constructed and put together in a similar manner as described in FIGS. 27, 28 and 29. Therefore, the embodiment 270 of the pouch is provided preferably with puffs 271 and 273 above and below the opening 260, and has also an opening 272 for the tail to come out from the pouch. The embodiment 270 of the pouch differ from the embodiment 5 of FIG. 27 in that the embodiment 270 has a larger and generally oval opening to surround the tail, anus and genitalia of the wearer and in that the embodiment 270 is provided in all the preferred uses of the garment, at the bottom 275 with an absorbent pad 274 (shown in phantom) preferably encapsulated in a tissue paper or the like as described before, and having generally a flat top. The absorbent pad 274 is attached, in the disposable use of the garment, to the bottom of the pouch as previously described, while in the reusable-washable use of the garment the pouch 270 is provided with a laterally inwardly projected flange inside the pouch as previously described and shown in FIG. 75, to form a pocket in which to insert the absorbent pad 274 before using the garment and to discard it after use. In addition, the pouch 270 is also provided in all the preferred uses of the garment with the preferred embodiment of the two adjustable straps 297 and 298 of FIG. 35 or with the flange 299 of FIG. 39, which in the reusable-washable use of the garment, is placed at a suitable distance above the flange wherein the absorbent pad is inserted. The embodiment of the pouch of FIG. 114 is similar to the embodiment of the pouch shown in FIG. 113 but differing in reference to the length of the pouch and the length of the back portion of the garment as seen in FIGS. 118 and 119, so that similar reference numerals accompanied by a letter to indicate the difference in length, are used to designate those elements in FIG. 114 which correspond with those in FIG. 113, and no further explanation thereof will be presented.

Figure 115:
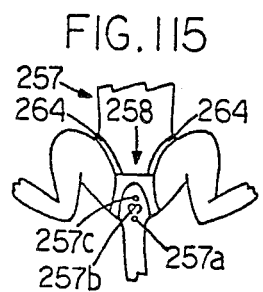
FIGS. 115 and 117 are fragmentary schematic views of the underside of a male and of a female cat respectively, illustrating the back portion of the garment without the pouch to show the opening for the anus and the respective genitalia and also the adjustable straps.
Figure 117:
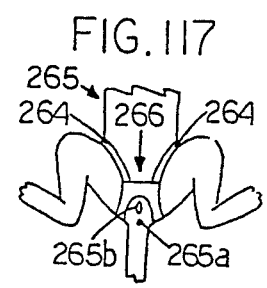

FIGS. 115 and 117 illustrate the embodiments 258 and 266 of the garment as applied to a male and to a female cat respectively, showing the opening on the back portion of the garment surrounding the tail, anus and genitalia of the wearer and also showing the adjustable plain straps 264.

Figure 116:
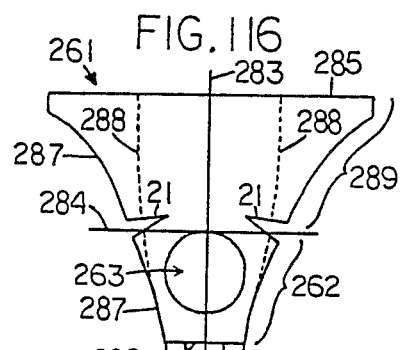
FIGS. 116, 118 and 119 are plan views illustrating several modes in which the garment may be adapted to be worn by male and by female cats respectively.
Figure 118:
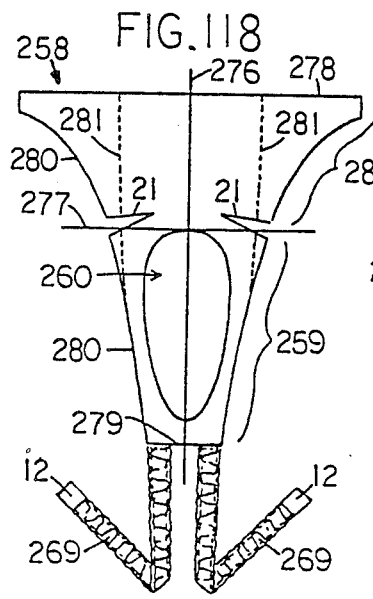
Figure 119:
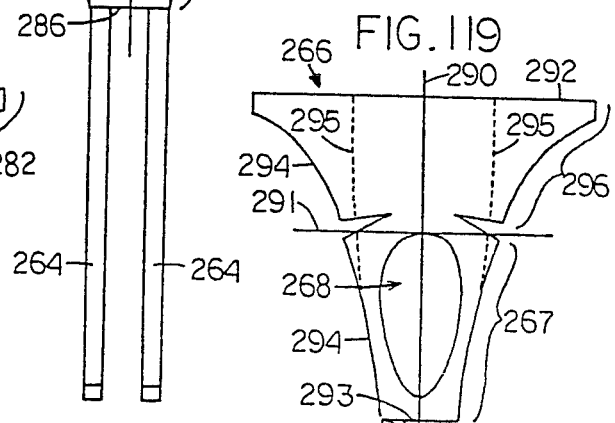

Referring now to FIGS. 118, 116 and 119, these plan views illustrate the embodiments 258, 261 and 266 of the disposable garment adapted to be worn by cats. The embodiment 258 of FIG. 118 is of the shape best seen in this figure and comprises an upper portion 282 which extends from the front end 278 to the lateral line 277, and a back portion 259 which extends from the lateral line 277 to the back end 279, having an oval hole 260 defined therein located immediately below the lateral line 277 and said oval hole 260 being generally narrower towards the back end than near the lateral line 277. The upper portion 282 is preferably provided with darts 21 located generally above the lateral line 277 in order to adapt the fitting of the garment to the croup of the wearer. The lateral edges 280 of the upper portion 282 are incurved towards the longitudinal center line 276, while the lateral edges 280 of the back portion 259 are generally linear. The adjustable elasticized straps 269 provided at their free ends with fastening tapes 12, are secured at both ends of the back end 279 sandwiched between the backing layer and the facinng layer as previously described. Dotted lines 281 indicate the lateral edges of another preferred embodiment of the garment adapted to be worn by a male cat, similar to the embodiment 258 but with narrower upper and back portions, since it was deemed unnecessary to show this narrower embodiment in a separate figure.

FIG. 116 shows the embodiment 261, which is similar to the embodiment 1 of the garment of FIG. 1 comprising an upper portion 289 extending from the front end 285 to the lateral line 284 and a back portion 262 extending from the lateral line 284 to the back end 286, having a generally circular hole 263 defined therein located immediately below the lateral line 284. The lateral edges 287 of the upper portion 289 are incurved toward the longitudinal center line 283, while the lateral edges 287 of the back portion 262 are generally linear. The adjustable plain straps 264 are provided at their free ends with fastening tapes 12, and are also secured at both ends of the back end 286. In this embodiment the back portion is shorter than in the previous embodiment of FIG. 118 and the circular hole 263 surrounds the tail and the anus 257a of the wearer being this embodiment adapted to be worn by male cats that have been castrated, as stated before. Therefore, the embodiment 261 is provided with the embodiment 5 of the pouch to receive and retain solid body waste since an absorbent pad is not needed.

The embodiment 266 of the garment shown in FIG. 119 is adapted to be worn by female cats, and therefore the back portion 267 and the oval hole 268 which surrounds the tail, the anus 265a and the vulva 265b of the wearer are slightly shorter than those of the embodiment of FIG. 118, but both embodiments are configured and put together in essentially the same manner. In addition, there are also show in FIGS. 116 and 119 dotted lines 288 and 295 indicating the lateral edges of other preferred embodiments of the garment adapted to be worn by a male and by a female cat, similar to the embodiments 261 and 266 respectively, but with narrower upper and back portions, and not shown in separate figures since it was deemed unnecessary. In these embodiments with narrower upper and back portions the adjustable straps are suitably longer to compensate for the difference in width.

In the embodiments 258, 261 and 266 of the garment the upper portion is placed generally over the croup of the wearer as shown in FIGS. 113 and 114 and the back portion is placed over the buttocks of the wearer as shown in FIGS. 110 to 112.

In the embodiments of FIGS. 120-123 the garment 1 is shown as comprising an upper and back portion with a front margin 13, secured to the wearer by elasticized straps 2 having pressure sensitive tape fasteners 12 at their free ends, merely for purposes of illustration. More particularly, each of these embodiments includes a solid waste pouch (5b in FIG. 120, 22c in FIG. 121, 5c in FIG. 122, and 5d in FIG. 123) having an entrance opening with a periphery secured at 6 to the periphery of the anal-tail opening of the garment back portion, and also having strap means for overlying the wearer's tail at a location spaced rearwardly of the root thereof. The strap means may simply be a unitary, integral portion of the pouch for extending over the tail at a location spaced rearwardly of the root, as in pouches 5b, 5c and 5d, or it may comprise straps 23, as in pouch 22c; in each case, the pouch is characterized by a gap (300 in FIGS. 120 and 123, 67c in FIG. 121, 303 in FIG. 122) through which a top portion of the tail is exposed between the strap means and the root of the tail. It will be understood that the term "strap means" is used herein broadly to designate the portion of the pouch structure overlying the tail rearwardly of the gap, in any solid waste pouch having such a gap.

As a further feature common to the embodiments of FIGS. 120-123, in each of the solid waste pouches therein shown, the periphery of the entrance opening is secured at 6 to the periphery of the anal-tail opening of the garment back portion only over an extent sufficient to encompass the anal region and opposed side portions of the root of the tail and to prevent leakage of waste from the container means. Thus, the pouch does not completely laterally surround the entire anal-tail opening of the garment back portion, but leaves a hiatus (301 in FIGS. 120, 122, and 123; 302 in FIG. 121) at the top of the latter opening, i.e. at the forward end of the gap 300, 67c, or 303.

Although it is preferred in at least many instances that the solid waste pouch completely surround (and be secured entirely around) the anal-tail opening of the garment back portion, nevertheless the pouches of FIGS. 120-123 also effectively prevent leakage of waste and provide the other advantages of the invention, because the line of attachment 6 extending around the anal region and upwardly (though only partially) around the root of the tail cooperates with the strap means to hold the margins of the gap 300, 67c or 303 against the tail so that the tail itself fully blocks the gap. The shape and dimensions of the gap edges are appropriately selected to this end.

The spacing between the garment back portion opening and the opening 7 defined by the rearward edge of the strap means need only be sufficient to prevent leakage. Also, considerable variation in size of the aforementioned gap is possible; a short or small gap 303 is provided in the embodiment of FIG. 122, while a longer or larger gap 300 or 67c is provided in the embodiments of FIGS. 120, 121 and 123.

Figure 120:
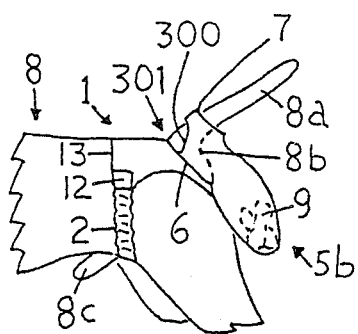
FIGS. 120 to 123 are side views of further embodiments of the invention.
Figure 121:
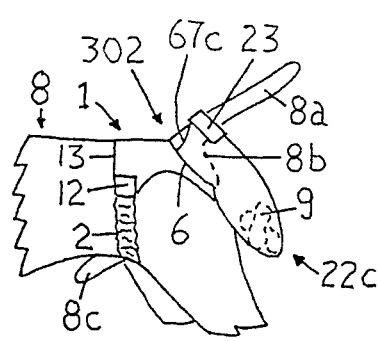
Figure 122:
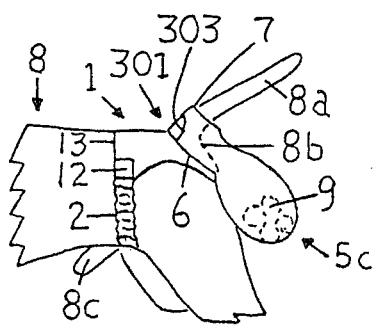
Figure 123:
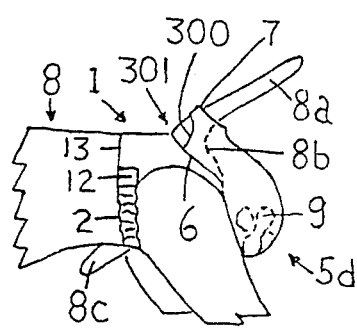

Preferably, though not necessarily, the solid waste pouch of each of FIGS. 120-123 is formed with a puff below the tail. The bottom of the pouch may be of any suitable configuration; a tapered shape (most preferred) is shown in FIGS. 120 and 121, while two further preferred and illsstrative configurations for the pouch bottom are shown in FIGS. 122 and 123 respectively, viz. a round bottom in pouch 5c and a crescent-like shaped bottom in pouch 5d. These shapes are equally applicable to other solid waste pouches already described. In addition, all the solid waste pouches employed in the various embodiments of the invention may, if desired, be fabricated of an impermeable material having small perforations, e.g. for air circulation.

Figure 124:
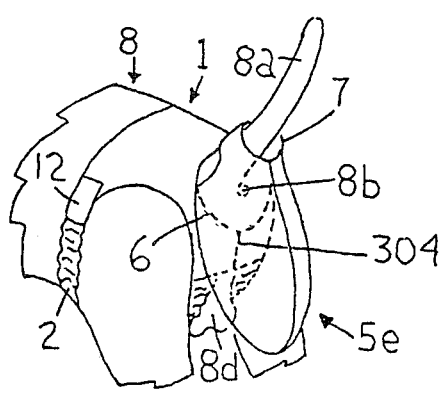
FIG. 124 is a perspective view of still another embodiment of the invention.

FIG. 124 is a view in illustration of a pouch 5e affixed at 304 along a longitudinal center line on the back portion of the garment beneath the entrance opening of the pouch.

Figure 125:
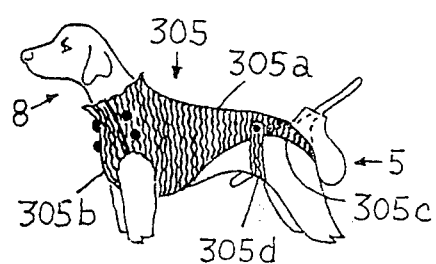
FIG. 125 is a side view of other embodiment of the invention.

FIG. 125 shows the preferred exemplary embodiment 305 of a reusable wearer-contacting garment with an attachable solid waste pouch 5 to be worn by male and female wearers alike, comprising an upper portion 305a and a lower portion 305b, defining neck, forelegs and chest receiving openings; a back portion 305c having an entrance opening encompassing the root of the tail and the anal region of the wearer along which periphery pouch 5 is attached, and adjustable straps 305d defining hindlegs receiving openings.

In a preferred embodiment, the lower portion 305b is detachably connected to the upper portion 305a over the shoulders above the forelegs, and at the front below the base of the neck of the wearer, as illustrated in FIG. 125 and in another embodiment (not shown) the upper portion 305a and the lower portion 305b are formed as a unitary integral portion comprising also openings for the neck, the forelegs and the chest of the wearer.

Furthermore, the embodiment 305 may be provided with a detachable lower portion comprising an attachable fluid waste pouch (not shown).

The embodiment 305 may be used in association with any one of the solid and fluid waste pouches already described as well as the solid waste pouches shown in FIGS. 126 to 129.

The reusable garment 305 could be made of any suitable machine or hand knitted material, such as wool, linen, cotton or any other suitable material, preferably elasticized, to provide a snug fit around the body of the wearer, so as to a prevent leakage of wastes outside the pouch, or pouches, and to adapt to wearers of different weights and top lines.

If desired, the back portion may not be elasticized.

In addition, any suitable separable fasteners may be used to fasten the garment around the body of the wearer as well as to attach the pouches to the reusable garment, such as snap fasteners, velcro tape, buckle means, zippers, or any other equally effective fastener could also be employed.

Figure 126:
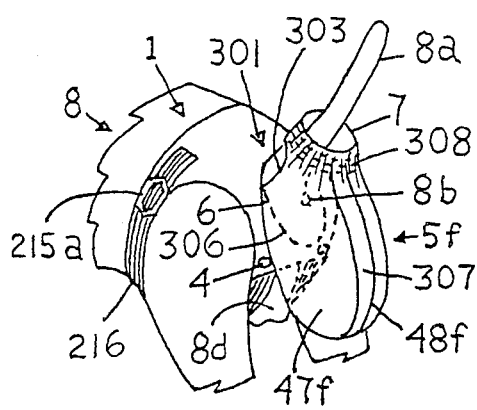
FIGS. 126 to 129 are perspective views of further embodiments of the invention.

FIG. 126 illustrates the preferred embodiment of a solid waste pouch 5f affixed to the garment 1 at 6 along the periphery of the generally oval entrance opening 306.

Straps 216 and buckle means 215a are also shown.

Pouch 5f is provided in a preferred embodiment with a plurality of elastic members 308 placed suitably along the periphery of the opening 7, parallel to its edge.

In another embodiment the elastic members 308 are provided only along the strap means constituted by a unitary integral portion of pouch 5f, and still in another embodiment, only one elastic member is provided either along the entire opening 7 or only along the strap means of pouch 5f.

The elastic members 308 permit the strap means of pouch 5f, to maintain a snug fit around tails of different thickness.

Figure 127:
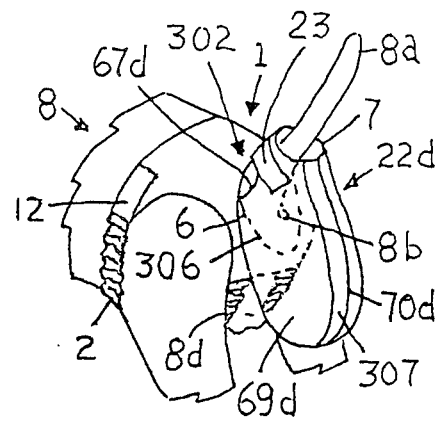
Figure 128:
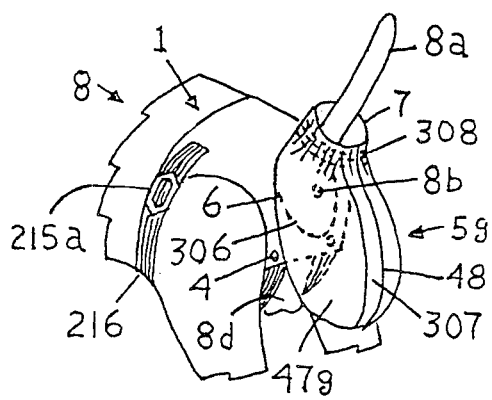
Figure 129:
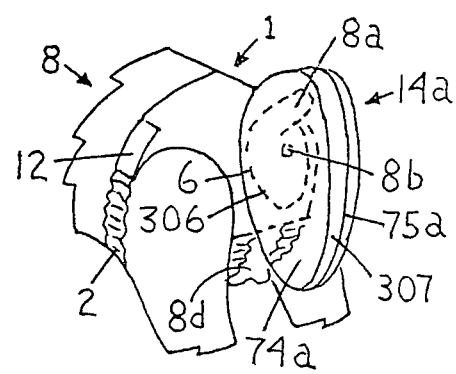

The elastic members 308 are equally applicable to the solid waste pouch 5g of FIG. 128 and to the other solid waste pouches 5 and 20 already described If desired, the adjustable straps 23 of pouch 22d (FIG. 127) could also be provided with elastic members 308.

Furthermore, there is shown in FIG. 126 a strip 307 which is illustrative of another mode in which the solid waste pouch may be constructed by attaching the strip 307 to the seams 48f of the walls 47f at the front and in another embodiment all along the seams 48f.

The strip 307 is also applicable to the solid waste pouches 22d of FIG. 127 as well as to pouches 5g and 14a (FIGS. 128 and 129) and to all other solid waste pouches already described.

In addition, the strip 307 is also applicable to the fluid pouch 88 with a crescent-like shape (shown in FIG. 73) by attaching the strip 307 to the seam lines 192 of the two walls 187.

Furthermore, in another embodiment all the previously described solid waste pouches may be provided in the integral reusable-washable garment as well as in the attachable-reusable-washable garment with disposable linings to be disposed off after each use, thus avoiding the need for repeat washings of the permanent pouch, whenever this might be preferred.

The disposable linings may be preferably shaped and dimensioned to be adapted to the shapes and dimensions of the embodiments of the solid waste pouches already described, and to be attached to the inside of the pouches, for example by providing along the outer side of the periphery of the entrance opening of the disposable linings, a strip of adhesive sufficiently strong to keep the linings securely attached around the periphery of the entrance opening of the pouches, but permitting an easy peel off of the linings after each use.

Of course, any other attachable means may also be employed.

The linings are placed inside the permanent washable pouches by inserting them through the entrance opening of the pouches, with the outer side of the walls of the linings facing the inner side of the walls of the pouches, and the outer side of the periphery of the entrance opening of the linings, facing the inner side of the periphery of the entrance opening of the pouches.

Any one of the Figures showing the solid waste pouches also serves to illustrate the disposable linings, since any one of the solid waste pouches illustrated hereinbefore is exemplary of the shapes of the disposable linings, and the adhesive strip 81 shown in FIG. 39 may serve the purpose of illustrating the adhesive strip provided along the periphery of the entrance opening of the disposable linings, therefore, no further illustration of the linings is necessary.

Turning now to FIGS. 130 to 139 any one of the preferred embodiments of the wearer-contacting garment illustrated in these figures, and which will be described hereinafter, may be used in association with any one of the solid waste pouches and in some examples, also with any one of the fluid waste pouches, already described.

Figure 130:
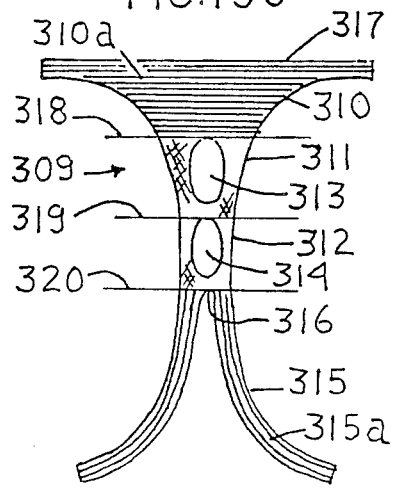
FIG. 130 is a plan view of other preferred exemplary embodiments of the garment to be worn by male and female wearers alike.
Figure 131:
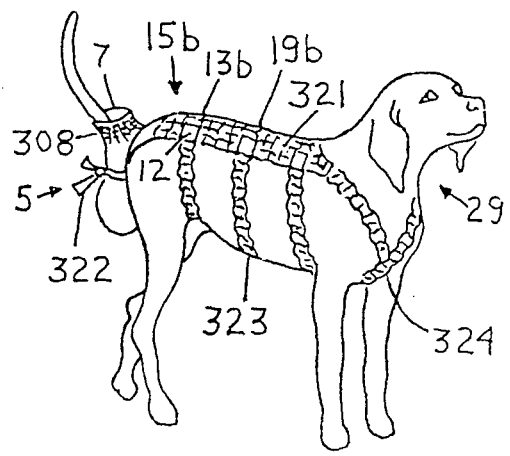
FIGS. 131 and 132 are perspective views of other embodiments of the invention.
Figure 132:
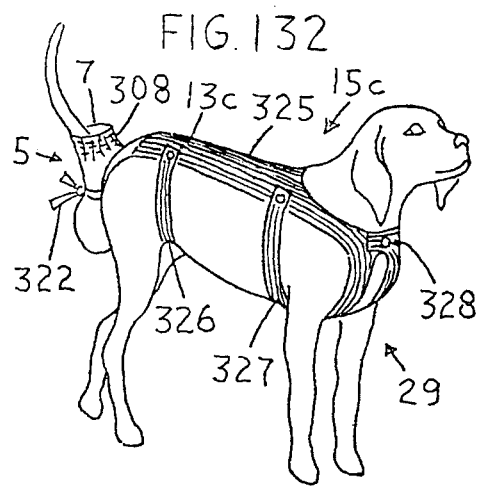
Figure 133:
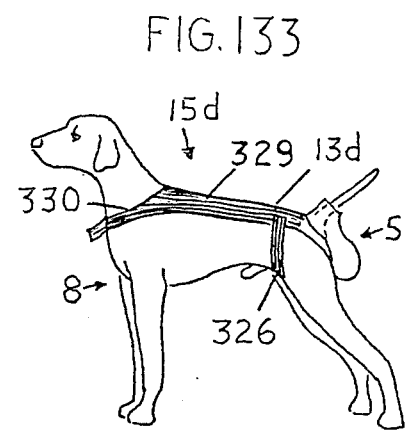
FIGS. 133 to 139 are side views of still further preferred exemplary embodiments of the invention.
Figure 134:
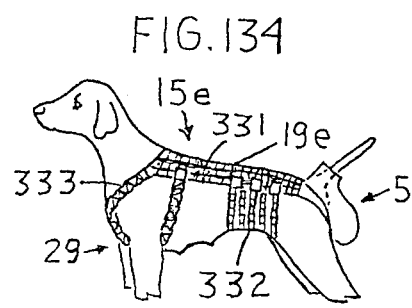
Figure 135:
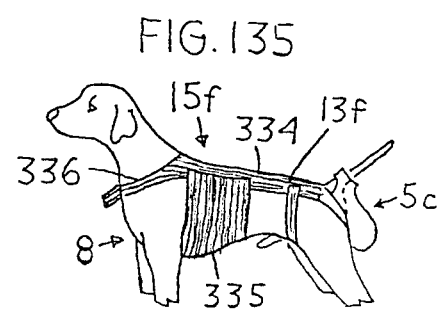
Figure 136:
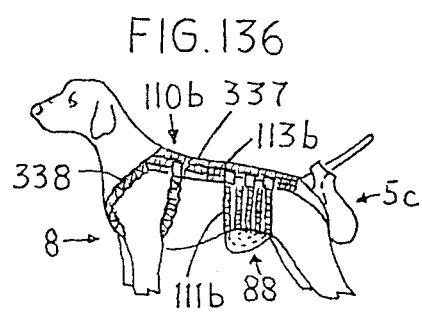

In addition, any one of the abovementioned embodiments of the garment may have any of the preferred uses already described, for example as an integral disposable garment, preferably made of polyethylene film having elasticized selected portions to adapt to different wearers weights and top lines, as illustrated in FIGS. 131, 134 and 136, and as a reusable wearer-contacting garment with attachable disposable pouches preferably made of polyethylene film or attachable washable pouches preferably made of vinyl film, as illustrated in FIGS.130, 132, 133, 135, 137, 138 and 139, while FIG. 130 shows only the garment.

The reusable garment could be made of any suitable soft material or fabric such as cotton, flannel or the like, or any machine or hand knitted material which have the necessary firmness and strength required to hold the pouches for solid and fluid waste tightly against the body of the wearer to provide a snug fit, so as to prevet leakage of wastes outside the pouches.

Figure 137:
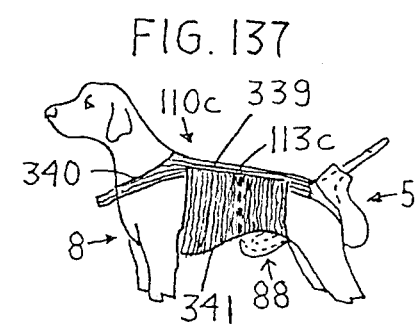

The reusable garment in any of the preferred embodiments of FIGS. 130 to 139 has also elasticized selected portions as illustrated, for example in FIG. 137 among others to adapt to the different variations in weight and top lines imposed by different breeds.

In all the embodiments of FIGS. 130 to 139, either disposable or reusable, the back portion of the garment is preferably plain.

Furthermore, any one of several fastening means may be employed for each use of the garment to fasten the garment around the body of the wearer as well as to attach the pouches to the reusable garment.

Thus, for the integral disposable garment any suitably commercially available refastenable pressure sensitive tape fastener, disposable snap fasteners, or any other disposable fastener may be used, and for the reusable wearer-contacting garment and attachable pouches any suitable separable fastener such as snap fasteners, velcro tape, buckle means, zippers, interlocking rib and groove, or any other equally effective fastener could also be employed.

FIG. 130 is a plan view of the preferred exemplary embodiment 309 of the garment to be worn by male and female wearers alike, comprising a resilient upper portion 310 which extends over the croup of the wearer and is shown in a stretched condition, a back portion 311 with a generally oval entrance opening 313, to encompass the root of the tail and the anal region of the wearer, a lower portion 312 with a generally oval entrance opening 314 to encompass either the vulva or the testicles of the respective wearers, and two resilient strap-like portions 315 (shown in a stretched condition) which define hindlegs receiving openings when the strap-like portions 315 are attached to each side of the upper portion 310.

The garment 309 has a front end 317 and a back end 316 and the lateral lines 318, 319 and 320 define each portion of the garment 309.

FIG. 130 illustrates the embodiment 309 as a reusable wearer-contacting garment made of any suitable soft material or fabric such as cotton, flannel or the like, or any machine or hand knitted material or the like, having the upper portion 310 and the strap-like portion 315 elasticized, for example with parallel strands of rubber 310a and 315a stitched to the inner surface of the fabric. Of course, any other way to elasticize the fabric may also be employed.

The embodiment 309, as an integral disposable garment, is preferably made of polyethylene, elasticized as described hereinbefore.

The embodiment 309 is provided in one example with any one of the already described solid waste pouches and in another example to be used by females wearers only, the garment 309 is also provided with any one of the fluid waste pouches adapted to female wearers.

In another embodiment the upper portion 310 is plain and has an elastic strip along the front end 317.

Referring now to FIGS. 131 to 135, these figures illustrate the preferred embodiments 15b, 15c, 15d, 15e and 15f of the garment provided with one pouch to receive and retain solid waste, to be worn by male and female dogs alike.

FIG. 131 exemplifies the embodiment 15b as an integral disposable garment comprising an elasticized upper portion 321 and elasticized adjustable straps 323 shown around the hindlegs, the abdomen and the forelegs, the latter crossing over the chest of the wearer at 324.

Figure 138:
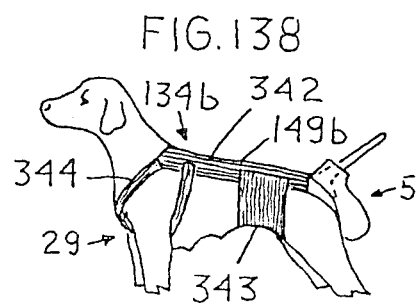

This manner of crossing over the chest the adjustable straps that go around the forelegs of the wearer, is also applicable to all other embodiments of the wearer contacting garment already described, which are provided with adjustable straps to be fastened around the forelegs and also to the embodiments illustrated in FIGS. 134, 136 and 138.

The description given hereinbefore for the elasticized straps of FIG. 9 is applicable to this embodiment.

The embodiment 15b is illustrated in association with pouch 5 which is provided with straps 322 tied up with a knot to enclose solid waste after use, and elastic members 308.

The upper portion 321 may have different lengths, as described earlier, thus, numerals 13b and 19b designate the front end of the upper portion 321 in each of the different lengths.

FIG. 134 illustrates the embodiment 15e of the garment also as an integral disposable garment with an elasticized upper portion 331, elasticized adjustable straps 333 and an elasticized lower portion 332, attached to each side of the upper portion 331 preferably with refastenable pressure sensitive tape fasteners.

The upper portion 331 may have a different length indicated by the front end 19e.

Turning now to FIGS. 132, 133 and 135 these figures illustrate the embodiments 15c, 15d and 15f of the garment, as a reusable wearer-contacting garment with an attachable solid waste pouch.

The embodiments 15c, 15d and 15f could be made of any suitable soft material or fabric such as cotton, flannel or the like or any machine or hand knitted material, which is suitably elasticized at selected portions.

FIG. 132 shows the elasticized upper portion 325, the straps 326 and 327 and the frontal straps 328 which are attached at the front below the base of the neck of the wearer and which are formed preferably integral with the upper portion 325 and the straps 327.

The embodiment 15d of FIG. 133 is provided with an elasticized upper portion 329 and frontal straps 330 also attached at the front below the base of the neck and formed preferably integral with the upper portion 329.

FIG. 135 shows the embodiment 15f which in addition to the elasticized upper portion 334 and straps 336 has an elasticized lower portion 335 formed preferably integral with the upper portion so as to be attached on one side of the upper portion, as illustrated, with any suitable separable fastener.

All three embodiments 15c, 15d and 15f may have a shorter upper portion as designated by the front ends 13c, 13d, and 13f for each length respectively.

Referring now to FIGS. 136 to 139 these figures illustrate the preferred embodiments 110b, 110c, 134b and 134c of the garment provided with two pouches, one for solid waste and one for fluid waste.

The embodiments 110b and 110c to be worn by male wearers have respectively resilient upper portions 337 and 339, straps 338 crossing over the chest and straps 340 attached at the front below the base of the neck and resilient lower portions 111b and 341.

FIG. 136 exemplifies the embodiment 110b as an integral disposable garment preferably made of polyethylene elasticized as described before, and FIG. 137 exemplifies the embodiment 110c as a reusable wearer-contacting garment with attachable pouches, and made of any suitable soft material or fabric, elasticized in any suitable way.

The upper portions 337 and 339 of embodiments 110b and 110c may be shorter in length as indicated by the respective numerals 113b and 113c designating the front ends for each length.

The lower portions 111b of the embodiment 110b is attached to each side of the upper portion 337 preferably with refastenable pressure sensitive tape fasteners.

In a like manner the lower portion 341 of the embodiment 110c is attached on each side of the upper portion 339 with any suitable separable fastener.

The embodiments 134b and 134c to be worn by female wearers, have respectively resilient upper portions 342 and 345, resilient straps 344 crossing over the chest and resilient straps 347 attached at the front below the base of the neck, and resilient lower portion 343 and 346.

In both embodiments 134b and 134c the lower portions 343 and 346 are attached on each side to the respective upper portions 342 and 345 with suitable separable fasteners.

The embodiments 134b and 134c may be provided with any of the fluid pouches already described for female wearers.

Figure 139:
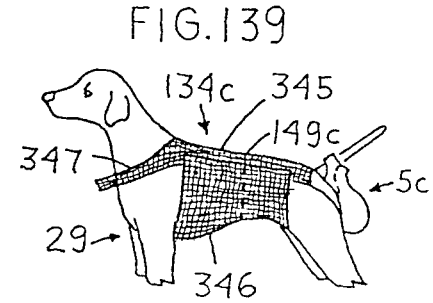

FIG. 138 exemplifies the embodiment 134b as a reusable garment made of any suitable soft elasticized material or fabric, while FIG. 139 exemplifies the embodiment 134c as made of any suitable machine or hand knitted material.

The upper portions 342 and 345 may be shorter as indicated by the numerals 149b and 149c designating the front ends for each length.

From the aforegoing detailed description of the garment of the present invention, it will be apparent that numerous modifications can be made without affecting the concept of the invention.

No specific data were given herein in regard to the kind of adhesives and other substances that may be used in practicing the invention, and also in regard to specific grades of materials which are best suited for the garment of the present invention. It should be noted, however, that these characteristic materials and other details are well known to those skilled in the art, and no protection is sought for these expedients beyond the features of the invention explained hereinbefore and set forth in the claims.

The garment of the present invention in all its preferred embodiments, is easily placed on the wearer by leaving the adjustable straps, or in some embodiments the lower portion of the garment, unattached, until the tail of the wearer is secured in the opening for the tail located on the back portion of the garment, with the pouch to receive and retain solid body wastes surrounding the tail and in the embodiments further comprising a pouch to receive and retain fluid body wastes, until the pouch to receive and retain fluid body wastes is placed surrounding the respective genitalia of the wearer.

With the garment in place as described above, the adjustable straps, or in some embodiments the lower portion of the garment, provided with fastening means, are fastened to the upper portion of the garment around the body of the wearer, sufficiently tightly, yet comfortably to prevent leakage of solid or fluid body wastes outside the pouches. In the attachable reusable-disposable use of the garment as well as in the attachable reusable-washable use of the garment, the pouches are preferably attached to the garment, before placing the garment on the body of the wearer, to facilitate the application of the garment.

Following use, the garment is removed from the body of the wearer by detaching the adjustable straps, and in some embodiments the lower portion of the garment. Then, in the disposable garment as well as in the attachable-reusable disposable garment the pouches to receive and retain solid body wastes are sealed with the attachment or occludent means provided inside the pouch or with the adjustable straps placed outside the pouch, and if desired, with commercially available twist ties or "key-lock" closures, before discarding the garment in the garbage can, and in the reusable-washable garment, as well as in the attachable reusable-washable garment provided with attachable reusable-washable pouches, the feces are flushed down a water closet and the absorbent pad is removed from the pouch and discarded in the waste basket, at which point the garment and pouches may be washed and reused.

While preferred exemplary embodiments of the invention have been illustrated and described, although not by way of limitation, it will be obvious to those skilled in the art that many alternatives, changes, variations and modifications can be made without departing from the spirit and scope of the invention and without sacrificing any of its advantages, and it is intended to cover in the appended claims all such alternatives, changes, variations and modifications that are within the spirit and scope of this invention.

I claim:

1. A device to be worn on the body by an animal such as a dog, cat or the like, for receiving and retaining the discharge of body waste, said animal being a wearer of the device, and having a top line, a rear, an anal region at the rear, a tail with a root at the rear above the anal region, a genital region, a belly, hindlegs, and forelegs, said root having a top and said tail projecting rearwardly from said root, said device comprising: a wearer-contacting garment having an upper portion which extends over the top line of the wearer, and a back portion which extends over the rear of the wearer, and said back portion having one opening defined therein of a size to encompass both the root of the tail and the anal region of the wearer, said opening having a continuous periphery extending entirely around an area of the rear of the wearer including the root of the tail and the anal region of the wearer; container means having at least one entrance opening defined therein to receive the discharge of body waste, said one entrance opening being of a size to encompass both the root of the tail and the anal region of the wearer and having a periphery secured to the periphery of said one opening of said back portion for connecting said container means to said back portion, said container means being shaped and dimensioned to laterally surround said one opening of said back portion and including strap means for overlying the wearer's tail at a location spaced rearwardly of the root thereof, said periphery of said one entrance opening being secured as aforesaid to the periphery of said one opening of said back portion over an extent at least sufficient to encompass the anal region and opposed side portions of the root of the tail; and means connected to said wearer-contacting garment at selected regions, to fasten the garment tightly yet comfortably and securely around the body of the wearer.

2. The article of claim 1 wherein said container means is a pouch comprising a top portion, a back portion wherein said entrance opening is generally located, a front portion opposite to said back portion, and a closed bottom wherein solid waste can be confined.

3. The article of claim 2 wherein said top portion has an aperture for the tail to come out, said aperture having facing edge portions including strap means extending from said facing edge portions of the last mentioned aperture in overlying relation to the wearer's tail at a location spaced rearwardly of the root thereof.

4. The article of claim 2 wherein said top portion has an aperture for the tail to come out, said aperture having facing edge portions including strap means comprising generally two straps respectively extending from said facing edges of said aperture at a location spaced rearwardly of the root of the tail, said straps to be fastened around the tail to hold said pouch in place.

5. The article of claim 2 wherein said pouch has means connected to said closed bottom to retain fluid waste.

6. The article of claim 5 wherein said means to retain fluid waste is an absorbent pad connected to the inside of said pouch at said bottom.

7. The article of claim 6 wherein said pouch has a flange connected to the inside of the pouch and located transversely to said pouch and spaced from the bottom of the pouch, said flange being laterally inwardly projected forming a pocket inside said pouch whereby said absorbent pad can be positioned.

8. The article of claim 6 wherein said absorbent pad is adhered to the bottom of the pouch by adhesive means.

9. The article of claim 2 wherein said pouch has means to enclose solid waste within said pouch after use.

10. The article of claim 9 wherein said means are generally two straps connected to the outside of said pouch and located transversely to said pouch below said entrance opening which encompasses both the root of the tail and the anal region of the wearer, said straps to be fastened to enclose solid waste within the bottom of said pouch.

11. The article of claim 9 wherein said means is generally pressure-sensitive adhesive connected to the inside of the pouch generally near the periphery of said openings.

12. The article of claim 9 wherein said means comprise generally interlocking rib and groove elements connected to the inside of said pouch on facing inner surface thereof generally near the periphery of said openings.

13. The article of claim 9 wherein said pouch has a flange connected to the inside of the pouch and located transversely to said pouch below said entrance opening which encompasses both the root of the tail and the anal region of the wearer, said flange being laterally inwardly projected forming a pocket inside said pouch within which solid body waste can remain confined.

14. The article of claim 2 wherein said pouch is permanently connected along the periphery of said entrance opening to the back portion of said wearer-contacting garment.

15. The article of claim 2 wherein said pouch is detachably connected along the periphery of said entrance opening to the back portion of said wearer-contacting garment.

16. The article of claim 2 wherein said pouch comprises a lining, said lining having one entrance opening defined therein, said one entrance opening being coextensive with said entrance opening of said pouch, and said lining being detachably connected to said pouch generally along the periphery of said entrance opening of said pouch.

17. The article of claim 1 wherein said wearer-contacting garment having an upper portion and a back portion comprises a lower portion which extends over the genital region of the wearer, said lower portion having an opening defined therein of a size to extend entirely around the periphery of the genital region of the wearer; and a pouch having a closed bottom and one entrance opening to receive the discharge of fluid body waste, said last-mentioned entrance opening being of a size to extend entirely around the periphery of the genital region of the wearer and being coextensive with said opening on said lower portion, whereby said pouch is connected to said lower portion along the periphery of said lower-portion opening and said pouch having means connected to said closed bottom to retain fluid waste.

18. The article of claim 17 wherein said lower portion is generally resilient.

19. The article of claim 18 wherein said resilient lower portion comprises elastic members operatively associated with said lower portion in an elastically contractable condition, to provide an elastically contractable lower portion, the elastic members being effective to gather the lower portion, whereby an effective elastic lower portion is formed on said wearer-contacting garment.

20. The article of claim 18 wherein said resilient lower portion is connected to said back portion generally by resilient means.

21. The article of claim 17 wherein said lower portion is generally detachably connected to said upper portion and defining therewith at least hind-legs-receiving openings.

22. The article of claim 17 wherein said pouch to receive the discharge of fluid body waste is permanently connected along the periphery of its entrance opening to the lower portion of said wearer-contacting garment.

23. The article of claim 17 wherein said pouch to receive the discharge of fluid body waste is detachably connected along the periphery of said entrance opening to the lower portion of said wearer-contacting garment.

24. The article of claim 17 wherein said means to retain fluid body waste is an absorbent pad connected to the inside of said pouch at said bottom.

25. The article of claim 24 wherein said pouch has a flange connected to the inside of the pouch and located transversely to said pouch and spaced from the bottom of the pouch, said flange being laterally inwardly projected forming a pocket inside said pouch whereby said absorbent pad can be positioned.

26. The article of claim 24 wherein said absorbent pad is adhered to the bottom of the pouch by adhesive means.

27. The article of claim 17 wherein said pouch has a substantially conic shape.

28. The article of claim 17 wherein said pouch has a substantially crescent-like shape.

29. The article of claim 17 wherein said pouch has a substantially hemispheric shape.

30. The article of claim 17 wherein said pouch is flat and is configured to define a substantially rectangular shape.

31. The article of claim 1 wherein said means connected to said wearer-contacting garment to fasten said garment to the wearer are adjustable straps to fit said garment to animals of different sizes.

32. The article of claim 31 wherein said adjustable straps are generally resilient adjustable straps.

33. The article of claim 32 wherein each of said resilient adjustable straps comprises one strap member and at least an elastic member operatively associated with said strap member in an elastically contractable condition, to provide an elastically contractable adjustable strap, the elastic member being effective to gather the adjustable strap, whereby an effective elastic adjustable strap is formed on said wearer-contacting garment and said adjustable straps provide a snug fit at selected regions, to fasten the garment tightly yet comfortably and securely around the body of the wearer.

34. The article of claim 32 wherein said resilient adjustable straps comprise adjustable elastic fabric straps and said adjustable straps provide a snug fit at selected regions to fasten the garment tightly yet comfortably and securely around the body of the wearer.

35. The article of claim 31 wherein said adjustable straps are connected to said wearer-contacting garment at locations defining hind-legs-receiving openings.

36. Article of claim 31 wherein said adjustable straps are connectedd to said wearer-contacting garment at locations defining hind-legs-receiving openings and a belly-receiving opening.

37. The article of claim 31 wherein said adjustable straps are connected to said wearer-contacting garment at locations defining hind-legs-receiving openings, a belly-receiving opening and forelegs-receiving openings.

38. The article of claim 31 wherein said adjustable straps have fastening means connected to their free ends to be attached to said garment.

39. The article of claim 31 wherein said adjustable straps have adhesive means connected to their free ends to be attached to said garment.

40. The article of claim 31 wherein said adjustable straps comprise adjustable straps at locations defining hind-legs-receiving openings and a neck receiving opening.

41. The article of claim 1, wherein the periphery of said entrance opening of said container means completely laterally surrounds said one opening of said back portion.

42. The article of claim 1 wherein said container means having at least one entrance opening defined therein to receive the discharge of body waste is a pouch comprising a top portion, a back portion wherein said entrance opening is generally located, a front portion opposite to said back portion, and a round closed bottom wherein solid waste can be confined.

43. The article of claim 1 wherein said container means having at least one entrance opening defined therein to receive the discharge of body waste is a pouch comprising a top portion, a back portion wherein said entrance opening is generally located, a front portion opposite to said back portion, and a crescent-like shaped closed bottom wherein solid waste can be confined.

44. The article of claim 1 wherein said container means having at least one entrance opening defined therein to receive the discharge of body wastes is a pouch comprising a top portion, a back portion wherein said entrance opening is generally located, a front portion opposite to said back portion, and a tapered closed bottom wherein solid waste can be confined.

45. The article of claim 1 wherein said strap means are generally resilient.

46. The article of claim 1 wherein said upper portion is generally resilient.

47. The article of claim 1 wherein said wearer-contacting garment having an upper portion and a back portion comprises a lower portion, and said upper portion and said lower portion are generally resilient and said lower portion extends at least over the chest of the wearer and is generally detachably connected to said upper portion.

48. The article of claim 1 wherein said wearer contacting garment having an upper portion and a back portion comprises a lower portion, and said upper portion and said lower portion are generally resilient, and said lower portion extends at least over the genital region of the wearer and has an opening defined therein of a size to extend extirely around the periphery of the genital region of the wearer, and said lower portion is generally detachably connected to said upper portion at least defining therewith hind-legs-receiving openings.

49. The article of claim 48 wherein said lower portion extending at least over the genital region of the wearer and having an opening defined therein of a size to extend entirely around the periphery of the genital region of the wearer has a pouch with a closed bottom and one entrance opening to receive the discharge of fluid body waste, said last-mentioned entrance opening being of a size to extend around the periphery of the genital region of the wearer and being coextensive with said opening on said lower portion, whereby said pouch is connected to said lower portion along the periphery of said lower-portion opening and said pouch having means connected to said closed bottom to retain fluid waste, and said lower portion is generally detachably connected to said upper portion defining therewith at least hindlegs receiving openings.

50. The article of claim 1 wherein said wearer-contacting garment having an upper portion and a back portion comprises a lower portion, and said upper portion and said lower portion are generally resilient and said lower portion extends at least over the chest of the wearer and is generally detachably connected to said upper portion defining therewith a neck receiving opening, forelegs receiving openings, and chest receiving opening.

* * * * *